US012350236B2

(12) United States Patent
Desbrosses et al.

(10) Patent No.: US 12,350,236 B2
(45) Date of Patent: Jul. 8, 2025

(54) MULTI-CHAMBER BAG FOR PARENTERAL NUTRITION SOLUTIONS

(71) Applicants: Baxter international Inc., Deerfield, IL (US); Baxter Healthcare SA, Glattpark (CH)

(72) Inventors: Freddy Desbrosses, Thuin (BE); Pierpaolo Padula, Etterbeek (BE); Jean-Claude Bezin, Lessines (BE); Marin Demulier, Jumet (BE)

(73) Assignees: Baxter International Inc., Deerfield, IL (US); Baxter Healthcare SA, Glattpark (CH)

( * ) Notice: Subject to any disclaimer, the term of this patent is extended or adjusted under 35 U.S.C. 154(b) by 633 days.

(21) Appl. No.: 17/543,924

(22) Filed: Dec. 7, 2021

(65) Prior Publication Data

US 2023/0172809 A1 Jun. 8, 2023

(51) Int. Cl.

| | |
|---|---|
| ***A61J 1/20*** | (2006.01) |
| ***A61J 1/10*** | (2006.01) |
| ***A61J 1/14*** | (2023.01) |
| ***B65B 3/00*** | (2006.01) |
| ***B65B 3/02*** | (2006.01) |

(52) U.S. Cl.

CPC ............... *A61J 1/2093* (2013.01); *A61J 1/10* (2013.01); *A61J 1/1462* (2013.01); *A61J 1/1475* (2013.01); *B65B 3/003* (2013.01); *B65B 3/02* (2013.01)

(58) Field of Classification Search

CPC .......... A61J 1/2093; A61J 1/10; A61J 1/1462; A61J 1/1475; B65B 3/003; B65B 3/02

See application file for complete search history.

(56) References Cited

U.S. PATENT DOCUMENTS

| | | | | |
|---|---|---|---|---|
| 5,267,646 A | 12/1993 | Inoue et al. | | |
| 6,039,720 A * | 3/2000 | Wieslander ........... | A61J 1/2093 604/416 | |
| 2005/0194060 A1 | 9/2005 | Houwaert et al. | | |
| 2007/0031976 A1* | 2/2007 | Trouilly ................. | A61K 45/06 436/1 | |

(Continued)

FOREIGN PATENT DOCUMENTS

| | | |
|---|---|---|
| EP | 0790051 | 8/1997 |
| EP | 2080501 | 7/2009 |

OTHER PUBLICATIONS

International Search Report for Application No. PCT/US2022/08108 dated Apr. 4, 2023 (4 pages).

(Continued)

*Primary Examiner* — Andrew J Mensh
*Assistant Examiner* — Meagan Ngo
(74) *Attorney, Agent, or Firm* — K&L Gates LLP

(57) ABSTRACT

A flexible multi-chamber bag for storing and reconstituting parenteral nutrition solutions is disclosed. The flexible multi-chamber bag comprises two first peelably sealing walls between the two polymer films extending from the top edge to the bottom edge and separating the first bag into a first chamber, a second chamber and a third chamber, wherein the first chamber is between the second chamber and the third chamber; and at least one of the two first peelably sealing walls split into a second plurality of second peelably sealing walls and the second plurality of the second sealing walls sealed to the bottom edge to form a fourth chamber.

7 Claims, 26 Drawing Sheets

Form

Fill

(56) References Cited

U.S. PATENT DOCUMENTS

| | | | | |
|---|---|---|---|---|
| 2009/0166363 | A1* | 7/2009 | Balteau | A61M 1/1668 220/523 |
| 2009/0254032 | A1* | 10/2009 | Muramatsu | B65D 81/3266 604/87 |
| 2010/0318058 | A1* | 12/2010 | Schroder | A61J 1/2093 604/410 |
| 2013/0039606 | A1 | 2/2013 | Pittet et al. | |
| 2013/0144247 | A1* | 6/2013 | Davenport | A61J 1/10 604/404 |
| 2016/0000652 | A1 | 1/2016 | Uwe-Bernd | |

OTHER PUBLICATIONS

Vanek et al., A.S.P.E.N. Nutrition in Clinical Practice 2012, 27:440-491.

Osland et al., Australasian Society for Parenteral and Enteral Nutrition (AuSPEN) adult vitamin guidelines for parenteral nutrition. Asia Pac J of Clin Nutr 2016, 25(3):636-650.

Blaauw et al. Parenteral Provision of Micronutrients to Adult Patients: An Expert Consensus Paper. JPEN J Parenter Enteral Nutr. Mar. 2019;43 Suppl 1:S5-S23.

* cited by examiner

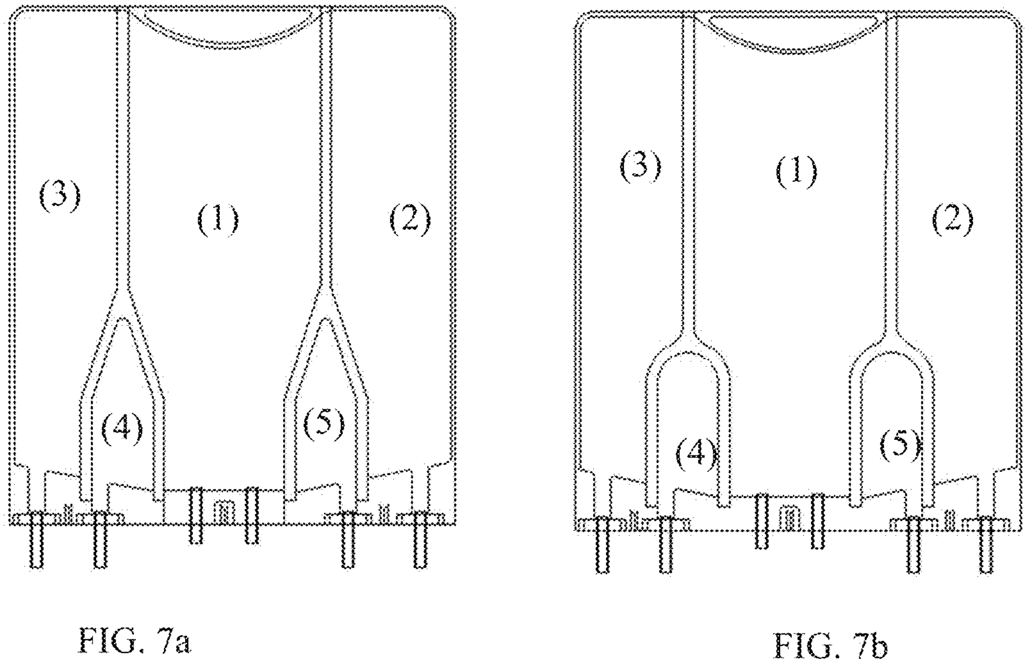
FIG. 7 (FIG. 7a and FIG. 7b)

MULTI-CHAMBER BAG FOR PARENTERAL NUTRITION SOLUTIONS

TECHNICAL FIELD

The disclosure is directed to a flexible multi-chamber peel-able bag (a multi-chamber bag (MCB) having peelably sealing walls) that allows an easy, straightforward and risk-free reconstitution of the mixture, to be used for storing ready-to-infuse Parenteral Nutrition solutions including both macronutrients, micronutrients, and electrolytes. The disclosure is also directed to parenteral nutrition products comprising the parenteral nutrition formulation reconstituted from such a flexible multi-chamber peel-able bag. Specifically, the present disclosure is directed to a MCB comprising peelably sealing walls separating a single bag into at least five chambers, wherein at least two chambers contain a significantly lower volume than the remaining at least three chambers. More specifically, the present disclosure is directed to a MCB comprising peelably sealing walls separating a single bag into at least five chambers containing a carbohydrate formulation in a first chamber, an amino acid formulation in a second chamber, a lipid formulation in a third chamber, a fourth chamber comprising a vitamin formulation and a fifth chamber comprising a trace element formulation, wherein the carbohydrate formulation, amino acid formulation and/or the lipid formulation may also contain certain vitamins and certain trace elements that can be stably accommodated therein, and wherein the volume of the vitamin formulation and the volume of the trace element formulation is generally lower than the volume of the amino acid, carbohydrate or lipid formulation, respectively. Once activated, the peelably sealing walls can be removed and the formulations from the different chambers can be mixed to form one single solution. Thus, the disclosure also relates to the use of the parenteral nutrition formulation for providing total parenteral nutrition to a patient without having to add further components such as vitamins or trace elements to the parenteral formulation before administration to meet the clinical guidelines for parenteral nutrition.

BACKGROUND AND DESCRIPTION OF THE RELATED ART

Flexible multi-chamber containers from polymer films for storing and keeping separated parenteral nutrition solutions are widespread. For opening the compartments of said containers, several materials and methods for producing peelable seals (peelably heat-sealed welds or peelably sealing walls) have been developed.

Unlike permanently welded seals, peelable seals can be ruptured by applying pressure on the container chambers (rolling the container or pressing on one of the chambers). However strength of the peelable seal should be high enough for production and transport and still low enough to easily be ruptured or removed.

Three-Chamber peelable bags containing macronutrients (lipids, amino acids, and dextrose) and electrolytes are widely used, and also MCBs with more than three chambers have been described in the prior art, see, for example, EP 2 080 501 A1 or U.S. Pat. No. 5,267,646 A. However, only a few multi-chamber bag products for parenteral nutrition that contain vitamins and/or trace elements in separate formulations are existing, and no product is existing containing all the macronutrients, electrolytes, and all recommended micronutrients (vitamins and trace elements).

It is a challenge to provide a MCB with at least five chambers for accommodating said complete set of macronutrients and micronutrients, wherein the volume of at least two of the chambers is significantly lower than that of the remaining chambers and which still fulfills all requirements of a MCB. Specifically, the peelable sealing walls must be both stable enough so the walls do not break or start to leak during handling, including filling, sterilization, transport, and storage, and still allow an easy, single-step activation or reconstitution of the bag without the additional risk of incomplete activation between chambers. This is specifically challenging due to the combination of chambers having very different volumes as the pressure exerted on the peelable seals by the large volume chambers, generally containing the macronutrients, is higher than that of the small volume chambers, generally containing the micronutrients.

In addition, it may be desirable to allow the filling also of a MCB with at least five chambers to be filled from one side only as this significantly simplifies the manufacturing of such MBC and reduces the introduction of potentially weak seals. In such scenario, the five chambers must be arranged in way that they are all accessible from one side of the container through at least five filling tubes that are arranged in parallel on one side of the container. Accordingly, the at least five chambers in such case must also be arranged in parallel to each other so they can be filled from one side.

It is also a challenge to design such MCB in a way that an undesired early mixing between two formulations that could lead to stability issues is avoided. For example, high concentrated glucose or acidic trace element formulations should not be mixed with the lipid emulsion formulation and/or the vitamin formulation for stability reasons but should be admixed only in one step together with the buffered amino acid solution.

Accordingly, a very careful design of a MCB according to the invention is required to address all of the above challenges.

In the majority of the cases and because of the above issues, micronutrients are simply added in the bag containing macronutrients through the available medication port before administration. However, this process of supplementation is time-consuming, requires the use of additional equipment such as, for example, syringes and needles, and increases the risk of medication errors and contamination especially when not made under aseptic conditions.

A multi-chamber container that allows for the stable and safe accommodation of all recommended macronutrients, electrolytes and micronutrients as disclosed herein, which can be terminally heat sterilized, stored under standard conditions and can finally be reconstituted in a one-step and mistake-proof way would therefore have a number of advantages:

- eliminating microbiological contamination associated with micronutrient addition;
- eliminating medication errors associated with micronutrient addition;
- decreasing PN preparation by eliminating the time required for micronutrient addition;
- reducing needle stick injuries (i.e., associated with micronutrient addition);
- eliminating PN waste associated with micronutrient addition (e.g. vitamin and TE vials, diluent, and disposables);
- simplifying logistics supply chain, and storage management for hospitals and patients.

Accordingly, there is a significant need to provide a multi-chamber container for a ready-to-use, all-in-one parenteral nutrition product which is designed for accommodating all macronutrient and micronutrient solutions in five or more separate chambers to meet the clinical guidelines for parenteral nutrition, thereby avoiding the compounding of or manual combination of formulations, or the addition vitamins and trace elements to a product before administration. To date, the MCB with a full set of required macro- and micronutrients cannot together be stably accommodated in terminally heat-sterilized parenteral nutrition products because of issues of incompatibility and stability of several critical micronutrients especially when terminally heat-sterilized products are sought for. In addition, a multi-chamber container for such product must be carefully designed for the safe and stable accommodation of at least five different solutions having different volumes during production, sterilization, storage, and transport, and which must be reconstituted before administration in a simple and complete manner in order to avoid difficulties during single-step activation including a potentially incomplete reconstitution.

Providing such ready-to-use MCB with product would address ecological issues, enable a safe and efficient therapy also for HPN and TPN, and specifically allow to reduce medical risks, which could significantly contribute to advancing today's standard of care.

SUMMARY OF THE INVENTION

In one aspect, the present disclosure relates to a flexible multi-chamber bag for storing and reconstituting parenteral nutrition solutions. The flexible multi-chamber bag comprises: two polymer films edge-sealed to form a first bag having a top edge, a bottom edge, a left edge and a right edge, wherein the top edge, the bottom edge, the left edge and the right edge are non-peelably sealed; a plurality of tubes with sidewalls non-peelably sealed between the two polymer films at the bottom edge or the top edge to form a first plurality of port tubes; two first peelably sealing walls between the two polymer films extending from the top edge to the bottom edge and separating the first bag into a first chamber, a second chamber and a third chamber, wherein the first chamber is between the second chamber and the third chamber; and at least one of the two first peelably sealing walls split into a second plurality of second peelably sealing walls and the second plurality of the second sealing walls sealed to the bottom edge to form a fourth chamber.

In one embodiment, each of the first chamber, the second chamber and the third chamber extend from the top edge to the bottom edge.

In one embodiment, the at least one of the two first peelably sealing walls is split into the second plurality of the second peelably sealing walls at a location between the top edge and the bottom edge.

In one embodiment, each of the two first peelably sealing walls is split into two second peelably sealing walls at the location between the top edge and the bottom edge and the two second peelably sealing walls extend and are non-peelably sealed to the bottom edge to form the fourth chamber and a fifth chamber.

In one embodiment, at least one of the fourth chamber and the fifth chamber is symmetrical.

In one embodiment, both the fourth chamber and the fifth chamber are symmetrical.

In one embodiment, at least one of the fourth chamber and the fifth chamber is unsymmetrical.

In one embodiment, both the fourth chamber and the fifth chamber are unsymmetrical.

In one embodiment, the two second peelably sealing walls around a splitting point have an angle between 20° and 50°.

In one embodiment, the two second peelably sealing walls around the splitting point have an angle between 30° and 45°.

In one embodiment, the two second peelably sealing walls form a hemispherical shape around the splitting point.

In one embodiment, each of the first chamber, the second chamber, the third chamber, the fourth chamber and the fifth chamber connects one of the first plurality of port tubes.

In one embodiment, the first plurality of port tubes comprises five port tubes.

In one embodiment, only one of the first chamber, the second chamber, the third chamber, the fourth chamber and the fifth chamber connects the first plurality of the port tubes.

In one embodiment, the first plurality of the port tubes comprises two port tubes.

In one embodiment, the second plurality of the second peelably sealing walls comprises three peelably sealing walls.

In one embodiment, a third peelably sealing wall between the two polymer films extends from the left or the right edge to the bottom edge to form a fifth chamber.

In one embodiment, the third peelably sealing wall between the two polymer films extends from the right edge to the bottom edge to form the fifth chamber.

In one embodiment, the fifth chamber is unsymmetrical.

In one embodiment, the second plurality of the second peelably sealing walls comprises three peelably sealing walls extending and non-peelably sealed to the bottom edge to the fourth chamber and a sixth chamber.

In one embodiment, the sixth chamber is either symmetrical or unsymmetrical.

In another aspect, the present disclosure relates to n "all-in-one" parenteral nutrition system comprising parenteral nutrition solutions in the flexible multi-chamber bag as discussed above. The "all-in-one" parenteral nutrition system comprises: the first chamber comprising an amino acids solution; the second chamber comprising a glucose solution; the third chamber comprising a lipid emulsion; the fourth chamber comprising a vitamins solution or emulsion; and the fifth chamber comprising a trace elements solution.

In one embodiment, the first chamber further comprises vitamins or trace elements.

In one embodiment, the second chamber further comprises vitamins or trace elements.

In one embodiment, the third chamber further comprises fat-soluble vitamins.

In one embodiment, the fourth chamber is between the first chamber and the third chamber and the fifth chamber is between the first chamber and the second chamber.

In one embodiment, each of the first chamber, the second chamber, the third chamber, the fourth chamber and the fifth chamber comprise one port tube for addition of contents into the chambers.

In one embodiment, the port tube for each of the third chamber, the fourth chamber and the fifth chamber is sealed or closed after the addition of the contents into the chambers.

In one embodiment, port-tube-containing portions for the second chamber, the third chamber, the fourth chamber and the fifth chamber are non-peelably sealed and removed from the rest of the flexible multi-chamber bag.

In one embodiment, the flexible multi-chamber bag comprises at least one port tube at the top edge for the first chamber, the second chamber and/or the third chamber.

In one embodiment, a portion comprising the at least one port tube at the top edge for the first chamber, the second chamber and/or the third chamber is non-peelably sealed and removed from the rest of the flexible multi-chamber bag.

In yet another aspect, the present disclosure relates to a method of manufacturing the "all-in-one" parenteral nutrition system as discussed above. The method comprises: producing the flexible multi-chamber bag, the flexible multi-chamber bag comprising: the first chamber comprising a first port tube and/or a sixth port tube; the second chamber comprising a second port tube; the third chamber comprising a third port tube; the fourth chamber comprising a fourth port tube; and the fifth chamber comprising a fifth port tube, wherein each of the first chamber, the second chamber and the third chamber extends from the top edge of the flexible multi-chamber bag to the bottom edge of the flexible multi-chamber bag, and the first chamber is between the second chamber and the third chamber; adding an amino acids solution into the first chamber through the first port tube and/or the sixth port tube; adding a glucose solution into the second chamber through the second port tube; adding a lipid emulsion into the third chamber through the third port tube; adding a vitamins solution or emulsion into the fourth chamber through the fourth port tube; adding a trace elements solution into the fifth chamber through the fifth port tube; and sealing the second port tube, the third port tube, the fourth port tube and the fifth port tube.

In one embodiment, the method further comprises cutting and removing the portions comprising the third port tube, the fourth port tube and the fifth port tube from the flexible multi-chamber bag to form the "all-in-one" parenteral nutrition system.

BRIEF DESCRIPTION OF THE DRAWINGS

FIG. 2 (including FIG. 2*a*, FIG. 2*b*, FIG. 2*c* and FIG. 2*d*) is a set of diagrams depicting the general manufacturing process of the MCB of FIG. 1*d*.

FIG. 3 shows that rolling the bag from the top is enough to allow the complete opening of the peel-seals. With the proposed MCB design the current rolling action for known multi-chamber bags such as Olimel, Numeta, Oliclinomel, or Clinomel can be leveraged for the activation of the five-chamber bag in spite of the challenges of having five chambers with different volumes, thereby guaranteeing a mixing of all compartments with a single operation, while maintaining the user experience unchanged which reduces the risk of mistakes and/or consumption of time.

FIG. 4 shows an example of the "V shape" geometry for the low volume Chambers (4) and (5).

FIG. 7 (including FIG. 7*a* and FIG. 7*b*) is a set of schematic diagrams showing reshaping of peel seals of an exemplary 5CB with chamber (1) through (5) as described before, see FIG. 2: "V" (FIG. 7*a*) into "U"-shape (FIG. 7*b*). FIG. 7*a* shows the "V"-shape of the small chambers. FIG. 7*b* shows the "U"-shape of the small chambers. Because of the sharp angle in the small compartment of the V option, the two film plies may seal together during sterilization. It is therefore preferable to reshape the compartment as an "U". Another way to overcome this issue is to increase the inflation of the chamber by adding more gas headspace in the small chambers.

FIG. 18 (including FIG. 18*a* and FIG. 18*b*) is a set of schematic diagrams showing that the 5-chamber containers can be designed to prevent sharp angles in the small compartments.

FIG. 19 (including FIG. 19*a* and FIG. 19*b*) is a set of schematic diagrams showing alternative designs for a 5CB to prevent having sharp angles in the small compartments.

DETAILED DESCRIPTION OF THE INVENTION

Figure 1A:
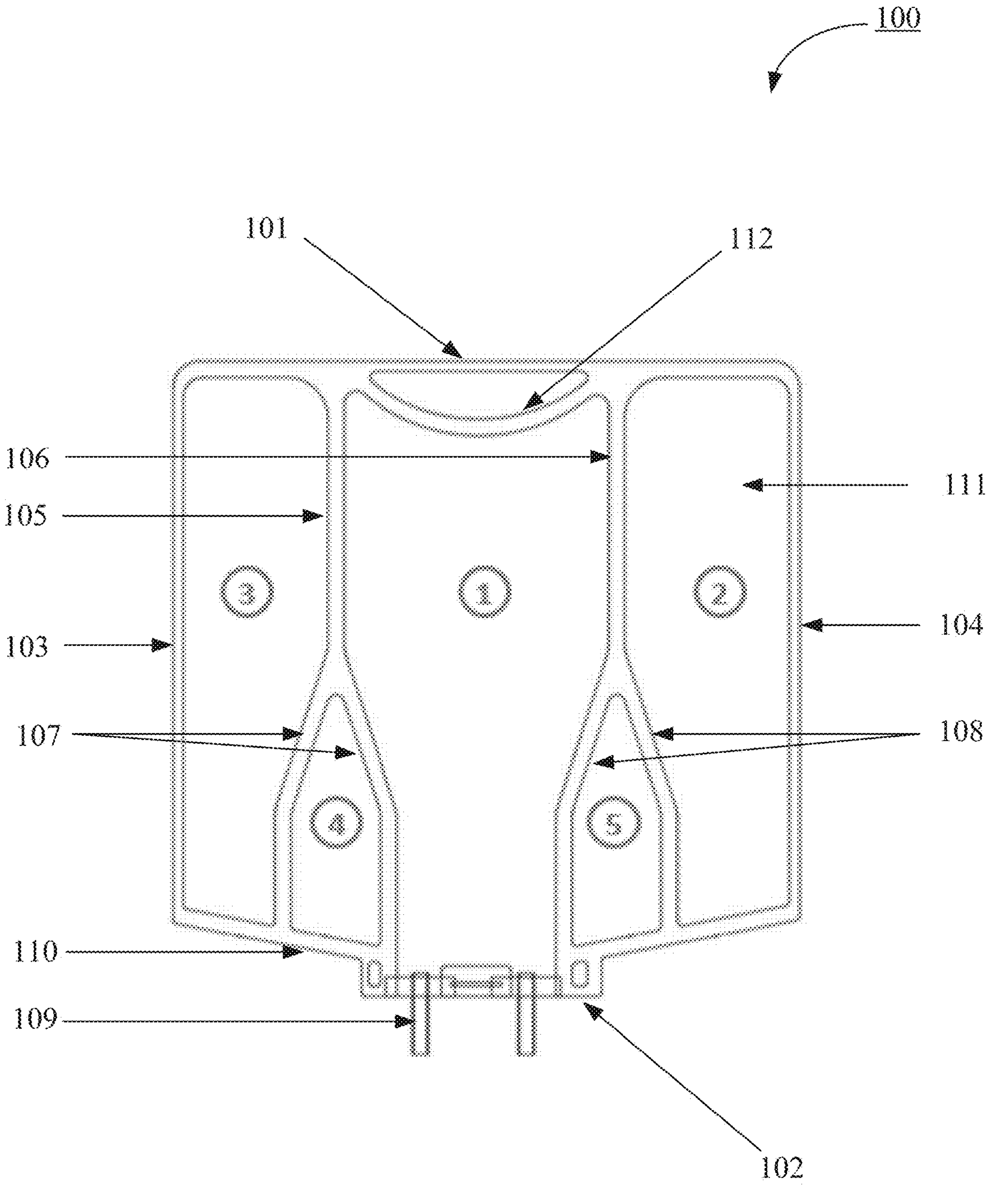
FIG. 1 (including FIG. 1*a*, FIG. 1*b*, FIGS. 1*c* and 1*d*) is a set of schematic diagrams showing designs of a multi-chamber bag (MCB) according to the invention, comprising five chambers which contain a carbohydrate formulation (2), an amino acid formulation (1), a lipid formulation (3), a trace element formulation (5) and a vitamin formulation (4). In one embodiment, Chamber (1) includes an amino acid solution optionally containing some vitamins or trace elements; Chamber (2) includes a glucose solution containing potentially some vitamins and/or trace elements; Chamber (3) includes a lipid emulsion optionally containing fat-soluble vitamins; Chamber (4) includes a vitamins solution or emulsion; and Chamber (5) includes a trace element solution. The flexible containers of FIG. 1*a*, FIG. 1*b*, FIG. 1*c* and FIG. 1*d* are made by circumferentially welding two foils being not peelable and furthermore containing peelable welds to separate the five chambers. On the bottom part, tubes of FIGS. 1*a*, 1*b*, 1*c* and 1*d* are sealed between the two foils. The tubes as shown in FIG. 1*b* and FIG. 1*c* are used to fill the five chambers with the proper content from one side. The multi-chamber containers of FIG. 1*b* and FIG. 1*c* thus follow a more traditional approach. In particular: 2 tubes out of 5 are closed with an administration port and a medication port (e.g., the chamber number 1 as shown in FIG. 1*b* carries the administration port and the chamber number 2 carries the medication port). 3 tubes out of 5 are permanently sealed or closed with a dummy closure in FIGS. 1*b* and 1*c* (i.e., chambers number 3, 4 and 5). The MCB of FIG. 1*a* and FIG. 1*d* is characterized by only 2 tubes in correspondence of the Amino Acid Chambers as after the filling of this chamber, these tubes are closed with an administration port and a medication port. The other four chambers are also filled through tubes during production, but these are scarified after having sealed and cut the film to provide a funnel shape to the MCB for improving the draining of the container during use and for removing tubes without function that reduce user-friendliness and may lead to confusion. Such funnel shape is a preferred embodiment. In one embodiment, a rigid molded closure system, including for instance both administration port and medication port, can be preferred instead of tubes for the middle chamber (1) of FIG. 1*a*, FIG. 1*b* FIG. 1*c* and FIG. 1*d*.

The present invention generally relates to the field of parenteral nutrition. More particularly, the present invention relates to multi-chamber containers providing formulations for parenteral administration comprising peelably sealing walls to separate the container into at least five chambers, wherein the multi-chamber container allows the stable accommodation of at least five different formulations having different volumes, during manufacture, sterilization, transport and storage, while guaranteeing a smooth and complete one-step reconstitution of the solutions before administration. The formulations provided in such MCB stably provide a combination of lipids, carbohydrates, amino acids, vitamins and trace elements in a manner that they are ready to be used for administration to a patient and meet the nutritional requirements of current guidelines for parenteral nutrition without further addition of further substances. Related embodiments described herein relate to multichamber containers that optionally have a sixth chamber. Further related embodiments relate to the formulations reconstituted from such five or six chamber bags following activating the multi-chamber container by rupturing or removing the peelably sealing walls and their use for parenteral nutrition of patients in need thereof.

Parenteral nutrition products, specifically for total parenteral nutrition, should provide for all macronutrients and micronutrients that allow for a safe and sustainable parenteral nutrition which addresses all the nutritional needs of a patient for whom oral or enteral uptake of nutrients is impossible, insufficient or contraindicated. Today, when providing parenteral nutrition in the form of ready-to-use multi-chamber containers, at least some relevant micronutrients are typically added to nutrition bags before administration because they are not contained in such products. For this purpose, vitamins are, for example, provided in glass vials in the form of lyophilizates or solutions to be reconstituted and/or mixed into the nutrition/infusion bags. Trace elements are also provided in glass vials or polypropylene ampules meant to be mixed into infusion bags prior to administration. Prior to usage, referring to the start of administering the formulation to the patient, the micronutrients are sometimes added to the nutrition solution via the medical port of the container or bag, or are added via a Y-connector to the infusion line. As mentioned before, these processes take time and several handling steps are required, thereby increasing the risk of medication errors and/or bacterial contamination. In addition, significant amounts of waste are generated, such as ampoules, gloves, lines, and syringes that are only needed for the mixing or addition of micronutrients and are then discarded.

To avoid these problems, it would seem a straightforward solution to provide ready-to-use "all-in-one" products that accommodate all relevant macro- and micronutrients products as well as electrolytes. However, it is persistently difficult to stably accommodate vitamins and trace elements that are deemed relevant for meeting the patients' needs in one terminally heat-sterilized product. For example, incompatibilities may occur when mixing vitamin and trace elements in the same preparation, and/or certain vitamins cannot withstand the terminal heat-sterilization of the product, which is, however, a preferable way of excluding bacterial contamination. The current ways to tackle these issues encompass the aforementioned addition of vitamins and/or trace elements to such PN products before administration, or by aseptic filtration of formulations comprising vitamins and trace elements in order to avoid the impact of heat during terminal heat-sterilization. However, the aseptic filtration of nutrition products is a complex process in case of MCBs and generally means that lipids are not included in such products as the aseptic filtration of lipids or lipid emulsions is difficult. Even if a set of stable formulations has been identified which can overcome the above-mentioned challenges, suitable multi-chamber containers are required that can safely and stably accommodate several formulations, such as five or more, that may have different requirements as to certain gas levels or that may have different volumes and thus may have different requirements as to the chambers' peelable seals with regard to stability and breakability. At the same time, such MCBs must provide for their easy reconstitution before administration.

It is a challenge to provide a MCB with at least five or more chambers for accommodating said complete set of macronutrients and micronutrients for an AIO product, wherein the volume of one, two or more of the chambers will generally be significantly lower than that of the remaining chambers and which still fulfills all requirements of a MCB.

Specifically, the peelable sealing walls must be both stable enough so the walls do not break or start to leak during handling, including filling, sterilization, transport, and storage, and still allow an easy and smooth single-step activation or reconstitution of the bag without the additional risk of incomplete activation. This is specifically challenging due to the combination of chambers having different volumes as the pressure exerted on the peelable seals by the large volume chambers, generally containing the macronutrients, is higher than that of the small volume chambers, generally containing the micronutrients.

In addition, it may be desirable to allow the filling also of a MCB with at least five chambers to be filled from one side only as this significantly simplifies the manufacturing of such MBC and reduces the introduction of potentially weak seals. In such scenario, the five chambers must be arranged in way that they are all accessible from one side of the container through at least five filling tubes, one per chamber, that are arranged in parallel on one side of the container. Accordingly, the at least five chambers in such case must also be arranged parallel to each other.

It is also a challenge to design such MCB in a way that an undesired early mixing between two formulations that could lead to stability issues is avoided. For example, high concentrated glucose or acidic trace element formulations should not be mixed first with the lipid emulsion formulation and/or the vitamin formulation during reconstitution for stability reasons. They should be admixed preferably in one step together with the buffered amino acid solution.

Accordingly, a very careful design of a MCB according to the invention is required to address the above challenges.

The present invention addresses these issues by a careful design of a multi-chamber bag (MCB) having peelably sealing walls within the MCB that allows to include, into one MCB, trace elements and vitamins that so far could not be stabilized in such terminally heat-sterilized, ready-to-use PN products. The MCB and formulations contained therein are designed in a way that they can stably accommodate certain macro- and micronutrients together, in one terminally heat-sterilized MCB, over a prolonged time, and which can be reconstituted following activating the multi-chamber container by rupturing or removing the peelably sealing walls for immediate administration without further manipulation and handling and without loss of the included sensitive vitamins and trace elements.

Unless defined otherwise, all technical and scientific terms used herein have the same meaning as commonly understood by one of ordinary skill in the art to which this invention belongs. As used herein the following terms have the following meanings.

The expression "comprising" or "comprises," as used herein, is intended to mean that the compositions and methods include the recited elements, but not excluding others.

The expression "about," when used before a numerical designation, e.g., temperature, time, amount, dimension and concentration, including range, indicates approximations which may vary by (+) or (−) 10%, 5% or 1%.

As used herein, the expression "nutrient" refers to a substance used by an organism, such as a human, to survive, grow, and reproduce. Some nutrients can be metabolically converted to smaller molecules in the process of releasing energy, such as carbohydrates and lipids. All organisms require water. Essential nutrients for animals and humans are the energy sources, some of the amino acids that are combined to create proteins, a subset of fatty acids, vitamins, and certain minerals and trace elements.

A classification used primarily to describe nutrient needs of humans and animals divides nutrients into "macronutrients" and "micronutrients". Consumed in relatively large amounts, macronutrients are used primarily to generate energy or to incorporate them into tissues for growth and repair. Specifically, the expression "macronutrient" or "macronutrients" refers to nutrients comprising carbohydrates, amino acids, and lipids.

"Micronutrients" are essential elements required by humans in small quantities throughout life for a range of physiological functions to maintain health. In the context of the present invention, the expression "micronutrients" refers to vitamins and trace elements. In the context of the invention, trace elements may be provided, for example, as chloride or sodium salts, as gluconates or sulfates.

The expression "carbohydrates" generally refers to the group of compounds including sugars, starches, and cellulose. In the context of the present invention, the expression refers to carbohydrates that can be used in formulations for parenteral nutrition, specifically to glucose, fructose and xylitol. It especially refers to glucose (D-glucose or dextrose). The expression is interchangeably used with the expression "saccharide(s)".

The expression "amino acids" as used herein, refers to amino acids as well as to dipeptides and oligopeptides, and encompasses, for example, alanine (Ala), arginine (Arg), aspartic acid (Asp), glutamic acid (Glu), glutamine (Gln), glycine (Gly), histidine (His), leucine (Leu), isoleucine (Ile), lysine (Lys), methionine (Met), phenylalanine (Phe), proline (Pro), serine (Ser), threonine (Thr), tryptophan (Trp), tyrosine (Tyr), valine (Val), cysteine (Cys), ornithine (Orn), acetyl-tyrosine (Ac-Tyr), Acetyl-cysteine (Ac-Cys), taurine, asparagine (Asn), alanyl-glutamine (Ala-Gln), glycyl-glutamine (Gly-Gln), alanyltyrosine (Ala-Tyr) and glycyl-tyrosine (Gly-Tyr).

The expression "lipids" (or, as interchangeably used herein, the expression "fats") refers to sources of fatty acids (FA) that can be used for parenteral nutrition. Lipids consist of triglycerides (TGs), and phospholipids. TGs constitute molecules of glycerol to which three fatty acids (FAs) have been esterified. FAs are an important component of lipid emulsions that can be used for providing lipids to a patient intravenously. FAs are classified based on several characteristics including the carbon chain length, degree of unsaturation, and location of the first double bond. Short chain FAs (SCFAs) have 2-4 carbons, medium chain FAs (MCFAs) have 6-12 carbons, while long chain FAs (LCFAs) have more than or equal to 14 carbons. Saturated FAs have no double bonds, monounsaturated FAs (MUFAs) have one double bond, and polyunsaturated FAs (PUFAs) have two or more double bonds. Saturated lipids can be sub-classified into short chain, medium chain, and long chain lipids whereas mono- and polyunsaturated lipids are all long chain lipids.

The expression "home parenteral nutrition" as used herein means nutrition support of patients who cannot meet their nutritional requirement by oral or enteral intake, and who are able to receive therapy outside the hospital setting. HPN is the primary life-saving therapy for patients with, for example, chronic intestinal failure (CIF). HPN may also be provided as palliative nutrition to patients in late phases of end-stage diseases, including cancer (Pironi et al.: ESPEN guideline on home parenteral nutrition. Clinical Nutrition (2020), 39:1645-1666).

The expression "total parenteral nutrition (TPN)" refers to parenteral nutrition that provides all daily nutritional requirements intravenously to patients who cannot otherwise ingest and/or digest nutrition. TPN can be a short-term or long-term nutritional therapy. "Partial parenteral nutrition (PPN)" refers to parenteral nutrition to patients whose nutritional requirements cannot be fully met via the enteral or oral route. TPN and PPN can be provided to hospitalized patients, including patients in intensive care, but also to home parenteral patients, to avoid malnutrition.

The expression "terminally sterilized" means that such products must have a probability of nonsterile unit (PNSU) or a sterility assurance level (SAL) of not more than one in a million units produced, in accordance with the guidelines in Europe and the United States. SAL has been defined by European Pharmacopoeia in such a way that its numerical value is the same of PNSU. Accordingly, a SAL or PNSU of $10^{-6}$ indicates that the probability of an organism surviving to the end of the sterilization process in any single unit of product is less than one in one million. The proof that a terminally sterilized product complies with the $10^{-6}$ SAL/PNSU can be accomplished by several different sterilization cycle development approaches. The proper application of this method requires extensive scientific knowledge regarding the sterilization method selected for use with a specific product. Further background information is provided, for example, in von Woedtke and Kramer, GMS KHI (2008), 3(3), 1-10 (ISSN 1863-5245). The expression "sterility" or "sterile" means the absence of all viable microorganisms including viruses. The expression "terminal heat-sterilization" means that terminal sterilization is achieved by subjecting the product to be sterilized to heat.

As used herein, the expression "reconstituted solution" as used herein refers to a solution for parenteral administration which is generated by admixing the content of the chambers of a multi-chamber container before use. Generally, all chambers or compartments are admixed for reconstituting a multi-chamber bag. However, it is also possible to provide MCBs that support the selective activation of the peelable seals to permit the admixing of less than all of the separately stored components. The resulting solution, e.g. in case at least one of the compartments of the MCB is not activated, such as, for example, the chamber comprising the lipid emulsion, would still be considered a "reconstituted solution" according to the invention.

As used herein, the expression "multi-chamber bag (MCB)" which is interchangeably used herein with the expression "multi-chamber container", refers to containers or bags made from a flexible film material and which are compartmentalized into two or more chambers. They allow for the safe and stable accommodation of medical solutions that must be kept separate until the formulations can be mixed (reconstituted) shortly before their administration to a patient to avoid inevitable reactions between the formulations. Therefore, MCBs have peelable seals or welds (e.g., removable thermo-welds) between the chambers to be reconstituted. The weld or seals can be opened, for example, by squeezing.

As used herein, the expression "peelable" or "peelably" refers to the property of sealing walls within the MCBs of the present invention being removable by an external force such as thermal or physical force (e.g., rolling the top edge of the MCBs). Unlike permanently welding or sealing walls, peelably sealing walls can be ruptured by applying pressure on the container chambers (rolling the container or pressing on one of the chambers). However, strength of the peelably sealing walls of the present invention should be high enough for production and transport and still low enough to easily open the bag.

In one embodiment, rolling the flexible multi-chamber bag from the top edge would be enough to allow the complete opening of the peelably sealing walls and complete mixing the five chamber contents, thus activating the ready-to-use, all-in-one parenteral nutrition product.

The expression "complete opening" or "complete activation" as used herein refers to the opening of the peelable seals which is sufficient for the complete mixing of the formulations contained in the MCB. In other words, a "complete opening" or "complete activation" is achieved even if some parts of the peelable seals are still closed as long as they are no obstacle to the said complete mixing of the formulations contained in the MCB. The expression "incomplete opening" or "incomplete activation" accordingly refers to an opening or non-opening of at least some peelable seals that is not sufficient for or does not allow the complete mixing of all formulations or the non-mixing of at least some formulations contained in the respective chambers of the MCB.

As used herein, the expression "non-peelable" or "non-peelably" refers to the property of sealing walls at the top edge, at the bottom edge, at the left edge and at the right edge of the flexible multi-chamber bag being permanently sealed and welded, which is not removable during the activation of the ready-to-use, all-in-one parenteral nutrition product.

The expression "peelable seals," "peelably heat-sealed welds," or "peelably sealing walls" is used interchangeably, referring to sealing walls within the MCBs of the present invention. The peelably sealing walls of the present invention can be ruptured or removed by applying pressure/force on the MCBs (e.g., rolling the MCBs or pressing on one of the chambers of the MCBs). However, strength of the peelably sealing walls of the present invention should be high enough for production and transport and still low enough to easily be ruptured or removed.

The expression "adult(s)" or "adult patient(s)" as used herein refers to persons of 19 years of age and older. The expression "pediatric" as used herein refers to neonates, including premature (pre-term), full term, and post-mature neonates of up to (and including) 5 months of age; infants of between six month and of up to (and including) 24 months of age; children of between 2 years and of up to (and including) 12 years of age, and adolescents of between 13 and up to (and including) 18 years of age.

The expression "stable" or "stably" as used herein in connection with components contained in the terminally heat-sterilized MCB of the invention (e.g., vitamin or trace element formulations) means that at least 50%, at least 60%, at least 70% or at least 80% of the amount of such component initially provided in the product is still available after terminal heat-sterilization and storage of the terminally heat-sterilized multi-chamber bag of the invention for at least 6 months, preferably for at least 12 months, and more preferably for at least 18 months and even more preferably for at least 24 months at a temperature of from 1° C. to 40° C., such as at temperatures of from 1° C. to 25° C. The expression "stable" or "stably" as used herein in connection with the multi-chamber bag and its peelable and non-peelable seals means that the seals at the edges of the MCB, that are non-peelable do not rupture or cause any leakage throughout the production and use of the container. It equally refers to the peelable seals, which are required to not break or show any leakage during filling, sealing, sterilization, transport, and storage and which shall open only upon applying targeted pressure on the bag for reconstituting the contained formulations. Accordingly, no premature mixing or leaking between one or more chambers must occur before such reconstitution.

The term "dissolved oxygen" (DO) refers to the level of free, non-compound oxygen present in water or other liquids or solutions, such as solutions for parenteral nutrition. Oxygen saturation (symbol SO2) is a relative measure of the concentration of oxygen that is dissolved or contained in a given medium as a proportion of the maximal concentration that can be dissolved in that medium. It can be measured with a dissolved oxygen probe such as an oxygen sensor or an optode in liquid media, usually water.

The present disclosure provides for a multi-chamber bag which addresses the above problems, thereby allowing accommodating several formulations comprising vitamins and trace elements together with all macronutrients, i.e. lipids, carbohydrates and amino acids, in one multi-chamber bag by providing for at least five chambers. For example, multi-chamber bags as disclosed herein can accommodate a carbohydrate formulation in a first chamber, an amino acid formulation in a second chamber, a lipid formulation in a third chamber, a trace element formulation in a fourth chamber and a vitamin formulation in a fifth chamber.

In one aspect, the present invention relates to a flexible multi-chamber bag for storing and reconstituting parenteral nutrition solutions. Specifically, the flexible multi-chamber bag comprises at least five chambers separated by peelably sealing walls between the at least five chambers. Once activated (e.g., by physical force), the peelably sealing walls can be removed or ruptured and the contents from the at least five chambers can be mixed to form a single solution in one chamber.

In one preferred embodiment, the flexible multi-chamber bag comprises at least a first chamber, a second chamber, a third chamber, a fourth chamber and a fifth chamber. Preferably, the flexible multi-chamber bag comprises at least five chambers which accommodate a carbohydrate formulation in a first chamber, an amino acid formulation in a second chamber, a lipid formulation in a third chamber, a trace element formulation in a fourth chamber and a vitamin formulation in a fifth chamber.

In one embodiment, the flexible MCBs of the present invention are made by circumferentially welding two polymer films (e.g., foils) at the edges with non-peelable sealing walls and furthermore containing peelably sealing walls within the MCBs to separate one single bag into at least five chambers.

In one embodiment, the flexible multi-chamber bag comprises peelable sealing walls separating the multi-chambers for storing and reconstituting parenteral nutrition solutions once the peelable sealing walls are ruptured or removed. The flexible multi-chamber bag comprises: two polymer films edge-sealed to form a first bag having a top edge, a bottom edge, a left edge and a right edge, wherein the top edge, the bottom edge, the left edge and the right edge are non-peelably sealed; a plurality of tubes with sidewalls non-peelably sealed between the two polymer films at the bottom edge or the top edge to form a first plurality of port tubes; two first peelable sealing walls between the two polymer films extending from the top edge to the bottom edge and separating the first bag into a first chamber, a second chamber and a third chamber, wherein the first chamber is between the second chamber and the third chamber; and at least one of the two first peelable sealing walls split into a second plurality of second peelable sealing walls and the second plurality of the second sealing walls sealed to the bottom edge to form at least a fourth chamber.

Referring now to FIG. 1 (FIG. 1*a* and FIG. 1B), exemplary designs of the multi-chamber bags (MCBs) according to the invention are shown and the MCBs comprise five chambers which contain a carbohydrate formulation in the second chamber (2), an amino acid formulation in the first chamber (1), a lipid formulation in a third chamber (3), a trace element formulation in a fifth chamber (5) and a vitamin formulation in a fourth chamber (4).

As shown in FIG. 1*a*, the flexible multi-chamber bag 100 comprises two polymer films edge-sealed or welded to form a first bag having a front surface 111 and a back surface (not shown), a top edge 101, a bottom edge 102, a left edge 103 and a right edge 104. In one embodiment, the top edge 101, the bottom edge 102, the left edge 103 and the right edge 104 are permanently sealed or welded. In one preferred embodiment, the top edge 101, the bottom edge 102, the left edge 103 and the right edge 104 are non-peelably sealed or welded. Specifically, the top edge 101, the bottom edge 102, the left edge 103 and the right edge 104 cannot be ruptured or open during the use of the flexible multi-chamber bag 100, especially during activation of the flexible multi-chamber bag 100.

The flexible multi-chamber bag 100 comprises a handle or hanger 112 having both ends connected to the top edge 101 on the front surface 111. One can use the handle or hanger 112 to handle the flexible multi-chamber bag 100 in a medical setting. For example, one can hang the flexible multi-chamber bag 100 to an administration pole through the handle or hanger 112.

The flexible multi-chamber bag 100 comprises two first peelable sealing walls 105 and 106 between the two polymer films extending from the top edge 101 to the bottom edge 102 and separating the first bag into a first chamber (1), a second chamber (2) and a third chamber (3), wherein the first chamber (1) is between the second chamber (2) and the third chamber (3). In one embodiment, at least one of the two first peelable sealing walls 105 and 106 is split into a second plurality of second peelable sealing walls and the second plurality of the second sealing walls are non-peelably sealed to the bottom edge 102 to form additional chambers.

In one embodiment, both the two first peelable sealing walls 105 and 106 are split into a second plurality of second peelable sealing walls and the second plurality of the second sealing walls are non-peelably sealed to the bottom edge 102 to form additional chambers. In one embodiment, both the two first peelable sealing walls 105 and 106 are split into at least two second peelable sealing walls and the least two second sealing walls are non-peelably sealed to the bottom edge 102 to form at least two additional chambers.

For example, as shown in FIG. 1*a*, both the two first peelable sealing walls 105 and 106 are split into at least two second peelable sealing walls 107 and 108 and the least two second sealing walls 107 and 108 are non-peelably sealed to the bottom edge 102 to form two additional chambers (i.e., the fourth chamber (4) and the fifth chamber (5)) that are arranged in parallel alignment with chambers (1), (2) and (3).

In one embodiment, the two first peelable sealing walls 105 and 106 are split at a location between the top edge 101 and the bottom edge 102 into the two second peelable sealing walls 107 and 108, respectively, and the fourth chamber (4) and the fifth chamber (5) are relatively smaller than the first chamber (1), the second chamber (2), or the third chamber (3).

In one embodiment, each of the first chamber (1), the second chamber (2), the third chamber (3), the fourth chamber (4) and the fifth chamber (5) comprises any of an amino acids solution optionally containing some vitamins or trace elements; a glucose solution optionally containing some vitamins or trace elements; a lipid emulsion optionally containing fat-soluble vitamins; a vitamins solution or emulsion; or a trace elements solution.

In one embodiment, the chamber containing a glucose solution is not in a direct contact with the chamber containing a vitamins solution or emulsion. In one embodiment, smaller chambers contain a vitamins solution or emulsion or a trace elements solution.

For example, when either the third chamber (3) or the second chamber (2) contains a glucose solution, either the fifth chamber (5) or the fourth chamber (4) contains a vitamins solution or emulsion.

In one embodiment, the first chamber (1) contains an amino acids solution optionally containing some vitamins or trace elements. In one embodiment, the second chamber (2) contains a glucose solution optionally containing some vitamins or trace elements. In one embodiment, the third chamber (3) contains a lipid emulsion optionally containing fat-soluble vitamins. In one embodiment, the fourth chamber (4) contains a vitamins solution or emulsion. In one embodiment, the fifth chamber (5) contains a trace elements solution.

In one preferred embodiment, the first chamber (1) contains an amino acids solution, which optionally contains some vitamins and/or trace elements; the second chamber (2) contains a glucose solution, which optionally contains some vitamins and/or trace elements; the third chamber (3) contains a lipid emulsion, which optionally contains fat-soluble vitamins; the fourth chamber (4) contains a vitamins solution or emulsion; and the fifth chamber (5) contains a trace elements solution.

The present MCB (e.g., a five-chamber MCB) can be developed in different sizes to accommodate diverse storage volumes. Table 1 below shows an example of possible volumes.

TABLE 1

Possible volumes for the chambers.

| | The first chamber (1) | The second chamber (2) | The third chamber (3) | The fourth chamber (4) | The fifth chamber (5) |
|---|---|---|---|---|---|
| Format 1 1050 mL | 533 mL | 267 mL | 200 mL | 25 mL | 25 mL |
| Format 2 1550 mL | 800 mL | 400 mL | 300 mL | 25 mL | 25 mL |
| Format 3 2050 mL | 1067 mL | 533 mL | 400 mL | 25 mL | 25 mL |

In one preferred embodiment, the shape and the size of the two small chambers (the fourth chamber (4) and the fifth chamber (5)) are not varying across the different possible five-chamber bag formats. While the large chambers can vary to accommodate different macronutrient doses, the two small chambers will store fixed volumes of trace elements and vitamins solutions, respectively. The concentration of the various trace elements and vitamins may, however, vary.

Figure 1B:
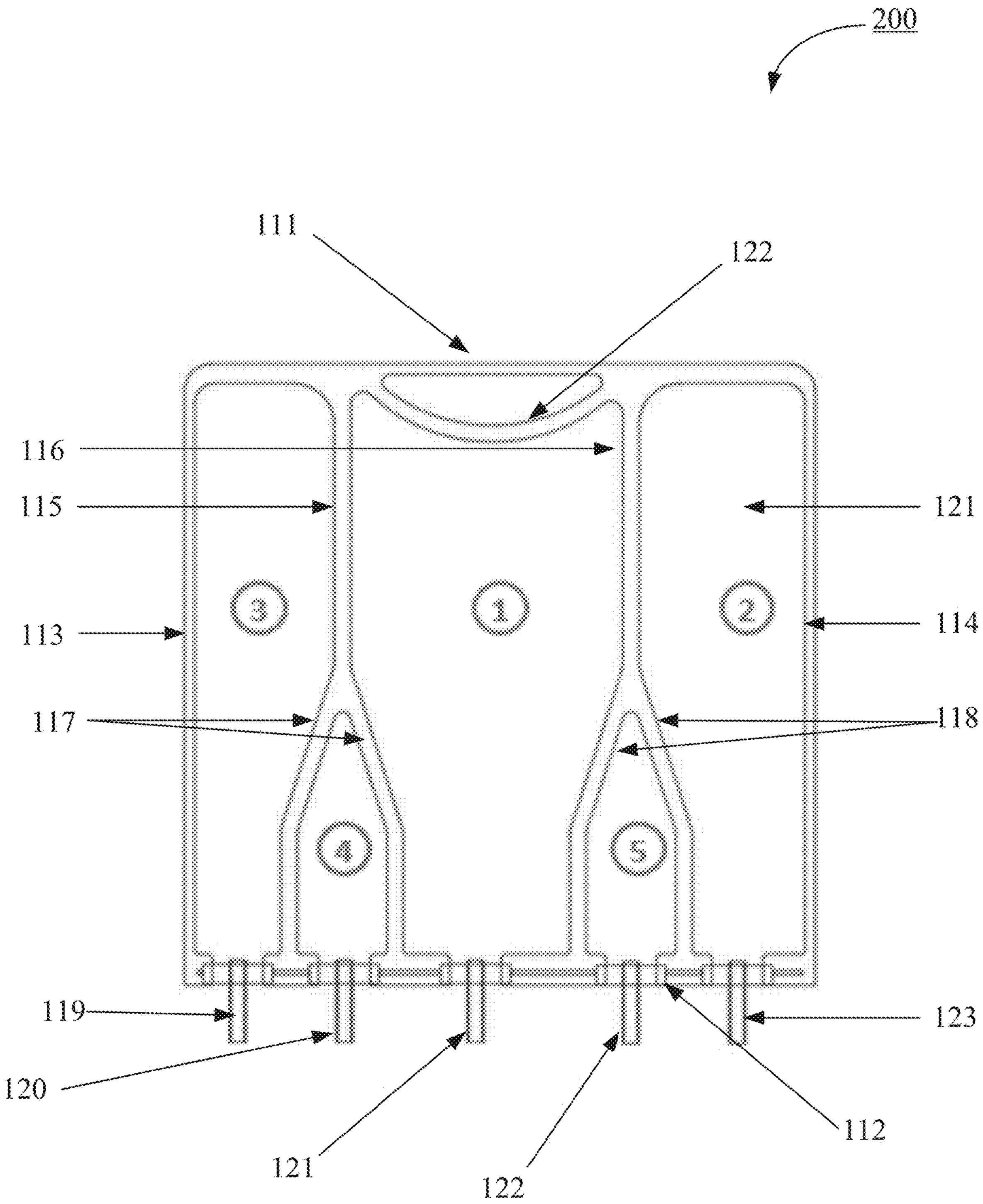

As shown in FIG. 1*b*, the flexible multi-chamber bag 200 comprises a plurality of tubes with sidewalls non-peelably sealed between the two polymer films at the bottom edge 112 to form a first plurality of port tubes 119 to 123. In one embodiment, the contents of the chambers are added through the corresponding port tubes.

In one embodiment, each of the first chamber (1), the second chamber (2), the third chamber (3), the fourth chamber (4) and the fifth chamber (5) is connected to at least one port tube. In one embodiment, only some of the first chamber (1), the second chamber (2), the third chamber (3), the fourth chamber (4) and the fifth chamber (5) are connected to one or more port tubes. In one embodiment, only one of the first chamber (1), the second chamber (2), the third chamber (3), the fourth chamber (4) and the fifth chamber (5) is connected to one or more port tubes. In another embodiment, only the first chamber (1) is connected with one or more port tubes.

FIG. 1*a* shows an example of the present MCB in which only the first chamber (1) is connected with two port tubes 109.

In one embodiment, FIG. 1*a* also represents an example of the MCB according to certain embodiments of the present invention, in which each of the second chamber (2), the third chamber (3), the fourth chamber (4) and the fifth chamber (5) was initially connected to one or more port tubes as shown in FIG. 1B. Parts of the MCBs comprising one or more port tubes for the second chamber (2), the third chamber (3), the fourth chamber (4) and the fifth chamber (5) were later non-peelably sealed to form a new bottom edge 110 and removed from the rest of the MCB to form a funnel shape near the bottom edge 102.

In one embodiment, vitamins are one of the components to be stored in the MCB. Some vitamins are known to be extremely sensitive to oxygen. An oxygen barrier film is therefore required to provide adequate protection to the oxygen-sensitive solution and guarantee stability along with the shelf life as well as during the infusion of the product.

Thus, in one embodiment, the polymer films for making the MCB are designed as barrier films that block oxygen migration outside of the chamber made of a multilayer structure including a barrier layer(s). For example, barrier films may comprise:

- a metalized film layer such as a polyethylene terephthalate PET coated with an inorganic deposit of silicon oxide or aluminum oxide that is laminated to the rest of the film structure;
- a halogenated polyvinylidene layer such as PVDC;
- amorphous nylon or crystalline nylon or combination of both nylons layer;
- a copolymer of ethylene layer such as ethylene-vinyl alcohol copolymer layer (EVOH); and
- a combination of several of the above layer.

FIG. 1*b* shows another example MCB according to certain embodiments of the present invention. As shown in FIG. 1*b*, a flexible multi-chamber bag 200 comprises two polymer films edge-sealed or welded to form a first bag having a front surface 121 and a back surface (not shown), a top edge 111, a bottom edge 112, a left edge 113 and a right edge 114. In one embodiment, the top edge 111, the bottom edge 112, the left edge 113 and the right edge 114 are permanently sealed (i.e., non-peelably sealed) or welded. In one preferred embodiment, the top edge 111, the bottom edge 112, the left edge 113 and the right edge 114 are non-peelably sealed or welded. Specifically, the top edge 111, the bottom edge 112, the left edge 113 and the right edge 114 cannot be ruptured or open during the use of the flexible multi-chamber bag 200, especially during activation of the flexible multi-chamber bag 200.

The flexible multi-chamber bag 200 comprises a handle or hanger 122 having both ends connected to the top edge 111 on the front surface 121 to allow a user to handle the flexible multi-chamber bag 200 in a medical setting. For example, one can hang the flexible multi-chamber bag 200 to an administration pole through the handle or hanger 122.

The flexible multi-chamber bag 200 comprises two first peelable sealing walls 115 and 116 between the two polymer films extending from the top edge 111 to the bottom edge 112 and separating the first bag into a first chamber (1), a second chamber (2) and a third chamber (3), wherein the first chamber (1) is between the second chamber (2) and the third chamber (3). In one embodiment, at least one of the two first peelable sealing walls 115 and 116 is split into a second plurality of second peelably sealing walls 117 and 118 and the second plurality of the second sealing walls 117 and 118 are non-peelably sealed to the bottom edge 112 to form additional chambers.

In one embodiment, both the two first peelable sealing walls 115 and 116 are split into a second plurality of second peelably sealing walls 117 and 118 and the second plurality of the second sealing walls 117 and 118 are non-peelably sealed to the bottom edge 112 to form additional chambers. In one embodiment, both the two first peelable sealing walls 115 and 116 are split into at least two second peelably sealing walls (e.g., 117 and 118) and the least two second sealing walls (e.g., 117 and 118) are non-peelably sealed to the bottom edge 112 to form at least two additional chambers.

For example, as shown in FIG. 1*b*, both the two first peelable sealing walls 115 and 116 are split into at least two second peelable sealing walls 117 and 118 and the least two second sealing walls 117 and 118 are non-peelably sealed to the bottom edge 112 to form two additional chambers (i.e., the fourth chamber (4) and the fifth chamber (5)).

In one embodiment, the two first peelable sealing walls 115 and 116 are split at a location between the top edge 111 and the bottom edge 112. Thus, the fourth chamber (4) and the fifth chamber (5) are relatively smaller than the first chamber (1), the second chamber (2), or the third chamber (3).

As discussed in this disclosure, each of the first chamber (1), the second chamber (2), the third chamber (3), the fourth chamber (4) and the fifth chamber (5) comprises any of an amino acids solution optionally containing some vitamins or trace elements; a glucose solution optionally containing some vitamins or trace elements; a lipid emulsion optionally containing fat-soluble vitamins; a vitamins solution or emulsion; or a trace elements solution.

In one preferred embodiment, the first chamber (1) contains an amino acids solution, which optionally contains some vitamins or trace elements; the second chamber (2) contains a glucose solution, which optionally contains some vitamins or trace elements; the third chamber (3) contains a lipid emulsion, which optionally contains fat-soluble vitamins; the fourth chamber (4) contains a vitamins solution or emulsion; and the fifth chamber (5) contains a trace elements solution.

As shown in FIG. 1*b*, the flexible multi-chamber bag 200 comprises a plurality of tubes with sidewalls non-peelably sealed between the two polymer films at the bottom edge 112 to form a first plurality of port tubes 119-123. In one embodiment, the contents of the chambers were added through the corresponding port tubes.

In one embodiment, each of the first chamber (1), the second chamber (2), the third chamber (3), the fourth chamber (4) and the fifth chamber (5) is connected to at least one port tube. In one embodiment, only some of the first chamber (1), the second chamber (2), the third chamber (3), the fourth chamber (4) and the fifth chamber (5) are connected to one or more port tubes. In one embodiment, only one of the first chamber (1), the second chamber (2), the third chamber (3), the fourth chamber (4) and the fifth chamber (5) is connected to one or more port tubes. In another embodiment, only the first chamber (1) is connected with one or more port tubes.

In one preferred embodiment, only two chambers (e.g., the first chamber (1) and the second chamber (2)) each comprise one port tube. More preferably, the first chamber (1) comprises an administration port and the second chamber (2) comprises a medication port.

In one embodiment, at least one of the chambers comprises more than one port tube. For example, the first chamber (1) may comprise two port tubes. The first chamber (1) may comprise both an administration port and a medication port.

FIG. 1*b* shows an example of the present MCB in which each of the first chamber (1), the second chamber (2), the third chamber (3), the fourth chamber (4) and the fifth chamber (5) is connected to at least one port tube. Specifically, the first chamber (1) is connected to port tube 121; the second chamber (2) is connected to port tube 123; the third chamber (3) is connected to port tube 119; the fourth chamber (4) is connected to port tube 120; and the fifth chamber (5) is connected to port tube 122.

In one embodiment, some of the port tubes (e.g., port tubes 119, 120, 122 and 123) may be removed. For example, parts of the MCBs comprising one or more port tubes (e.g., port tubes 119, 120, 122 and 123) for the second chamber (2), the third chamber (3), the fourth chamber (4) and the fifth chamber (5) may be non-peelably sealed and removed from the rest of the MCB to form a funnel shape near the bottom edge 112. FIG. 1*a* shows an exemplary MCB of FIG. 1*b* after parts of the MCB of FIG. 1B were non-peelably sealed and removed from the rest of the MCB of FIG. 1*b* to form a funnel shape near the bottom edge 112 and to remove non-functional tubes from the MCB for increasing clarity and manageability of the MCB, for avoiding errors in the use of the tubes and ports and for avoiding the risk of the container getting caught on and disrupting other devices such as IV lines.

Figure 1C:
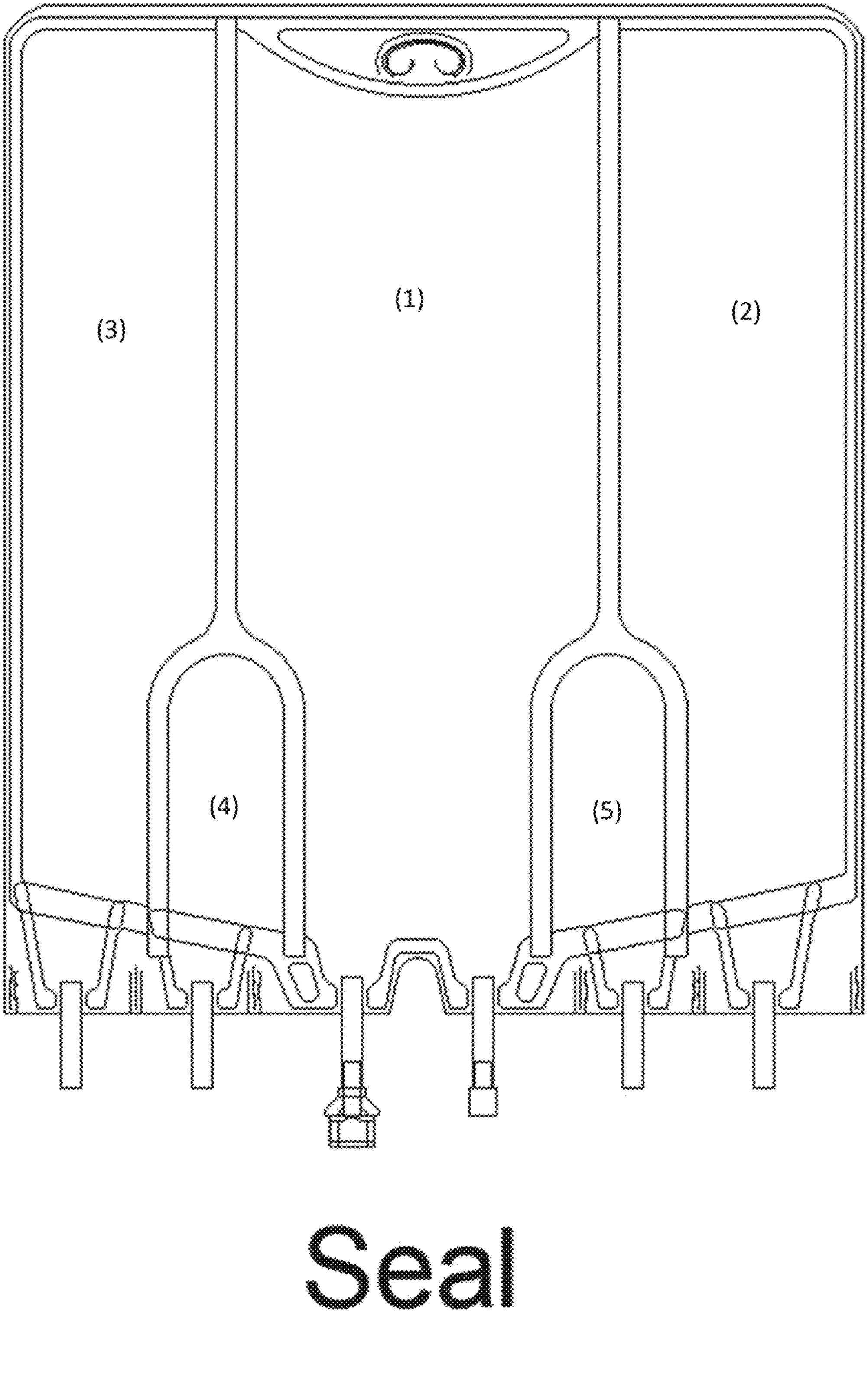
Figure 1D:
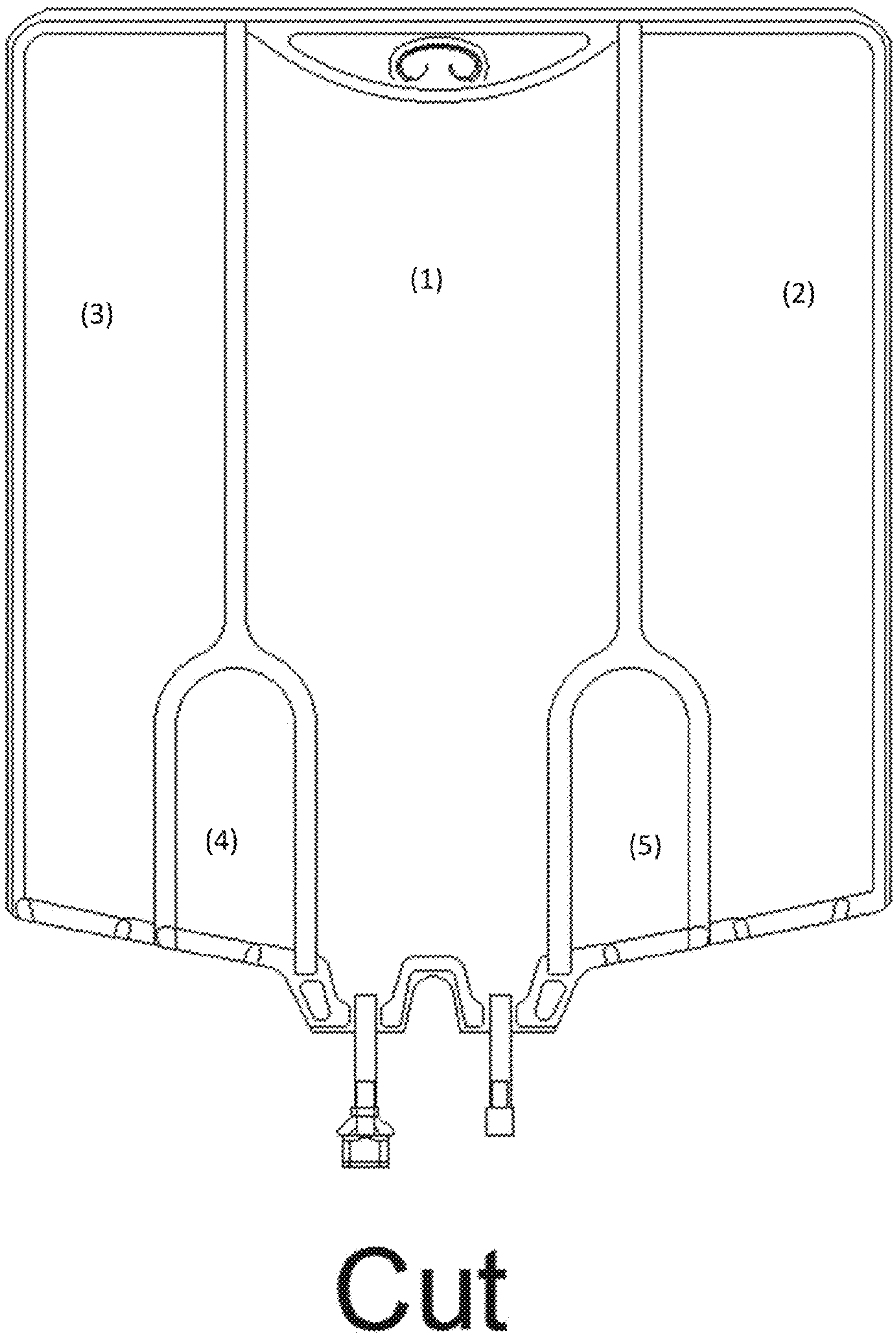

FIG. 2 (including FIG. 2*a*, FIG. 2*b*, FIG. 2*c* and FIG. 2*d*) shows an exemplary manufacturing process of producing the MCB of FIG. 1*d* from the MCB of FIG. 1*c*.

Figure 2A:
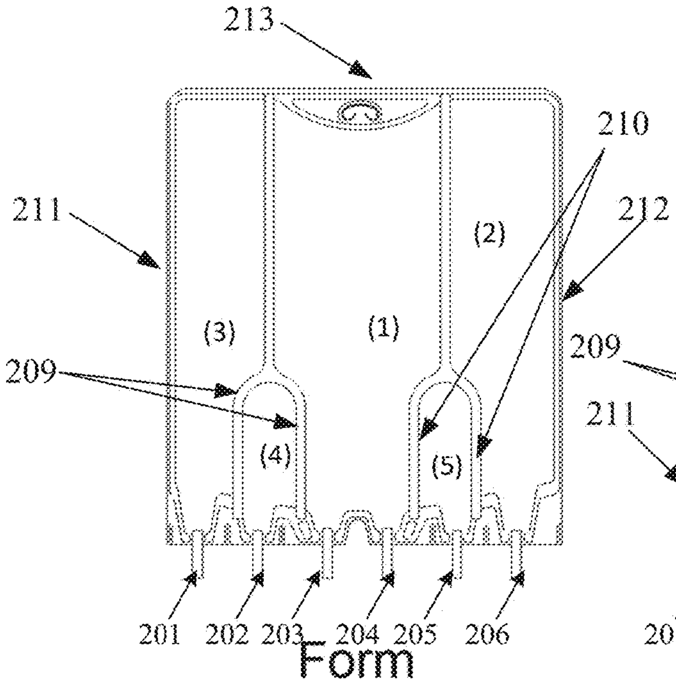
FIG. 2*a* shows the initial form of the MCB.

FIG. 2*a* shows the initial form of the MCB according to certain embodiments of the present invention (e.g., FIG. 1B). As shown in FIG. 2*a*, a flexible MCB comprises peelable sealing walls to separate a single bag into the first chamber (1), the second chamber (2), the third chamber (3), the fourth chamber (4) and the fifth chamber (5). Each of the first chamber (1), the second chamber (2), the third chamber (3), the fourth chamber (4) and the fifth chamber (5) is connected to at least one port tube.

For example, the first chamber (1) is connected to port tubes 203 and 204; the second chamber (2) is connected to port tube 206; the third chamber (3) is connected to port tube 201; the fourth chamber (4) is connected to port tube 202; and the fifth chamber (5) is connected to port tube 205. As shown in FIG. 2*a*, as the first step of the manufacturing process, the port tube 204 of the MCB may be optionally temporarily sealed.

Figure 2B:
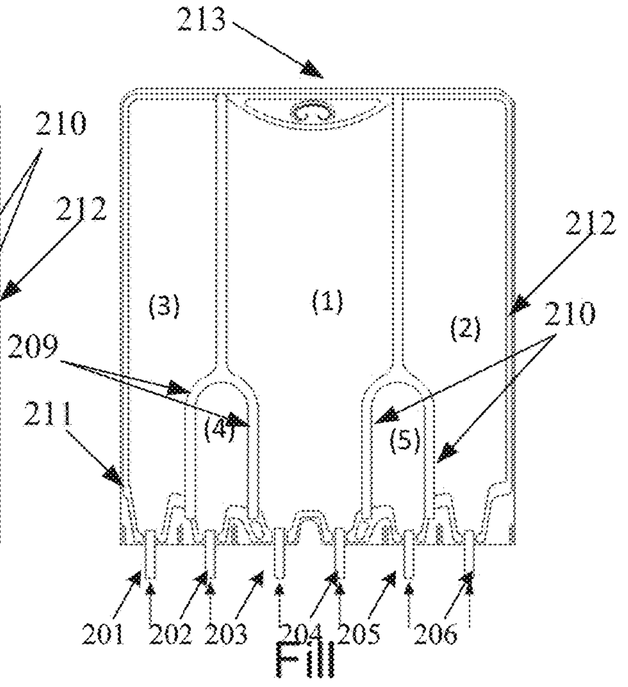
FIG. 2*b* shows the initial form of the MCB which is filled with the corresponding five formulations from one side through filling tubes.

As shown in FIG. 2*b*, the contents are added into the corresponding chambers through the corresponding port tubes. Preferably, an amino acids solution, which optionally contains some vitamins or trace elements, is added into the first chamber (1) through the port tubes 203 and/or 204; a glucose solution, which optionally contains some vitamins or trace elements, is added into the second chamber (2) through the port tube 206; a lipid emulsion, which optionally contains fat-soluble vitamins, is added into the third chamber (3) through the port tube 201; a vitamins solution or emulsion is added into the fourth chamber (4) through the port tube 202; and a trace elements solution is added into the fifth chamber (5) through the port tube 205.

Figure 2C:
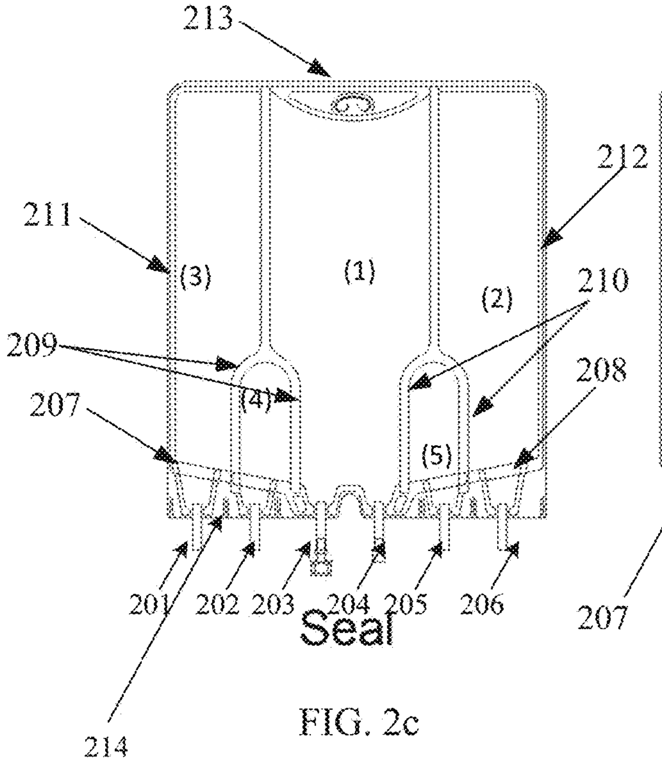
FIG. 2*c* shows the corresponding sealing locations once the initial form of the MCB is filled with the corresponding components.

As shown in FIGS. 2*a* and 2*b*, the later non-peelable seals that lead to the removal of non-functional tubes 201, 202, 205 and 206, are pre-defined by a third plurality of non-peelable seals (e.g., 207 and 208 of FIG. 2*c*) that together form two ascending broken lines starting at the bottom edge of the middle chamber (1) and ending at the outer left (i.e., the location of 207 of FIG. 2*c*) and right (i.e., the location of 208 of FIG. 2*c*) edge of the container. The plurality of non-peelable seals is created by splitting the second plurality of peelable seals (e.g., 209 and 210 in FIGS. 2*a*-2*c*) and the outer non-peelable seals of the container (e.g., 211 and 212 in FIGS. 2*a*-2*c*) into at least two non-peelable sealing walls (i.e., 207 and 208 of FIG. 2*c*), respectively, and the at least two non-peelable sealing walls (i.e., 207 and 208 of FIG. 2*c*) are non-peelably sealed to the bottom edge of the container. As shown in FIG. 2*a*, FIG. 2*b* and FIG. 2*c*, the at least two non-peelable sealing walls (i.e., 207 and 208 of FIGS. 2*c* and 2*d*) are, in their first segment, directed upwards and downwards, respectively, to form the said ascending line, and further extend towards the bottom edge of the container in parallel with the right and left edge.

As shown in FIG. 2*c*, after the contents are added into the chambers through the corresponding port tubes, a first part comprising both the port tube 201 and the port tube 202 is non-peelably sealed from the rest of the MCB along the predefined ascending line (i.e., the non-peelably seal 207), and a second part comprising both the port tube 205 and the port tube 206 is non-peelably sealed along the pre-defined ascending line (i.e., the non-peelably seal 208) from the rest of the MCB. In one embodiment, the first part is selected so that minimal parts of both the third chamber (3) and the fourth chamber (4) are non-peelably sealed from the third chamber (3) and the fourth chamber (4). In one embodiment, the second part is selected so that minimal parts of both the second chamber (2) and the fifth chamber (5) are non-peelably sealed from the second chamber (2) and the fifth chamber (5). In one preferred embodiment, the size of the first chamber (1) is unaffected by the selection of either the first part or the second part.

FIG. 2*c* shows exemplary sealing locations once the initial form of the MCB was filled with the corresponding components.

Figure 2D:
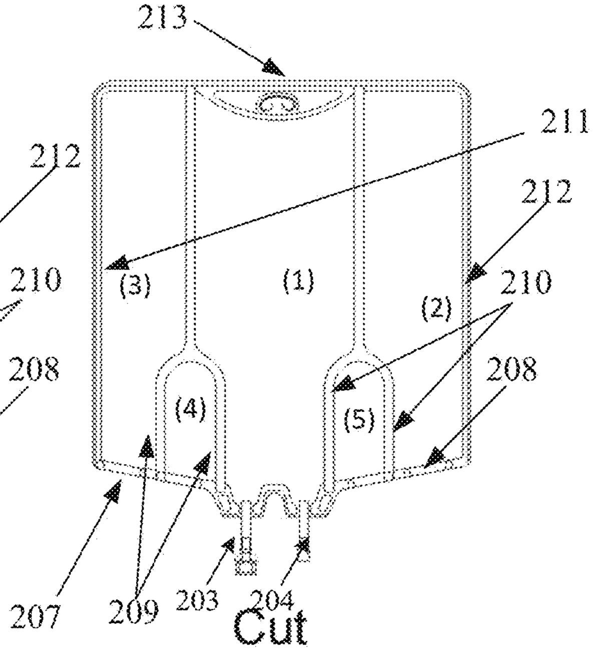
FIG. 2*d* shows the initial form of the MCB cut into the desired form at the sealing locations to arrive at a funnel shape of the overall container, whereby the filling tubes are sacrificed. Only two tubes remain on the final container and form the administration and the medication port. In one embodiment, Chamber (1) includes an amino acids solution containing potentially some vitamins or trace elements; Chamber (2) includes a glucose solution containing potentially some vitamins or trace elements; Chamber (3) includes a lipid emulsion containing potentially fat-soluble vitamins; Chamber (4) includes a vitamins solution or emulsion; and Chamber (5) includes a trace Elements solution. Vitamins are one of the components to be stored in the multi-chamber bag (e.g., in Chamber (4)). The same principal steps can be carried out in case of a MCB such as depicted in FIG. 1*a*. Some vitamins are known to be extremely sensitive to oxygen. An oxygen barrier film is therefore required to provide adequate protection to the oxygen-sensitive solution and guarantee stability along with the shelf life as well as during the infusion of the product. Gas barrier films that block oxygen migration outside of the chamber are made of a multilayer structure including a barrier layer(s), for example: A metalized film layer such as a polyethylene terephthalate PET coated with an inorganic deposit of silicon oxide or aluminum oxide that is laminated to the rest of the film structure; A halogenated polyvinylidene layer such as PVDC; Amorphous nylon or crystalline nylon or combination of both nylons layer; A copolymer of ethylene layer such as ethylene-vinyl alcohol copolymer layer (EVOH); and A combination of several of the above layer.

As shown in FIG. 2*d*, once the first part and the second part are non-peelably sealed from the rest of the MCB, both the first part and the second part are removed by cut from the MCB to form a funnel shape near the bottom edge of the MCB. The resulting MCB comprises only two port tubes of 203 and 204, both of which are connected to the first chamber (1). In one embodiment, one of the port tubes 203 and 204 is an administration port and the other is a medication port.

In one embodiment, a rigid molder closure system (e.g., an access system comprising both an administration port and a medication port) instead of tubes may be preferably used for both an administration port and the medication port of the first chamber (1).

Figure 3:
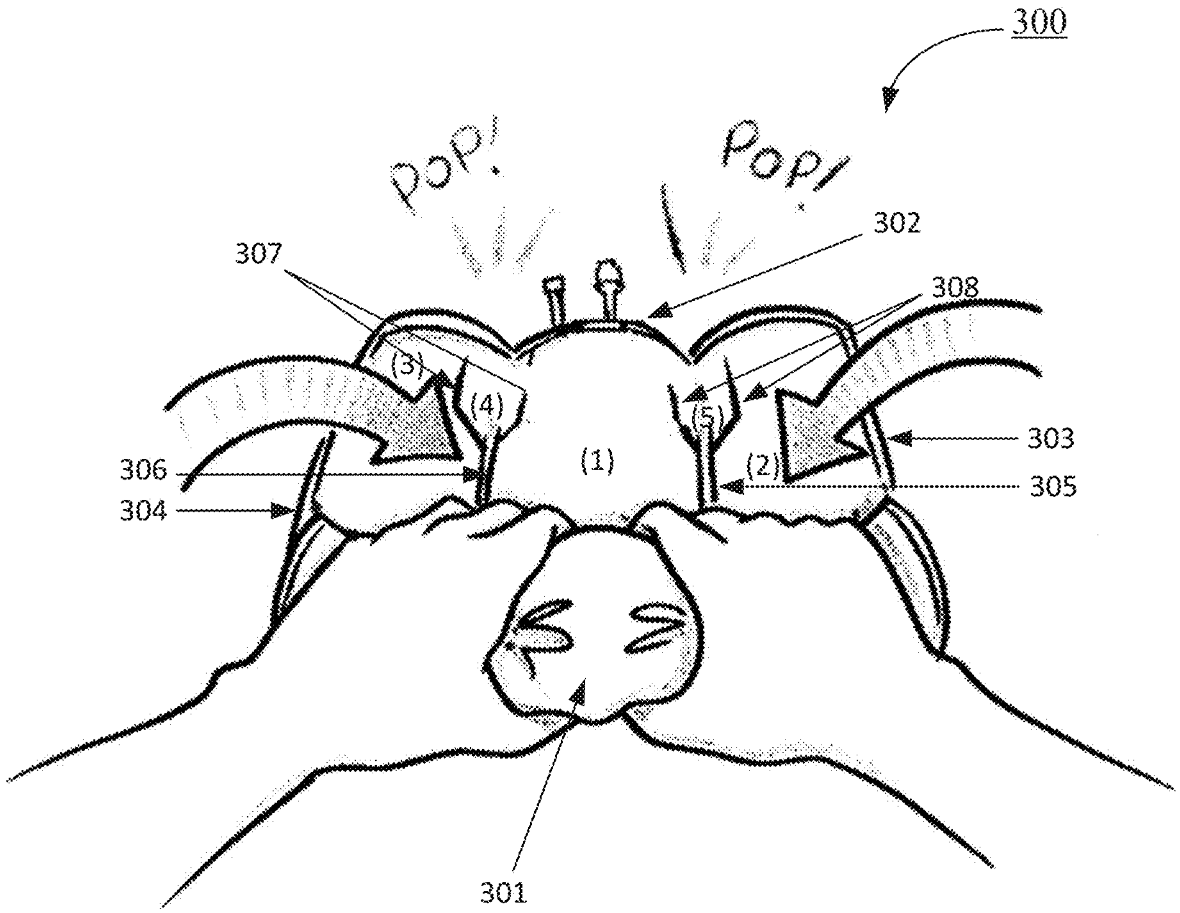
FIG. 3 is a schematic diagram showing that the proposed design of the MCB allows the opening of the five chambers simultaneously, in a mistake-proof way, meaning that the MCB prevents by design the occurrence of incomplete activation of the MCB (for example a partial activation where only 3 or 4 chambers would open at the same time) that would lead to an incomplete therapy. The MCB (e.g., the five-chamber container) proposed with the two smaller chambers (4) and (5) at the bottom and which are located in between and parallel to the larger chambers (1), (2) and (3), respectively, would lead to a single-step activation.

FIG. 3 demonstrates the single step activation of one exemplary MCB 300 according to some embodiments of the present invention.

As shown in FIG. 3, the MCB 300 of the present invention comprising peelably sealing walls (306, 307, 305 and 308) separating the MCB 300 into the first chamber (1), the second chamber (2), the third chamber (3), the fourth chamber (4) and the fifth chamber requires only one single step activation.

In one embodiment, the present MCBs may be activated by physical force. Preferably, the present MCBs may be activated by physical force (e.g., rolling the MCBs from the top edge).

In one embodiment, rolling the MCBs from the top edge would be sufficient to completely open the peelably sealing walls to thus mix the contents from all the chambers.

In one embodiment, the present MCB comprising peelably sealing walls allows the opening of the five chambers simultaneously, in a mistake-proof way. Thus, the present MCBs can prevent by design the occurrence of incomplete activation of the MCBs (for example a partial activation where only 3 or 4 chambers would open at the same time) that would lead to an incomplete therapy or that would lead to an undesirable, premature mixing of two incompatible solutions, e.g., the glucose solution and the vitamins solution, before the opening and mixing with the buffered amino acid solution.

For example, FIG. 3 shows that rolling the MCB 300 from the top edge 301 to the direction of the bottom edge 302 is sufficient to completely open the peelably sealing walls 306, 307, 305 and 308. Thus, the contents of the first chamber (1), the second chamber (2), the third chamber (3), the fourth chamber (4) and the fifth chamber can be mixed by the single step activation into one single solution. The non-peelably sealings of the top edge 301, the bottom edge 302, the left edge 303 and the right edge prevent the mixed solution from leaking outside of the MCB 300.

In one embodiment, the second peelably sealing walls from the splitting of the first peelably sealing walls form a "V" shape for the fourth chamber (4) and/or the fifth chamber (5) toward the bottom edge of the MCB. One of the second peelably sealing wall is connected with a third peelably sealing wall and the other second peelably sealing wall is connected with a fourth peelably sealing wall. Both the third peelably sealing wall and the fourth peelably sealing wall are parallel with the left edge and/or the right edge.

In one embodiment, the two second peelably sealing walls around the splitting point have an angle between 20° and 50°, between 25° and 45°, between 27° and 42°, between 29° and 40°, between 30° and 39°, between 32° and 38°, between 34° and 37°, between 35° and 36.5°, or 36°.

In one embodiment, the first peelably sealing wall and the second peelably sealing wall around the splitting point have an angle between 130° and 180°, between 140° and 176°, between 150° and 171°, between 155° and 169°, between 158° and 167°, between 160° and 165°, between 161° and 163°, or 162°.

In another embodiment, one of the second peelably sealing walls and the fourth peelably sealing wall around their connecting point have an angle between 130° and 180°, between 140° and 176°, between 150° and 171°, between 155° and 169°, between 158° and 167°, between 160° and 165°, between 161° and 163°, or 162°.

Figure 4:
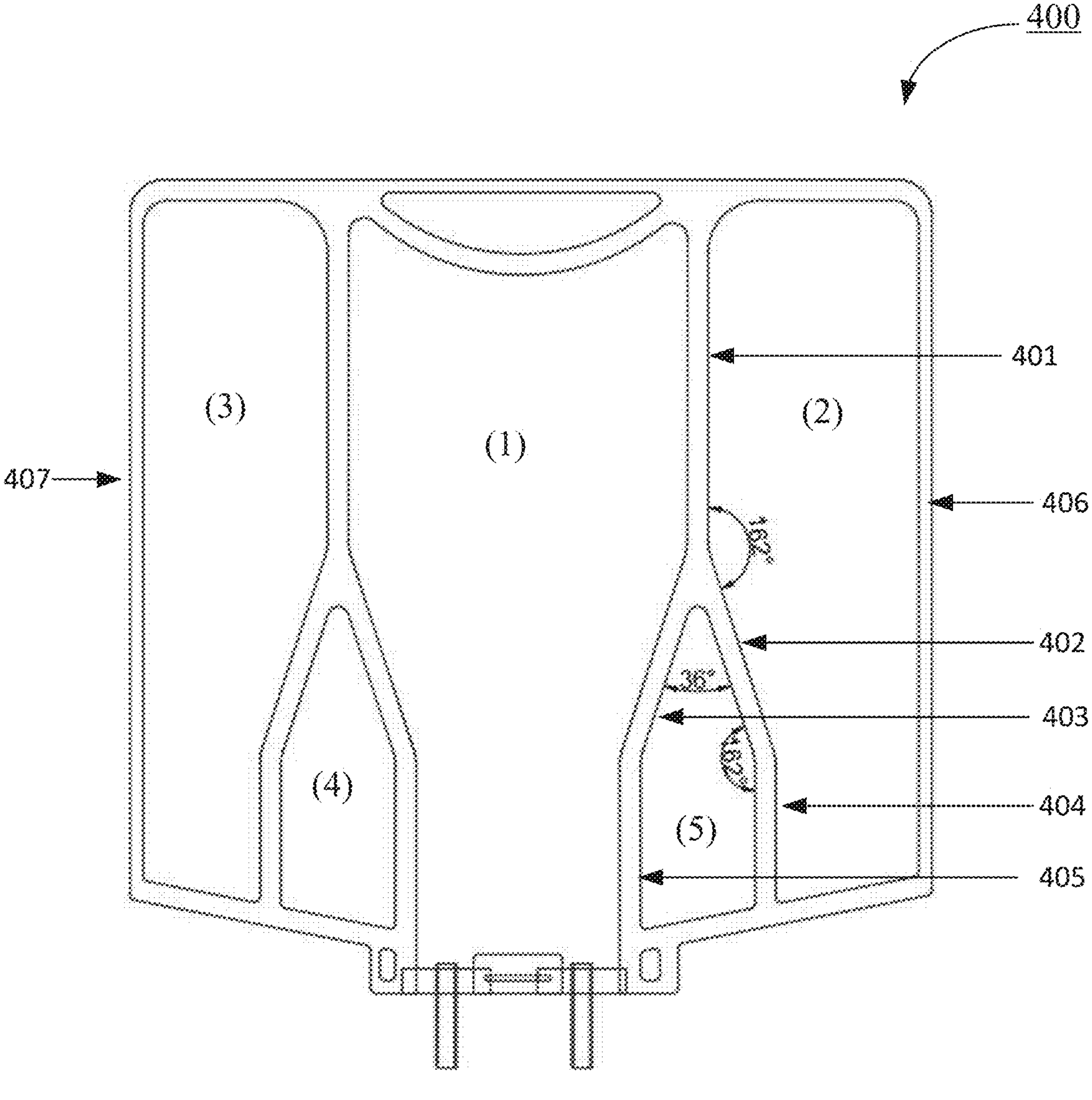
FIG. 4 is a schematic diagram showing a design of the MCB according to some embodiments of the present invention.
Figure 5A:
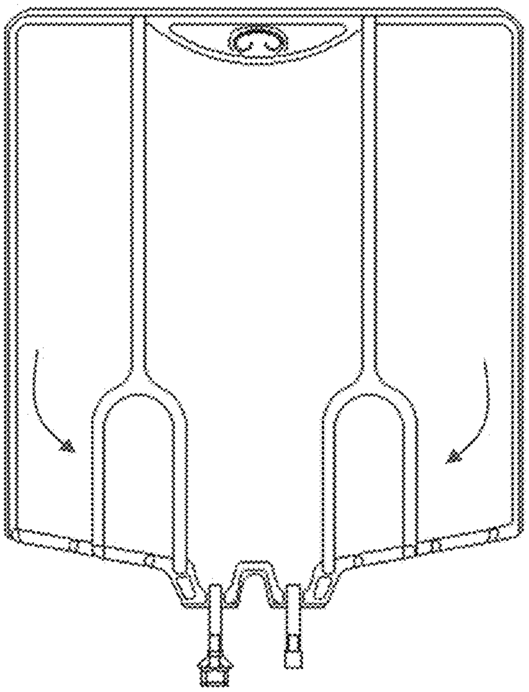
FIG. 5*a* shows that the U shape of the small chambers due to the specific geometry has the advantage to allow opening first towards the sides of the container and then towards the middle chamber decreasing the risk of incomplete opening of the seals upon activation.
Figure 5B:
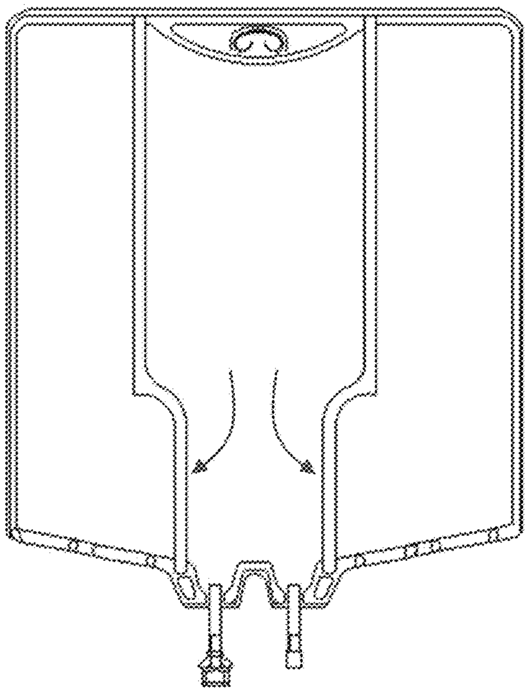
FIG. 5 (including FIG. 5*a*, FIG. 5*b
* and FIG. 5*c* is a set of schematic diagrams showing the opening behavior expected.
Figure 5C:
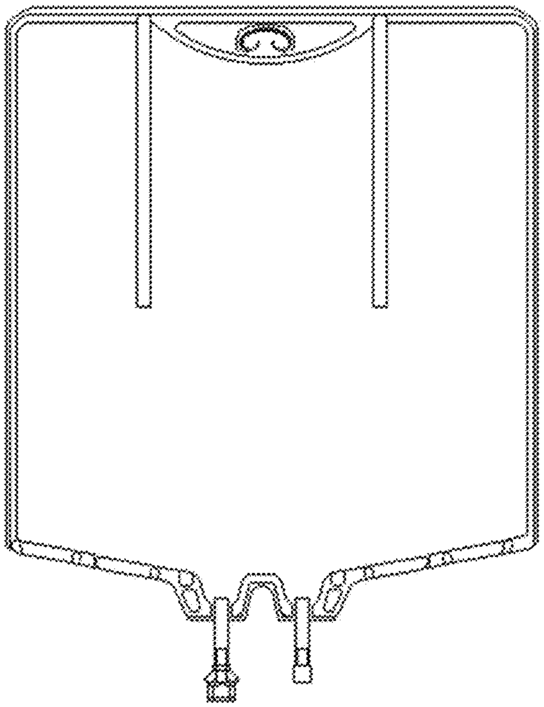

Referring to FIG. 4, a MCB 400 comprising a first peelably sealing wall 401 which is split into the second peelably sealing walls 402 and 403. The second peelably sealing wall 402 is connected with a third peelably sealing wall 405 and the second peelably sealing wall 403 is connected with a fourth peelably sealing wall 404. Both the third peelably sealing wall 405 and the fourth peelably sealing wall 404 are parallel with the left edge 407 and/or the right edge 406.

As shown in FIG. 4, the two second peelably sealing walls 402 and 403 around the splitting point have an angle of 36°. The first peelably sealing wall 401 and the second peelably sealing wall 402 around the splitting point have an angle of 162°. Further, the second peelably sealing wall 402 and the fourth peelably sealing wall 404 around their connecting point have an angle of 162°.

In one embodiment, the "V" shape design of the MCBs provides the advantage to allow smooth propagation of the force from the above rupture zone decreasing the risk of burst upon activation. Specifically, the V shapes of the small chamber in the four chamber MCB have the advantage to allow smooth propagation of the force from the above rupture zone decreasing the risk of burst upon activation. At the same time, the peelable seals separating the smaller chambers from the larger chambers are stable during filling, sterilization, transport, and storage of the multi-chamber bag and prevent leakages or premature opening of the peelable seals.

In one embodiment, the shapes and sizes of the smaller chambers (the fourth chamber (4) and the fifth chamber (5)) may be further designed.

It is noted that there is a balance between stability of the peelably sealing walls surrounding the small chambers (e.g., the fourth chamber (4) and the fifth chamber (5)) versus an easy and complete opening and activation process during reconstitution. Either the peelably sealing walls were fine for the smooth opening and activation but for the price of increased risk of premature opening of the peelable seal, or there were no premature opening of the peelable seal but it was difficult to reconstitute the MCB.

In one embodiment, the above balance may be addressed by carefully designing the geometrical shape of small chambers of the MCB (e.g., the fourth chamber (4) and the fifth chamber (5)).

For example, the "V" shape design of the small chambers (e.g., the fourth chamber (4) and the fifth chamber (5)) as disclosed herein allows for the desired stability of the seals versus easy and complete reconstitution. Thus, the "V" shape design with the specific range of the related angles of the small chambers has the advantage of smooth propagation of the force from the above rupture zone decreasing the risk of burst upon activation.

In another embodiment, other geometry shapes of the small chambers may be used. In one embodiment, at least one of the fourth chamber (4) and the fifth chamber (5) can have a "U" shape in which the second peelably sealing walls form a hemispherical shape around the splitting point.

Figure 8:
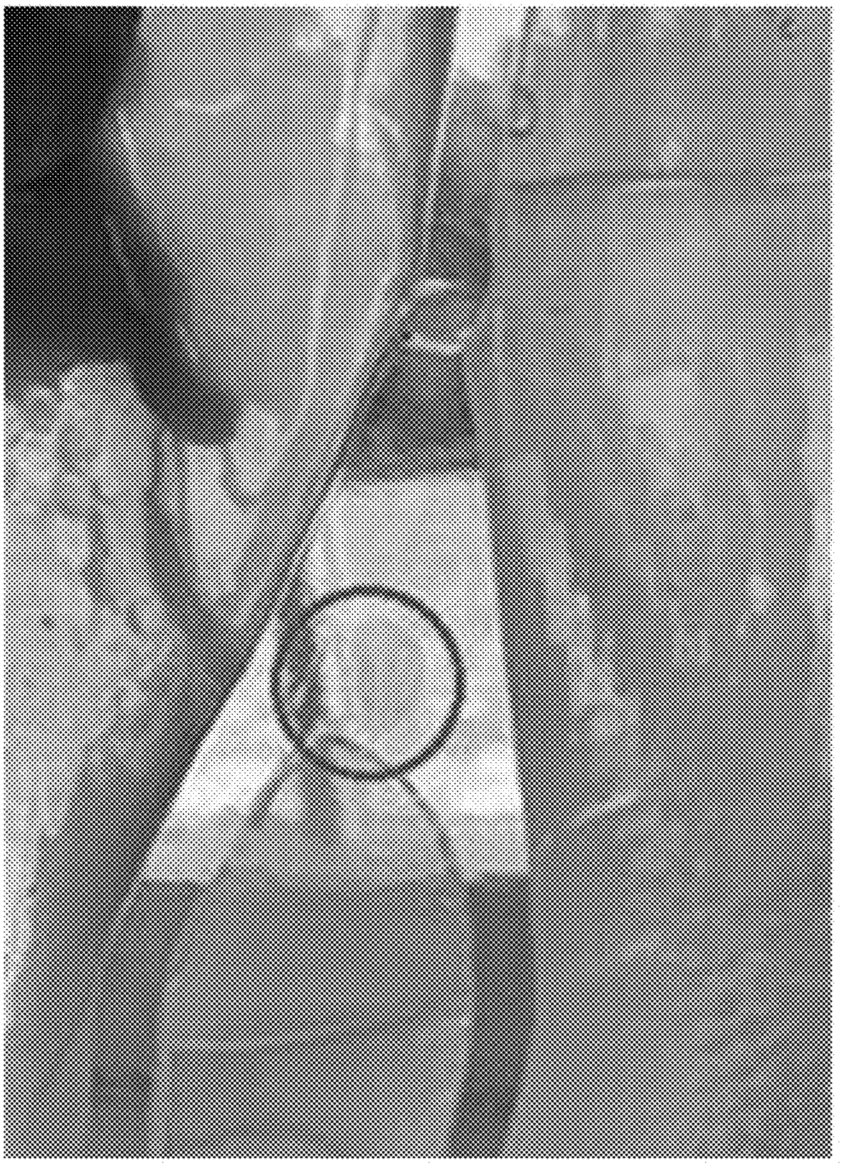
FIG. 8 is a picture of an exemplary MCB with a "V" shape design of the small chambers showing a sticking zone on V-shape designs after sterilization. Because of the sharp angle in the small compartment of the V option, it was found that the two film plies are sometimes sealing together during sterilization. It is therefore recommendable to reshape the compartment as an "U".

In one embodiment, due to the sharp angle in the small chambers (e.g., the fourth chamber (4) and the fifth chamber (5)) of the "V" shape design, it was found that the two polymer film plies are sometimes sealing together during sterilization (See FIG. 8). In one embodiment, the "U" shape design of the present invention can overcome the above issue.

Figure 6A:
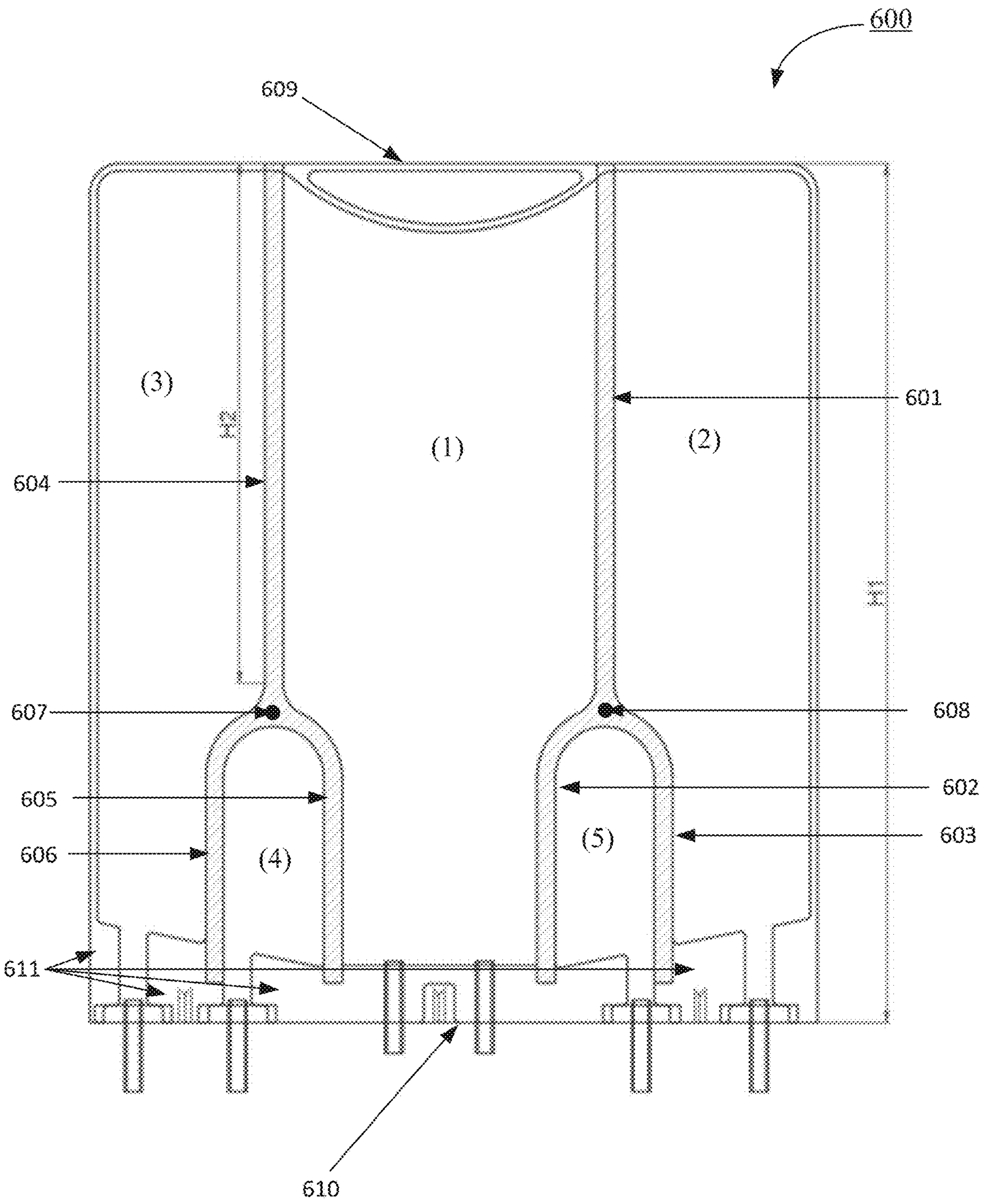
FIG. 6 (including FIG. 6*a* and FIG. 6*b*) is a schematic diagram showing H1 and H2 on U-shape design according to some embodiments of the claimed invention. This design applies U-shaped chambers 4 and 5 for small volumes. Compared to a V-shape design as shown, for example in FIG. 1*a*, FIG. 1*b* or FIG. 4, the total volumes of the final MCB are not changed, which can be, for example, 650 mL; 1.0 L; 1.5 L; or 2.0 L). The breadth of the MCBs is not affected by the shape of the small chambers either. Also, peel seals and port tubes positions are identical in the embodiments shown herein. Only the height of the bags may be varying. Accordingly, the two smaller chambers having a U-shape design and may contain, for example, vitamins and/or trace elements solutions, have the same surface area (e.g. about 35 to 50 $cm^2$) and are providing for the same volumes (e.g., about 10 to 25 mL per chamber) as the V-shaped chambers. Consequently, solely the peel seals height above the separation defining the small chambers is varying. Peel seals have an unchanged width of about 8 mm as peripheral seals (also called main seals) which are fixed at about 3.2 mm.
FIG. 6*b* shows the version FIG. 6*a* after the cut design with only administration/medication ports.
Figure 6B:
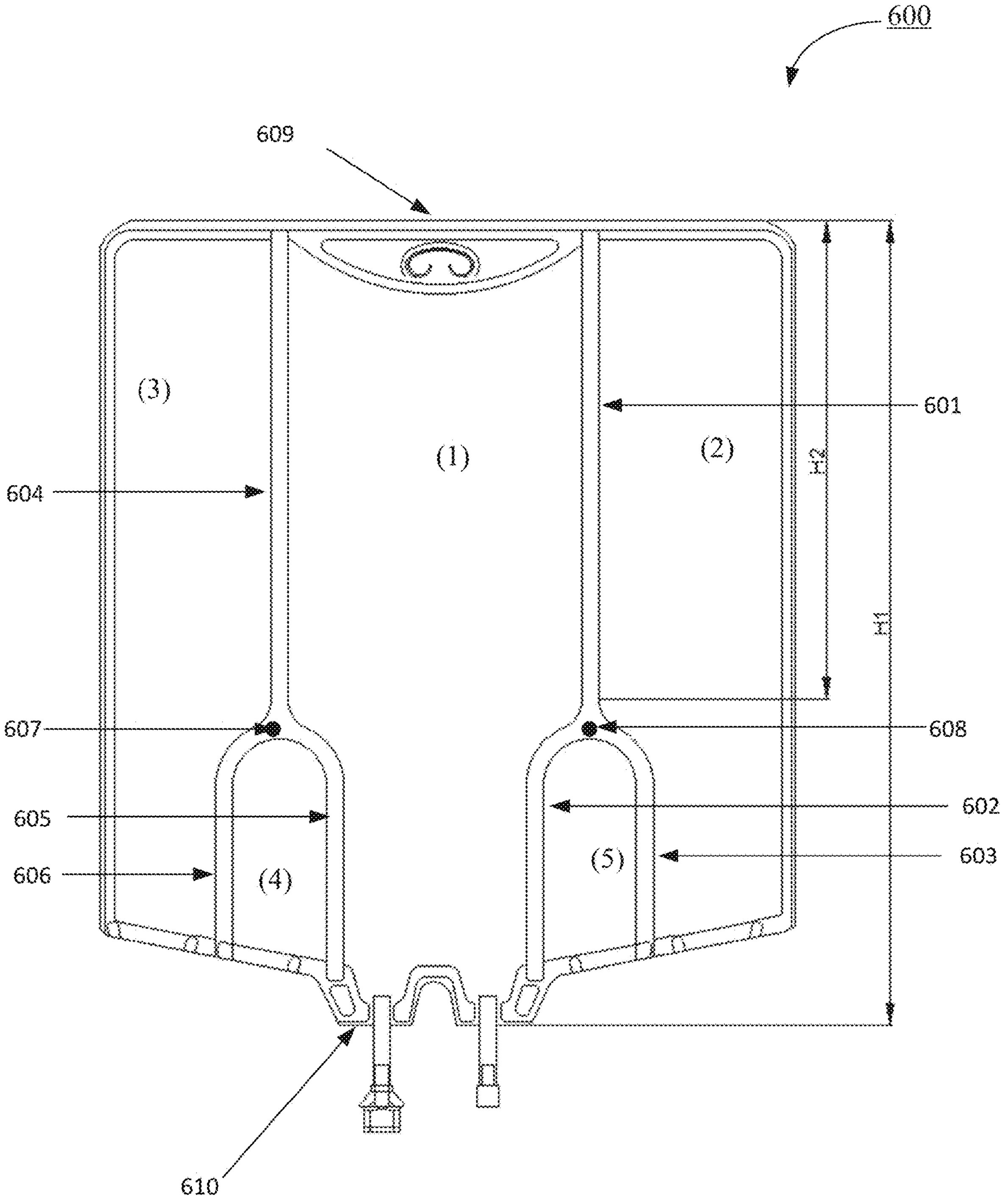

Referring now to FIG. 6 (FIG. 6*a*; FIG. 6*b* (the cut design version of FIG. 6*a*)), an exemplary U-shape design according to some embodiments of the claimed invention is shown. As shown in FIG. 6*a* and FIG. 6*b*, a flexible MCB 600 comprises first peelably sealing walls 601 and 604, both of which at the splitting points 608 and 607 are splitting into second peelably sealing walls 602 and 603, second peelably sealing walls 605 and 606, respectively. The second peelably sealing walls 602 and 603 form a hemispherical shape around the splitting point 608 and further extend to form the fifth chamber (5). The second peelably sealing walls 605 and 606 form a hemispherical shape around the splitting point 607 and further extend to form the fourth chamber (4). As shown in FIG. 6*a* and FIG. 6*b*, both the fourth chamber (4) and the fifth chamber (5) have a "U" shape.

In one embodiment, the first peelably sealing wall 601 and the second peelably sealing walls 602 and 603 extend from the top edge 609 to the bottom edge 610. The first peelably sealing wall 604 and the second peelably sealing walls 605 and 606 extend from the top edge 609 to the bottom edge 610.

In one embodiment, the MCB of the present invention comprises additional non-peelably sealing walls 611 at the bottom edge. In one embodiment, the second peelably sealing walls 602 and 603 extend to the additional non-peelably sealing walls 611 to form the fifth chamber (5). The second peelably sealing walls 605 and 606 extend to the additional non-peelably sealing walls 611 to form the fourth chamber (4).

FIG. 6 shows an exemplary five-chamber U-shape bag according to certain embodiments of the invention. Example 1 shows exemplary sizes of the present MCB. The sizes can be varied as understood by the skilled in the art. Further, the positions of the peelably sealing walls and port tubes can also be varied as understood by the skilled in the art.

Referring to FIG. 7 (including FIG. 7*a* and FIG. 7*b*), a set of schematic diagrams showing reshaping of peelably seal walls from a "V" shape (FIG. 7*a*) into a "U"-shape (FIG. 7*b*) is shown. FIG. 7*a* shows the "V"-shape of the small chambers (i.e., the fourth chamber (4) and the fifth chamber (5)). FIG. 7*b* shows the "U"-shape of the small chambers (i.e., the fourth chamber (4) and the fifth chamber (5)). FIG. 7*a* and FIG. 7*b* also indicate the pre-defined sealing at cutting line for removing tubes needed only for filling and for generating a funnel-shaped container.

In one embodiment, to preserve surface to volume ratio of each chamber, the width of the small chambers (i.e., the fourth chamber (4) and the fifth chamber (5)) is unchanged between the "V" shape design and the "U"-shape.

FIG. 8 is a picture of an exemplary MCB with a "V" shape design showing a sticking zone on "V" shape designs that may in some cases occur after sterilization. Because of the sharp angle in the small compartment of the "V" shape design, it was observed that the two polymer film plies were sometimes sealing together during the sterilization. The "U" shape design in this disclosure can overcome this issue.

Figure 9A:
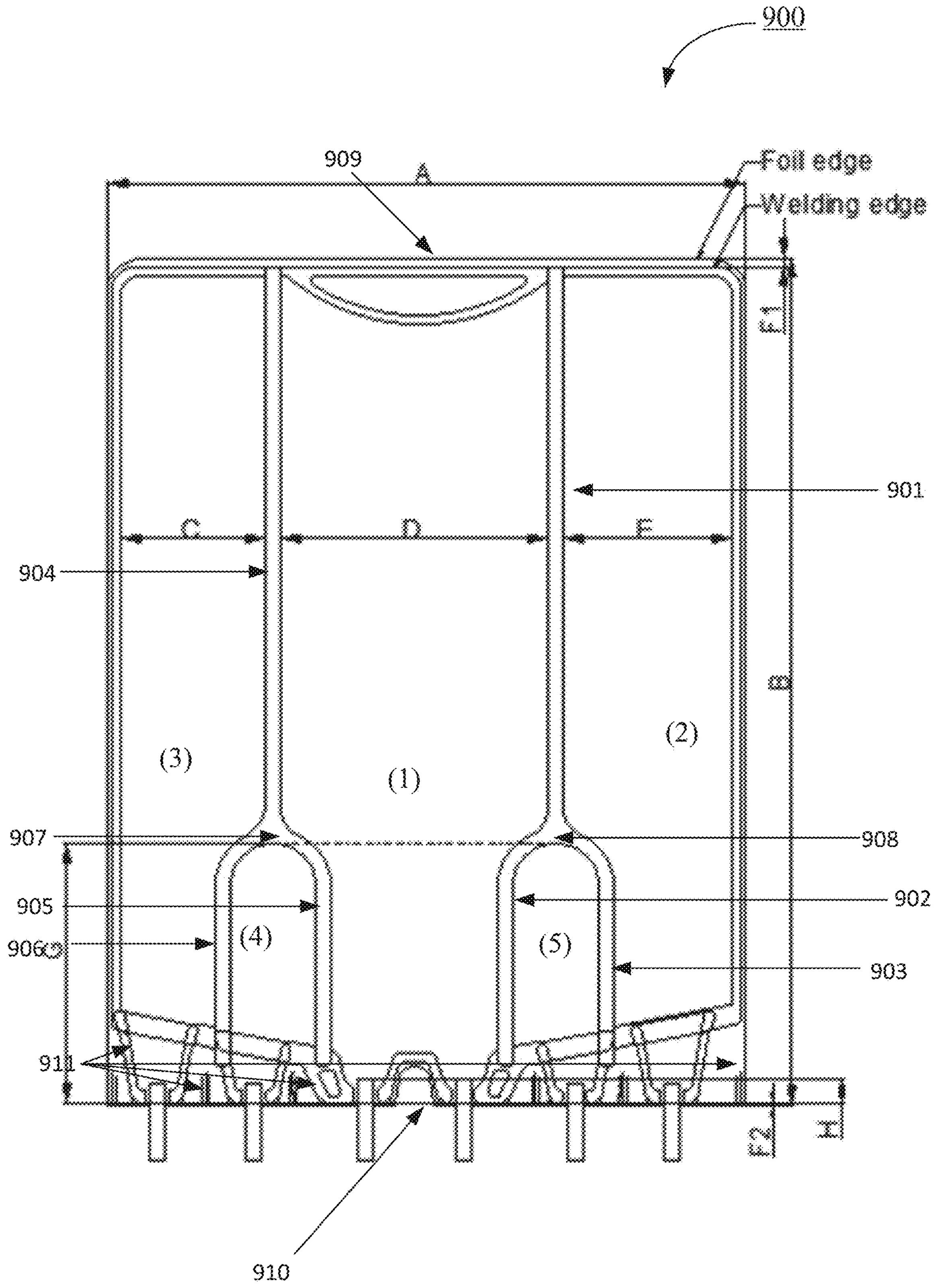
FIG. 9 (including FIG. 9*a* and FIG. 9*b* (the cut design version of FIG. 9*a*)) is a schematic diagram showing an exemplary 5CB (900) for a reconstituted volume of 1.5 L and with a U-shape design and exemplary measurement dimensions. Peel seal, defined as the peelable seal separating the lipid emulsion chamber and the middle compartment containing amino acids is at an inner distance of 74 mm from the peripheral seal. Peel seal is the activatable seal separating the amino acid chamber from the dextrose compartment. The distance between peel seal and peel seal is equal to 138.4 mm. The inner distance with the main seal, defining the dextrose chamber is equal to 86.2 mm.
Figure 9B:
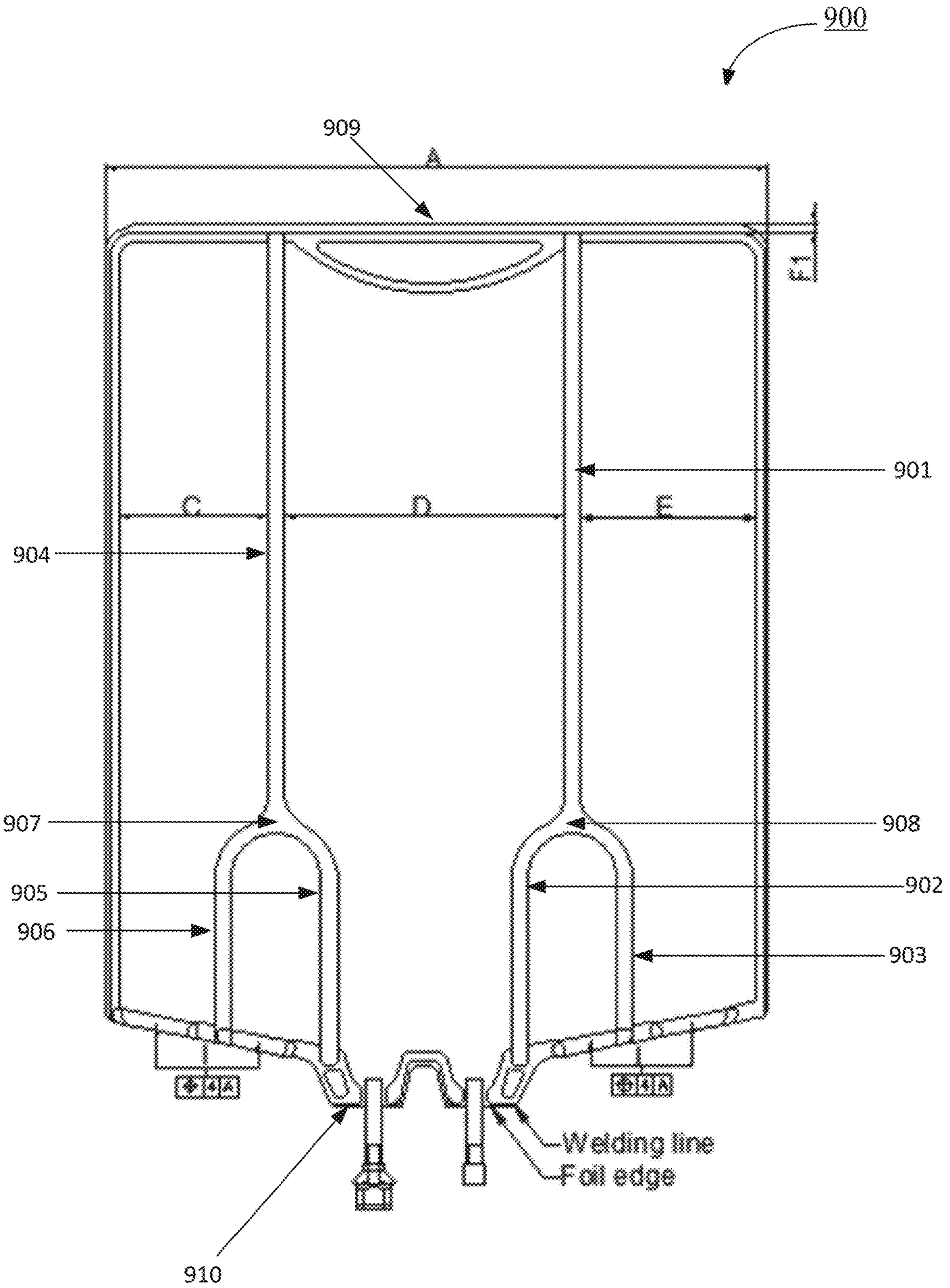

FIG. 9 (FIG. 9*a* and FIG. 9*b* (the cut design version of FIG. 9*a*)) is a schematic diagram showing an exemplary MCB 900 (e.g., a 5CB 1,5 L design) with a U-shape design with exemplary measurement dimensions. Peelably sealing wall 1 (904), defined as the peelable seal separating the lipid emulsion chamber (the third chamber (3)) and the middle compartment (the first chamber (1)) containing amino acids is at an inner distance of 74 mm with the peripheral seal. Peelably sealing wall 2 (901) is the activatable seal separating the amino acid chamber (the first chamber (1)) from the dextrose compartment (the second chamber (2)). Distance between the peelably sealing wall 1 (901) and the peelably sealing wall 2 (904) is equals to 138.4 mm. Inner distance with the main seal, defining the dextrose chamber (the second chamber (2)) is equals to 86.2 mm.

As shown in FIGS. 9*a* and 9*b*, the second peelably sealing walls 905 and 906 form a hemispherical shape around the spitting point 907 and further extend to the bottom edge 910 to form the fourth chamber (4). The second peelably sealing walls 902 and 903 form a hemispherical shape around the spitting point 908 and further extend to the bottom edge 910 to form the fourth chamber (5). In one embodiment, the distance between the top points from the fourth chamber (4) and the fifth chamber (5) and the bottom edge 901 is 128.89 mm.

In one embodiment, the sizes of the MCBs of the present invention can be varied as understood by the skilled in the art. For example, the chambers of the MCB of the invention may have the same size or may have different sizes to accommodate the various formulations which may different volumes as shown in this disclosure. Chamber (4) and (5) may also be designed to have different sizes either by displacing the splitting point of either chamber towards the bottom edge or the top edge, and/or by increasing or reducing the distance of the respective edges of either chamber (4) or (5), respectively.

Figure 10A:
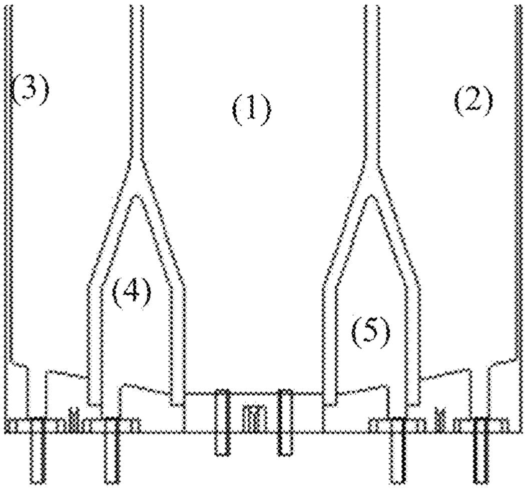
FIG. 10 (including FIG. 10*a* and FIG. 10*b*) is a set of schematic diagrams showing a comparison between Peel seals with V-shape (FIG. 10*a*) and U-shape (FIG. 10*b*). To preserve surface to volume ratio of each compartment (defining the bulkiness of each compartment) the vitamins (VIT) and trace elements (TE) compartment width can remain unchanged. To maintain the area (e.g. about 42 $cm^2$) in the vitamins (VIT) and trace elements (TE) chambers in the U-shape format, the separation of the peel seals (i.e., the position of the bifurcation) is displaced towards the bottom of the bag. The distance separating the inner edge, forming the reversed U-shape of the small chambers till the outer edge of the peripheral seal in this example is equals to 128,89 mm versus 148,61 mm for the V-shape design.
Figure 10B:
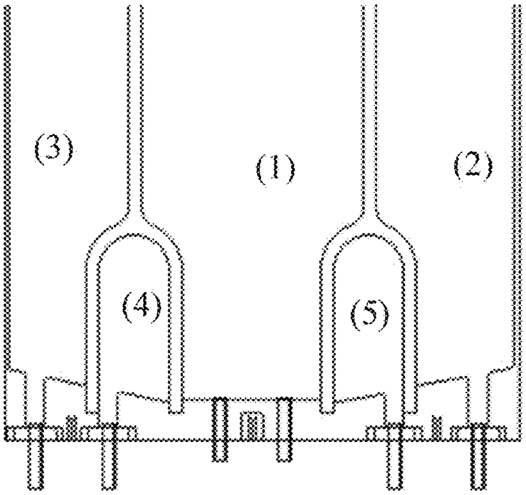

Referring to FIG. 10 (including FIG. 10*a* and FIG. 10*b*), a set of schematic diagrams shows a comparison between Peel seal V-shape (FIG. 10*a*) and U-shape (FIG. 10*b*). To preserve surface to volume ratio of each compartment (defining the bulkiness of each compartment) the vitamins (VIT; the fourth chamber (4)) and trace elements (TE; the fifth chamber (5)) compartment width is unchanged. To maintain this area (42 $cm^2$) in the vitamins (VIT) and trace elements (TE) chambers in the U-shape format, the separation of the peelably sealing walls was displaced towards the bottom of the bag. The distance separating the inner edge, forming the reversed U-shape of the small chambers till the outer edge of the peripheral seal is equals to 128,89 mm versus 148,61 mm for the V-shape design.

In one embodiment, to preserve surface to volume ratio of each chamber, the width of the small chambers (i.e., the fourth chamber (4) and the fifth chamber (5)) is unchanged between the "V" shape design and the "U"-shape.

In one embodiment, second peelably sealing wall shapes (e.g., 905 and 906; 902 and 903 of FIG. 9*a* and FIG. 9*b*) are symmetric around their vertical axis. In one embodiment, second peelably sealing wall shapes (e.g., 905 and 906; 902 and 903 of FIG. 9*a* and FIG. 9*b*) are symmetric around the corresponding first second peelably sealing wall.

In one embodiment, at least one of the fourth chamber (4) and the fifth chamber (5) is symmetrical. In one embodiment, both the fourth chamber and the fifth chamber are symmetrical. In one embodiment, one of the fourth chamber and the fifth chamber is symmetrical, and the other is unsymmetrical. In one embodiment, both the fourth chamber and the fifth chamber are unsymmetrical.

Figure 11:
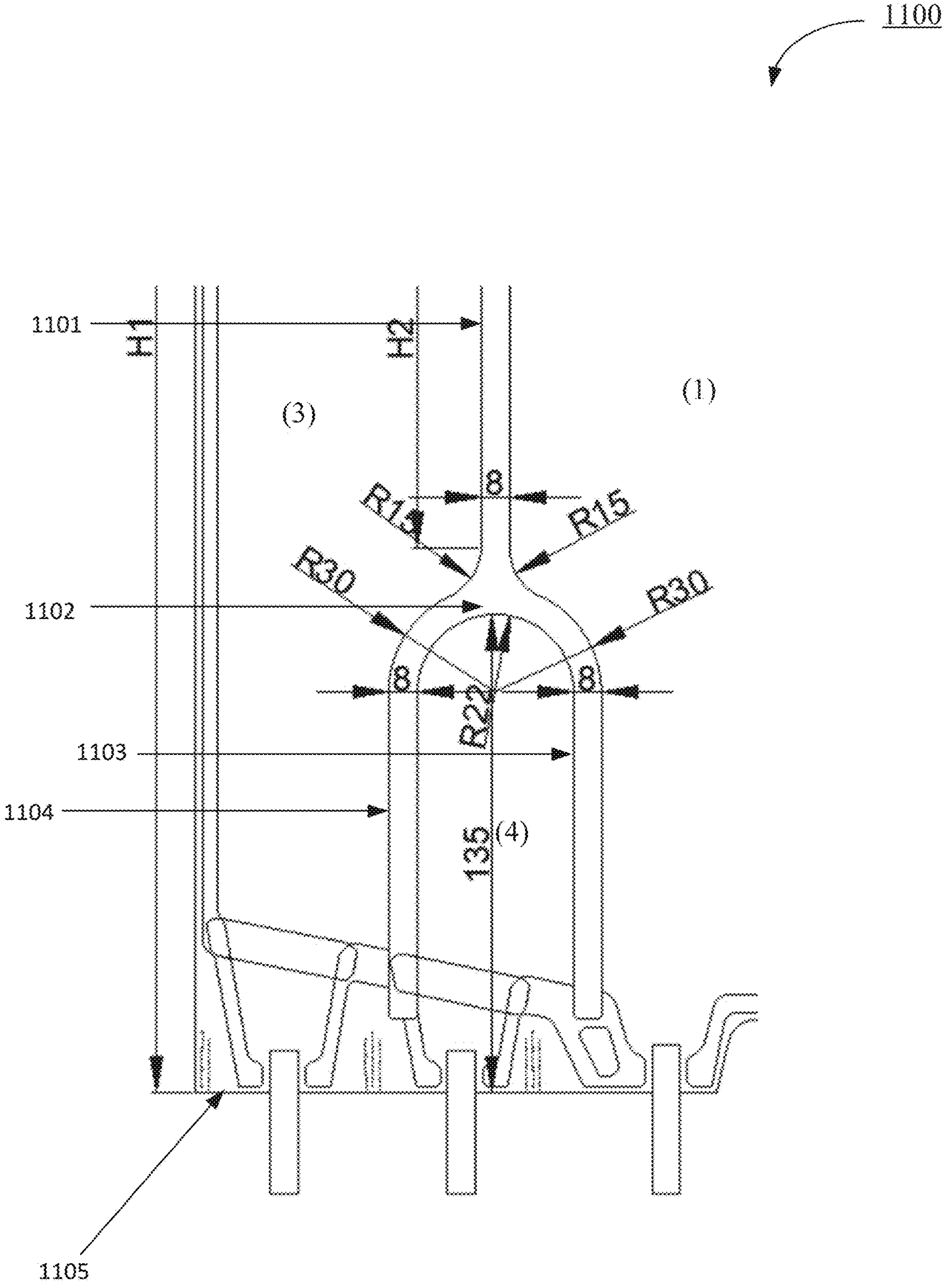
FIG. 11 is a schematic diagram showing an exemplary Peel seal U-shape in further detail. Peelably sealing wall shapes are symmetric about their vertical axis. From top (hanger side) to bottom (tube side), H2 length, depending on the MCB format, is connected to a 15 mm arc radius having an arc length of 17.02 mm going towards the external side of the bag. A second arc is closing the previous arc, creating an inflexion point. This arc has a radius of 30 mm and an arc length of 34.05 mm. The peel seal is then extended by 89.39 mm toward the tubes. The inner arc of the small chamber has a radius of 22 mm (=30 external radius minus 8 mm of peel seal thickness) with an arc length of 69.12 mm forming a half circle connecting to the other branch of the peel seal.

Referring to FIG. 11, an exemplary MCB 1100 having a "U" shape of the second peelably sealing walls is shown. As shown in FIG. 11, from the top edge (not shown) on the front side (e.g., the hanger side) to the bottom edge 1105 (tube side), a first peelably sealing wall 1101 (H2 length), depending on the MCB format, is connected to a first arc with 15 mm radius and an arc length of 17.02 mm extending towards the external side of the MCB 1100. A second arc is closing the first arc, creating an inflexion point. The second arc has a radius of 30 mm and an arc length of 34.05 mm. The second peelably sealing wall 1103 and 1104 are then extended by 89.39 mm toward the bottom edge 1105. The inner arc of the small chamber (the fourth chamber (4)) has a radius of 22 mm (i.e., 30 mm external radius minus 8 mm of the second peelably sealing wall thickness) with an arc length of 69.12 mm forming a half circle connecting to one second peelably sealing wall 1103 to the other branch of the second peelably sealing wall 1104.

In one embodiment, the other small chamber (i.e., the fifth chamber (5)) has the same size and shape as that of the fourth chamber (4). In another embodiment, the other small chamber (i.e., the fifth chamber (5)) has the same "U" shape, but with a different size from that of the fourth chamber (4).

In another embodiment, the other small chamber (i.e., the fifth chamber (5)) has different size and shape from those of the fourth chamber (4).

As FIG. 11 shows an exemplary MCB 1100 having "U" shaped second peelably sealing walls. With the specific parameters of sizes, one can vary the parameters of sizes of the present MCB. For example, the chambers of the MCB of the invention may have the same size or may have different sizes to accommodate the various formulations which may have different volumes as shown in this disclosure.

In one embodiment, only one of the first peelably sealing walls is split into at least two second peelably sealing walls.

In one embodiment, the at least two second peelably sealing walls form a symmetrical shape. In one embodiment, the symmetrical shape is a triangular or hemispherical.

In one embodiment, the at least two second peelably sealing walls form an unsymmetrical shape. For example, one of the at least two second peelably sealing walls is an extension of the first peelably sealing wall, extending from the top edge to the bottom edge. The other second peelably sealing wall forms an angle as required in this disclosure (e.g., between 20° and 50°, preferably between 30° and)45° with the first peelably sealing wall, and further extends to the bottom edge.

In one embodiment, one of the small chambers (e.g., the fifth chamber (5) or the fourth chamber (4)) forms at either the left edge or the right edge.

In one embodiment, when the fourth chamber (4) forms by two second peelably sealing walls extending to the bottom edge, the fifth chamber (5) can form at the right edge by a fourth peelably sealing wall starting at a location on the right edge between the top edge and the bottom edge and extending to the bottom.

In one embodiment, one of the first peelably sealing walls is not split and extends from the top edge to the bottom edge.

Figure 12A:
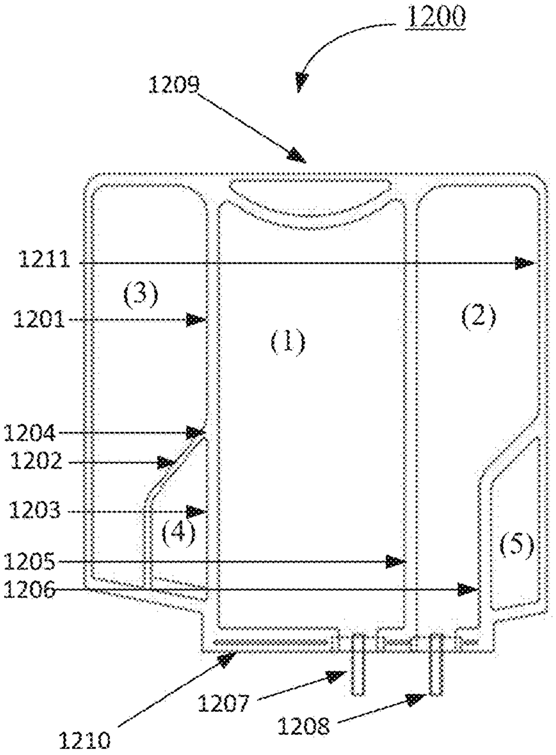
FIG. 12 (including FIG. 12*a* and FIG. 12*b*) is a set of schematic diagrams showing alternative designs of five chamber MCB according to the invention, wherein chamber 5 for trace elements (TE) is moved to the outer right side of the multi-chamber container, thereby becoming surrounded by the glucose chamber 2. Tubes used only for filling the five chambers and sacrificed afterwards for obtaining a funnel shaped container with the minimum set of required ports are not shown. The tube on the glucose compartment 2 is not sacrificed here and is closed after filling with the medication port. Only one tube is then remaining on chamber 1 and closed with the administration port. This design presents the advantage of possibly having a longer distance between the two remaining tubes to reduce the stress on the film. This design also presents the possibility to make optional the activation of the trace element chamber.

Referring now to FIG. 12*a*, an exemplary MCB 1200 having one of the small chambers at the right edge is shown. As shown in FIG. 12*a*, the MCB 1200 comprises one of the first peelably sealing walls 1205 extends from the top edge 1209 to the bottom edge 1210 for separate the first chamber (1) and the second chamber (2).

The other first peelably sealing wall 1201 is split at the splitting point 1204 into the second peelably sealing walls 1202 and 1203, both of which extend to the bottom edge 1210 to form a fourth chamber (4) and a third chamber (3). As shown in FIG. 12*a*, the second peelably sealing walls 1202 and 1203 are not symmetrical around the splitting point 1204. Thus, the fourth chamber (4) is unsymmetrical. The first peelably sealing wall 1201 extends to form the second peelably sealing wall 1203.

A third peelably sealing wall 1206 forms at the right edge 1211 starting from a location between the tope edge 1209 and the bottom edge 1210 and extending to the bottom edge 1210 to form a fifth chamber (5). As shown in FIG. 12*a*, the fifth chamber (5) is unsymmetrical.

As shown in FIG. 12*a*, the first chamber (1) comprises a port tube 1207 and the second chamber (2) comprises a port tube 1208.

Figure 12B:
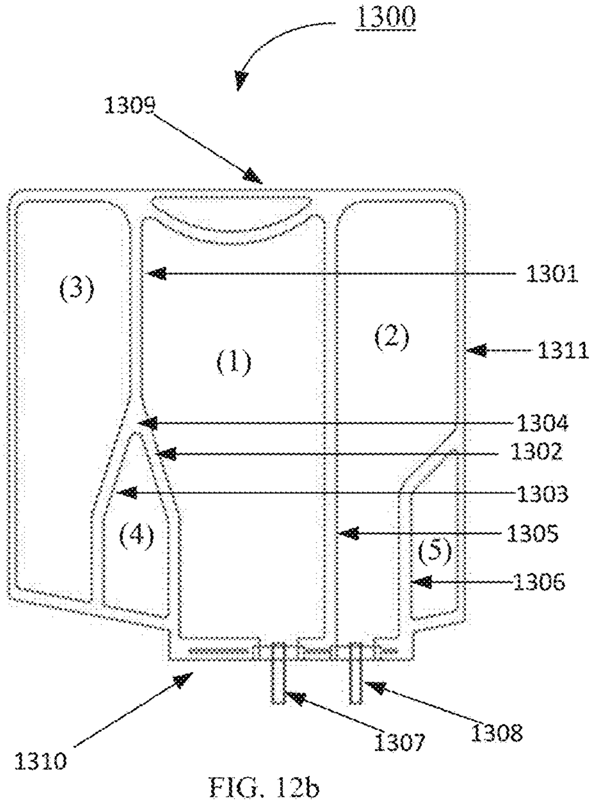

FIG. 12*b* shows another exemplary MCB 1300 having one of the small chambers at the right edge. As shown in FIG. 12*b*, one of the first peelably sealing walls 1305 extends from the top edge 1309 to the bottom edge 1310 to form a second chamber (2).

The other first peelably sealing wall 1301 is split at the splitting point 1304 into the second peelably sealing walls 1302 and 1303, both of which extend to the bottom edge 1310 to form a fourth chamber (4), a first chamber (1) and a third chamber (3). As shown in FIG. 12*b*, the second peelably sealing walls 1302 and 1303 are symmetrical around the splitting point 1304. Thus, the fourth chamber (4) is symmetrical.

A third peelably sealing wall 1306 forms at the right edge 1311 starting from a location between the tope edge 1309 and the bottom edge 1310 and extending to the bottom edge 1310 to form a fifth chamber (5). As shown in FIG. 12*b*, the fifth chamber (5) is unsymmetrical.

As shown in FIG. 12*b*, the first chamber (1) comprises a port tube 1307 and the second chamber (2) comprises a port tube 1308.

The bags illustrated by FIGS. 12*a* and 12*b* may allow an optional activation of the compartment 5. The bag is rolled and compartments 1, 2, 3 and 4 are mixed. A second manipulation is required to mix the content of the compartment 5.

In one embodiment, the present MCB comprise at least some of the chambers filled from the top edge side. In one embodiment, at least one of the chambers is filled from the top edge side. In one embodiment, at least two of the chambers are filled from the top edge side. In one embodiment, at least three of the chambers are filled from the top edge side.

In one embodiment, the first chamber (1), the second chamber (2) and third chamber (3) are filled from the top edge side. The filling of chamber 1, 2 and 3 from the top edge side allows one to consider a MCB design embodiment with small chambers that are occupying the whole widths of respectively the right and left large chambers (e.g., the second chamber (2) and the third chamber (3)).

Figures 13A, 13B, 13C, 13D:
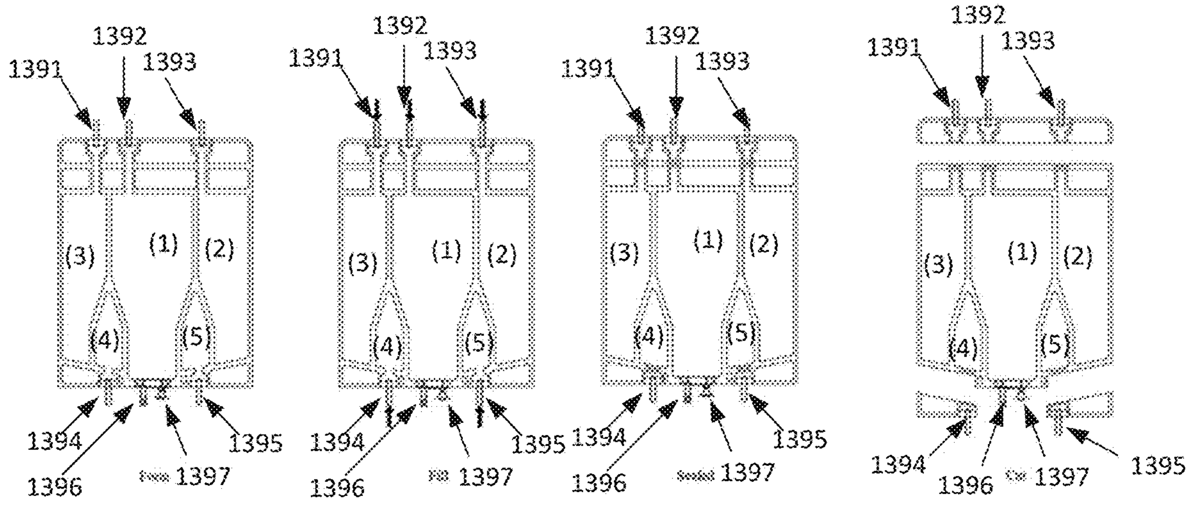
FIG. 13 (including FIG. 13*a*, FIG. 13*b*, FIG. 13*c* and FIG. 13*d*) is a set of schematic diagrams showing an alternative manufacturing process for a five-chamber MCB filled from both sides and with combined molded ports. The filling of larger volume chambers 1, 2 and 3 from the hanger side allows to consider a container design embodiment with small chambers that are occupying the larger part or whole widths of respectively the right and left large chambers, as depicted in the high-level diagram below.

FIG. 13 (including FIG. 13*a*, FIG. 13*b*, FIG. 13*c* and FIG. 13*d*) is a set of schematic diagrams showing a manufacturing process for a five-chamber MCB filled from both sides—with combined molded ports.

As shown in FIG. 13*a*, a MCB comprises peelably sealing walls to separate the MCB into the first chamber (1), the second chamber (2), the third chamber (3), the fourth chamber (4) and the fifth chamber (5). Each of the first chamber (1), the second chamber (2) and the third chamber (3) comprises a port tube (1391, 1392, 1393) at the top edge side. Each of the fourth chamber (4) and the fifth chamber (5) comprises a port tube (1394, 1395) at the bottom edge side. The first chamber (1) further comprises an administration port 1396 and a medication port 1397.

After the MCB comprising peelably sealing walls forms, as shown in FIG. 13*b*, the contents are added through the port tubes into the corresponding chambers. For example, preferably, an amino acids solution, which optionally contains some vitamins or trace elements, is added into the first chamber (1) through the port tube 1392; a glucose solution, which optionally contains some vitamins or trace elements, is added into the second chamber (2) through the port tube 1393; a lipid emulsion, which optionally contains fat-soluble vitamins, is added into the third chamber (3) through the port tube 1391; a vitamins solution or emulsion is added into the fourth chamber (4) through the port tube 1394; and a trace elements solution is added into the fifth chamber (5) through the port tube 1395.

As shown in FIG. 13*c*, after the contents are added into the chambers through the corresponding port tubes, the port tubes 1391-1395 are non-peelably sealed from the corresponding chambers. In one embodiment, tunnels from the port tubes 1391-1395 to the corresponding chambers are non-peelably sealed.

After the port tubes 1391-1395 are non-peelably sealed from the corresponding chambers, as shown in FIG. 13*d*, a part of the MCB at the top edge comprising the port tubes 1391-1393 is cut and removed from the MCB. Other parts at the bottom edge comprising the port tubes 1394 and 1395 are also cut and removed from the MCB. As shown in FIG. 13*d*, the final MCB product comprises the administration port 1396 and the medication port 1397 at the first chamber (1). The final MCB product has a funnel shape at the bottom edge.

In one embodiment, the MCB of the present invention comprises at least three chambers, at least four chambers, or at least five chambers. In one embodiment, the MCB of the present invention comprises three, four, five, six, seven, eight or nine chambers. In one embodiment, the MCB of the present invention comprises five, six, seven or eight chambers. In one embodiment, the MCB of the present invention comprises five or six chambers. In one preferred embodiment, the MCB of the present invention comprises five chambers. In one preferred embodiment, the MCB of the present invention comprises six chambers.

In one embodiment, a sixth chamber of the present MCB is added aside to one of the small chambers (e.g., the fourth chamber (4) or the fifth chamber (5)). In one embodiment, a sixth chamber of the present MCB is added aside to the fourth chamber (4). In one embodiment of the present sixth MCB, the fifth chamber (5) is moved to the side of the MCB (e.g., the right edge). In one embodiment, one of the small chambers (e.g., the fourth chamber (4) or the fifth chamber (5)) is split into two smaller chambers including the sixth chamber (6).

In one embodiment, the present MCB with the fifth or sixth chamber has port tubes for each of the fifth or six chambers on the same side.

In one embodiment, the present MCB with the fifth or sixth chamber has port tubes for some of the fifth or six chambers on a side different from the others. For example, some of the port tubes are on the top edge and the others are on the bottom edge.

In one embodiment, the present MCB with the fifth or sixth chamber has port tubes for each of the fifth or six chambers in the bottom edge.

Figure 14:
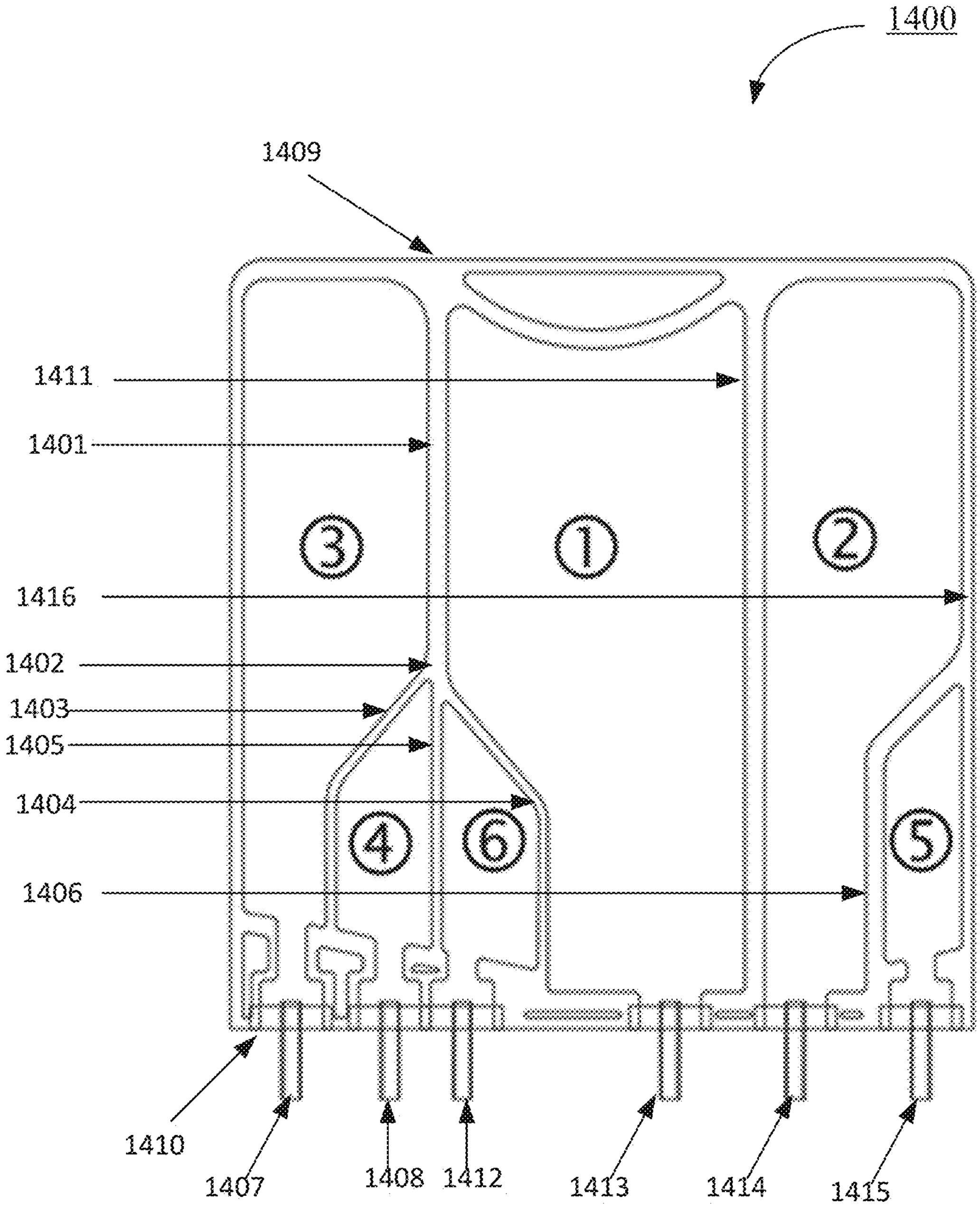
FIG. 14 is a schematic diagram showing an exemplary design of a six-chamber MCB with all chambers filled from the same side according to some embodiments of the present invention. The six-chamber MCB is designed with the filling of the large chambers from the bottom (tube) side. Either two tubes closed with an administration port and a medication port, or a rigid molded access system, including for instance both administration port and medication port, can be used on the middle large compartment. The position for sealing and cutting the container which leads to a funnel shape and to sacrificing unnecessary tubes is indicated. Tubes 1413 and 1414 will remain and be closed as indicated above.

Referring to FIG. 14, an exemplary design of a six-chamber MCB 1400 with all chambers filled from the same side according to some embodiments of the present invention is shown.

As shown in FIG. 14, the six-chamber MCB 1400 comprises one first peelably sealing wall 1401, which is split at the splitting point 1402 into three second peelably sealing walls 1403, 1404 and 1405, all of which extend to the bottom edge 1410 to form the fourth chamber (4), the sixth chamber (6) and the third chamber (3). The six-chamber MCB 1400 also comprises another first peelably sealing wall 1411 extending from the top edge 1409 to the bottom edge to form the first chamber (1) and the second chamber (2).

The six-chamber MCB 1400 also comprises a third peelably sealing wall 1406 starting from the inner surface of the right edge 1416 at a location between the top edge 1409 and the bottom edge 1410 and extending to the bottom edge 1410 to form a fifth chamber (5).

As shown in FIG. 14, each of the first chamber (1), the second chamber (2), the third chamber (3), the fourth chamber (4), the fifth chamber (5) and the sixth chamber (6) has a port tube in the bottom edge 1410. For example, the first chamber (1) has a port tube 1413; the second chamber (2) has a port tube 1414; the third chamber (3) has a port tube 1407; the fourth chamber (4) has a port tube 1408; the fifth chamber (5) has a port tube 1415; and the sixth chamber (6) has a port tube 1412.

In one embodiment, alternatively, the six-chamber MCB may be designed with the filling of the large chambers from the top edge side (i.e., the hanger side). For example, either two tubes closed with an administration port and a medication port, or a rigid molded access system, including for instance both administration port and medication port can be used on the middle large compartment.

In one embodiment, the left corner part of the MCB 1400 comprising port tubes 1410, 1407, 1408 and 1412 may be non-peelably sealed and removed from the rest of the MCB. The right corner part of the MCB 1400 comprising port tube 1415 may also be non-peelably sealed and removed from the rest of the MCB. Thus, in one embodiment, the MCB product comprises only two port tubes 1413 and 1414. In one embodiment, one of the port tubes 1413 and 1414 is an administration port and the other is a medication port. In one preferred embodiment, the port tube 1413 is the administration port and the port tube 1414 is the medication port.

In one embodiment, the first chamber comprises an amino acids solution; the second chamber comprises a glucose solution; the third chamber comprises a lipid emulsion; the fourth chamber comprises a vitamins solution or emulsion and the fifth chamber comprising a trace elements solution.

In one embodiment, it is also possible to have a sixth chamber which comprises vitamin A and optionally vitamins E, D and/or K, whereas vitamin B12 and optionally vitamins B2 and/or B5 remain in a fourth chamber. In such scenario, the respective vitamin formulations can be further optimized to support the stability of the respective contents for potentially even longer stability during shelf-life. However, a five-chamber bag would fully address the stability target as defined herein and would be preferable regarding ease of handling of the MCB, e.g., when reconstituting the formulation, and regarding manufacturing of such MCB. According to one aspect, the vitamin formulation of the sixth chamber is a lipid emulsion such as the one described before for the vitamin formulation, and accommodates therein the lipid-soluble vitamins A optionally in combination with vitamins D, E and/or K. In such case, the vitamin formulation of the fifth chamber preferably is an aqueous solution which has the potential to further increase the stability of vitamin B12. The pH of the vitamin formulation of the fifth chamber which accommodates vitamins B12 and optionally also vitamin B2 and/or B5 is in the range of from about 5.5 to about 6.5, such as, for example, about 5.8, about 5.9, about 6.0 or about 6.1. For adjusting the pH of the aqueous vitamin solution of the fifth chamber, which preferably is in the range of from 5.5 to 7.5, HCl and/or NaOH can be used as needed. Optionally, a phosphate monobasic buffer can be used.

According to another embodiment, one or more of the lipid-soluble vitamins can, however, be also accommodated in the lipid emulsion of the third chamber. For example, vitamin A and/or E may be present in the lipid emulsion, whereas the remaining vitamins, e.g., vitamin D and vitamin K, may be present in the vitamin formulation of the fourth or, alternatively, of the sixth chamber. According to one embodiment, vitamin A and one, two or all of the other lipid-soluble vitamins can be present in the lipid formulation of the third chamber, whereas the vitamin formulation is an aqueous solution as described above and which comprises vitamin B12 and, optionally, vitamins B2 and/or B5.

In one embodiment, specific geometries are required for the present MCB. For example, from the top edge to the bottom edge with a height of h2, the present MCB is firstly divided into three large chambers (e.g., the first chamber (1), the second chamber (2) and the third chamber (3)) by the first peelably sealing walls and their extensions. Then, after a certain distance, the second peelably sealing walls further separate the large walls to form the fourth chamber (4), the fifth chamber (5), optionally the sixth chamber (6). The second peelably sealing walls measured from the splitting point have a height of h1. In one preferred embodiment, h1 is below or equal to two third of h2 (h1≤⅔*h2).

Figure 15A:
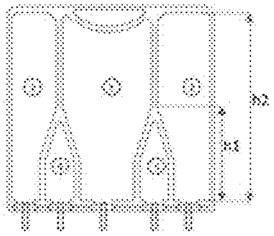
FIG. 15 (including FIG. 15*a*, FIG. 15*b*, FIG. 15*c*, FIG. 15*d* and FIG. 15*e*) is a set of schematic diagrams showing alternative designs of peelably sealing wall split locations according to some embodiments of the present invention. In a preferred embodiment, the width of the non-permanent seal is 8 mm. A smaller width can be envisaged below the split line (h1). The preferred angles geometries for the first, second, third, fourth and sixth preferred container design embodiments include: the peel seals coming from the hanger side first split with an obtuse angle from 130° to 170°. Same for the peel seal adjacent to a permanent seal in the fifth container design embodiment; the peel seals delimiting the small chambers are then curving back with an equivalent angle to be vertical again; and the acute angle that forms the small chamber range from 30 to 50° depending on the design.

In one embodiment, the small chambers of the present MCB are symmetrical and/or each of the chambers has one port tube in the bottom edge. FIG. 15*a* shows an exemplary MCB with the fourth chamber (4) and the fifth chamber (5) being symmetrical and each of the first chamber (1), the second chamber (2), the third chamber (3), the fourth chamber (4) and the fifth chamber (5) has a port tube in the bottom edge. As shown in FIG. 15*a*, h1 is below or equal to two third of h2 (h1≤⅔*h2).

Figure 15B:
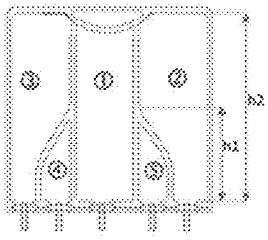

In one embodiment, the small chambers of the present MCB are unsymmetrical and/or each of the chambers has one port tube in the bottom edge. FIG. 15*b* shows an exemplary MCB with the fourth chamber (4) and the fifth chamber (5) being unsymmetrical and each of the first chamber (1), the second chamber (2), the third chamber (3), the fourth chamber (4) and the fifth chamber (5) has a port tube in the bottom edge. As shown in FIG. 15*b*, the first peelably sealing wall extends to form one of the second peelably sealing wall. As shown in FIG. 15*b*, h1 (height of the second peelably sealing walls measured from the splitting point) is below or equal to two third of h2 (the height from the top edge to the bottom edge) (h1⅔*h2).

Figure 15C:
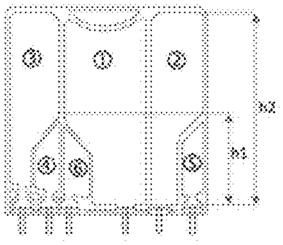

In one embodiment, the MCB of the present invention comprises six chambers. The three small chambers are unsymmetrical and/or each of the chambers has one port tube in the bottom edge. FIG. 15*c* shows an exemplary six-chamber MCB with a sixth chamber (6) forming aside of the fourth chamber (4), and the fifth chamber (5) moved to the right edge. All the fourth chamber (4), the fifth chamber (5) and the sixth chamber (6) are unsymmetrical and each of the first chamber (1), the second chamber (2), the third chamber (3), the fourth chamber (4), the fifth chamber (5) and the sixth chamber (6) has a port tube in the bottom edge. As shown in FIG. 15*c*, h1 is below or equal to two third of h2 (h1≤⅔*h2).

Figure 15D:
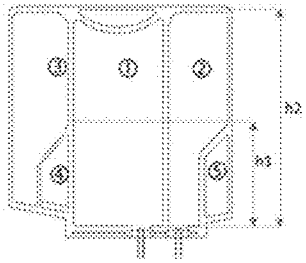

In one embodiment, the small chambers of the present MCB are unsymmetrical, one of the small chambers is moved to the right edge and/or only some of the chambers have one port tube in the bottom edge. FIG. 15*d* shows an exemplary five-chamber MCB with the fifth chamber (5) moved to the right edge. Both the fourth chamber (4) and the fifth chamber (5) are unsymmetrical and only the first chamber (1) and the second chamber (2) have a port tube in the bottom edge. As shown in FIG. 15*d*, h1 is below or equal to two third of h2 (h1≤⅔*h2). In one embodiment, the port tubes for the third chamber (3), the fourth chamber (4), and the fifth chamber (5) are removed and port tubes for the first chamber (1) and the second chamber (2) remain. In one embodiment, the port tube for the first chamber is used as an administration port and the port tube for the second chamber (2) is used as a medication port.

Figure 15E:
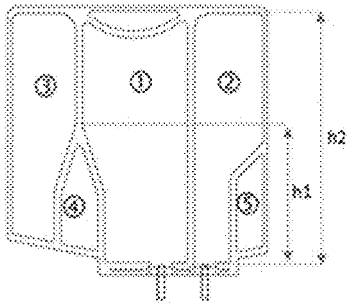

In one embodiment, at least one of the small chambers of the present MCB is symmetrical and at least one of the small chambers is unsymmetrical, one of the small chambers is moved to the right edge and/or only some of the large chambers have one port tube in the bottom edge. FIG. 15*e* shows an exemplary five-chamber MCB with the fifth chamber (5) moved to the right edge. The fourth chamber (4) is symmetrical and the fifth chamber (5) is unsymmetrical. Only the first chamber (1) and the second chamber (2) have a port tube in the bottom edge. As shown in FIG. 15*e*, h1 is below or equal to two third of h2 (h1≤⅔*h2). In one embodiment, the port tubes for the third chamber (3), the fourth chamber (4), and the fifth chamber (5) are removed and port tubes for the first chamber (1) and the second chamber (2) remain. In one embodiment, the port tube for the first chamber is used as an administration port and the port tube for the second chamber (2) is used as a medication port.

In one embodiment, the width of the peelably sealing walls is in the range of 1 mm to 15 mm, 2 mm to 14 mm, 3 mm to 13 mm, 4 mm to 12 mm, 5 mm to 11 mm, 6 mm to 10 mm, 7 mm to 9 mm, 7.5 mm to 8.5 mm, preferably 8 mm. In one preferred embodiment, the width of the peelably sealing walls is 8 mm. In one embodiment, a smaller width can be envisaged below the split line (h1) of the specific designs of FIGS. 15*a*-15*e*.

In one embodiment, specific ranges of angles are required for the specific designs of the present invention. In one embodiment, the first peelably sealing wall and one of the second peelably sealing walls around the splitting point should have an angle in the range of 120° to 175°, 130° to 170°, preferably 140° to 165°. In one embodiment, the second peelably sealing walls delimiting the small chambers are curving back with an angle in range of 120° to 175°, 130° to 170°, preferably 140° to 165°.

In one embodiment, the two second peelably sealing walls around the splitting point have an angle in the range of 10° to 70°, 20° to 60°, preferably 30° to 50°.

Figures 16A, 16B, 16C:
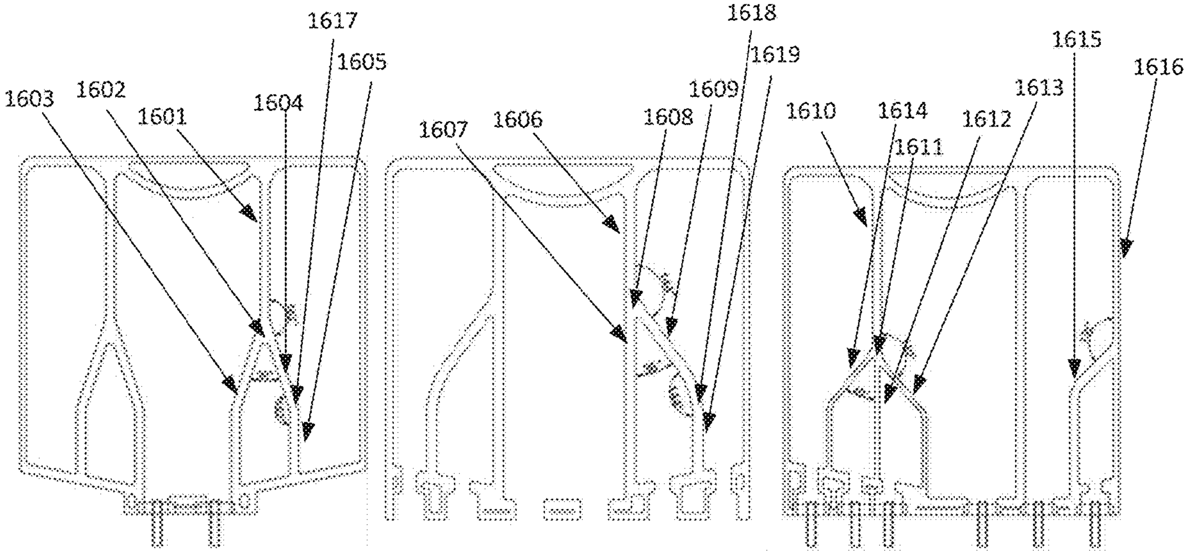
FIG. 16 (including FIG. 16*a*, FIG. 16*b* and FIG. 16*c*) is a set of schematic diagrams showing designs of certain MCBs with preferred angle geometries. For example, the angles geometry in FIG. 16*b* is as follow: the peel seals coming from the hanger side are straight towards the access port side of the bag; at the split location transversal peel seals are going towards the left and right permanent seals; and the shape of these transversal peel seals is such that it forms an obtuse angle (140° to 160°) located, in a preferred embodiment, in the middle of each transversal seal. A rounded shape is another possibility. This obtuse angle (or rounded shape) guarantees a good drainage of the bag even if small portions of the transversal seals along the permanent seals remain close after container activation.

FIG. 16*a* shows an exemplary MCB having the small chambers being symmetrical with the specific range of the angles. As shown in FIG. 16*a*, the first peelably sealing wall 1601 and the second peelably sealing wall 1604 around the splitting point 1602 have an angle of 162°. The second peelably sealing wall 1604 and the extension wall 1605 around the curving point 1617 have an angle of 162°.

As shown in FIG. 16*a*, the second peelably sealing walls 1603 and 1604 around the splitting point 1602 have an angle of 36°.

FIG. 16*b* shows another exemplary MCB having the small chambers being unsymmetrical with the specific range of the angles. As shown in FIG. 16*b*, the first peelably sealing wall 1606 and the second peelably sealing wall 1609 around the splitting point 1608 have an angle of 144°. The second peelably sealing wall 1609 and the extension wall 1619 around the curving point 1618 have an angle of 144°.

As shown in FIG. 16*b*, the second peelably sealing walls 1607 and 1609 around the splitting point 1608 have an angle of 36°.

FIG. 16*c* shows another exemplary six-chamber MCB having the small chambers being unsymmetrical, the sixth chamber (6) forming aside of the fourth chamber (4), the fifth chamber (5) moved to the right edge with the specific range of the angles. As shown in FIG. 16*c*, the first peelably sealing wall 1610 and the second peelably sealing wall 1613 around the splitting point 1611 have an angle of 140°. The third peelably sealing wall 1615 and the right edge 1616 have an angle of 135°.

As shown in FIG. 16*c*, the second peelably sealing walls 1614 and 1612 around the splitting point 1611 have an angle of 40°.

In one embodiment, the "V" shape design of the small chambers can be modified into the "U" shape design.

Figures 17A, 17B, 17C:
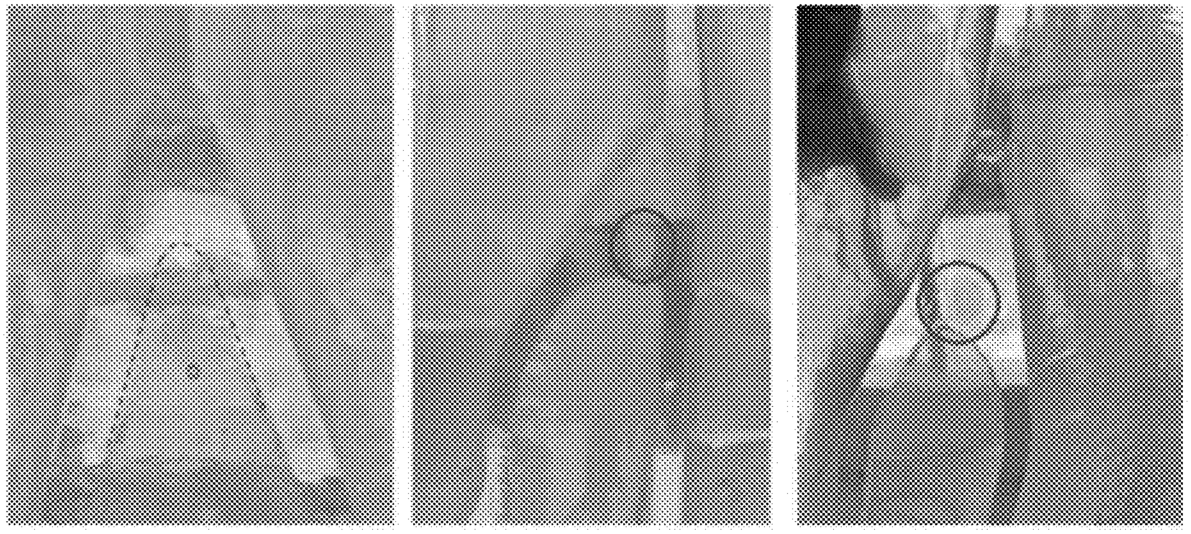
FIG. 17 (including FIG. 17*a*, FIG. 17*b* and FIG. 17*c*) is a set of pictures of "V" shape chambers of the MCBs showing that post sterilization, the MCBs may have sticking zones on the small compartments when the angle is sharp. In some cases, a small occlusion can appear, as circled (FIGS. 17*b* and 17*c*).

In one embodiment, it was observed that post sterilization, the MCBs with the "V" shape design of the small chambers may show sticking zones on the small compartments when the angle is sharp. For example, as shown in FIG. 17*b* and FIG. 17*c*, a small occlusion can appear, as circled in red. Thus, the "V" shape design of the small chambers may be modified into the "U" shape design to address the occlusion.

Figures 18A, 18B:
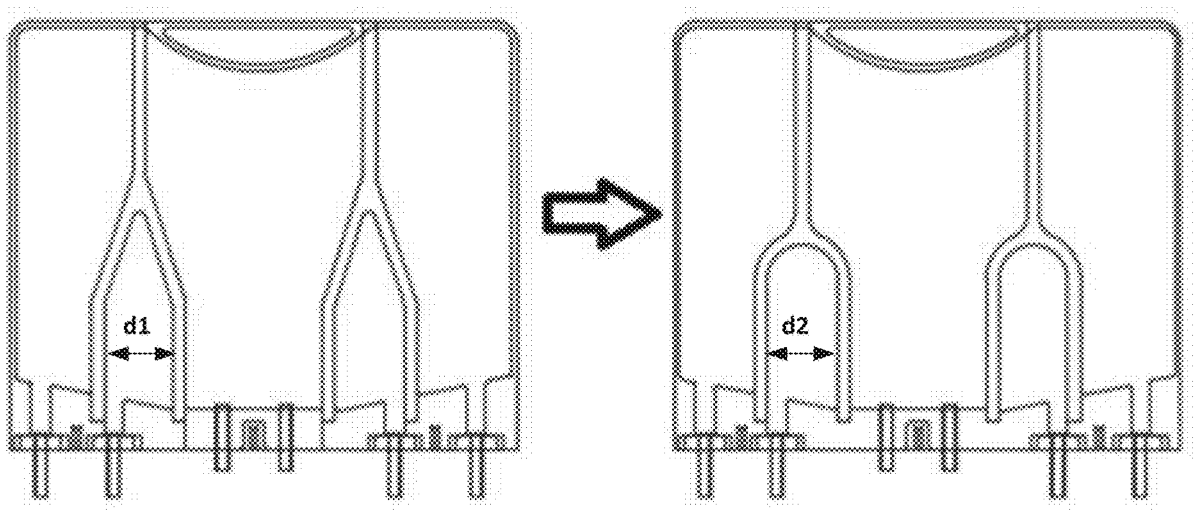
FIG. 18*a* shows "V" shape small chambers and FIG. 18*b* shows "U" shape small chambers that show no tendency to occlusions or sticking zones.

FIG. 18 (including FIG. 18*a* and FIG. 18*b*) shows that the 5-chamber MCB having symmetrical small chambers with a "V" shape design (FIG. 18*a*) can be re-designed to form a "U" shape MCB (FIG. 18*b*) to prevent having sharp angle in the small compartments. In one embodiment, the "V" shape small chambers of FIG. 18*a* has the same width as that of the "U" shape small chambers of FIG. 18*b* (i.e., d1=d2).

Figure 19A:
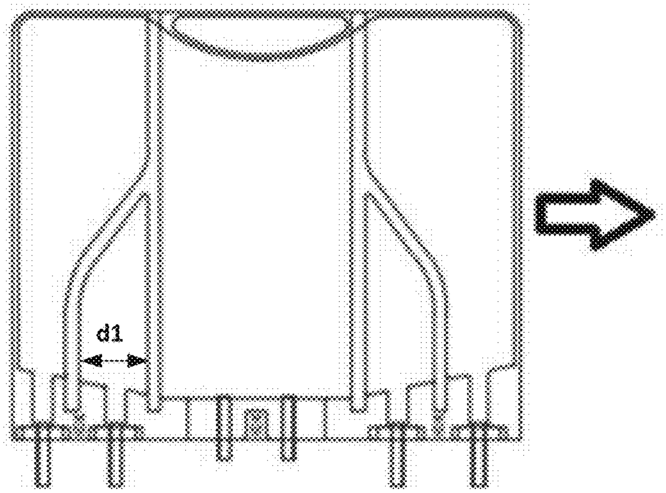
FIG. 19*a* shows "V" shaped small chambers and FIG. 19*b* shows "U" shaped small chambers.
Figure 19B:
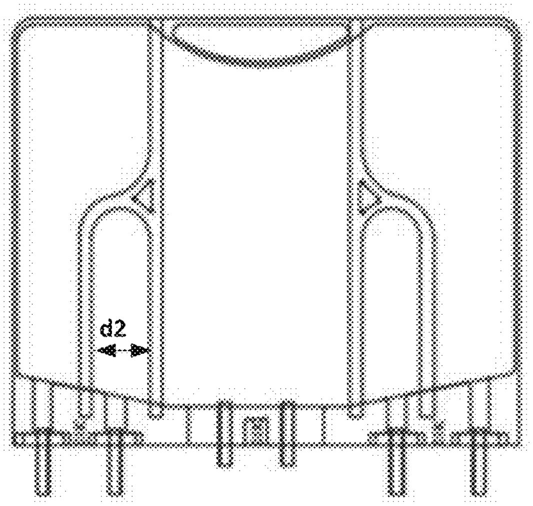

FIG. 19 (including FIG. 19*a* and FIG. 19*b*) shows that the 5-chamber MCB having unsymmetrical small chambers with a "V" shape design (FIG. 19*a*) can be re-designed to form a "U" shape MCB (FIG. 19*b*) to prevent having sharp angle in the small compartments. In one embodiment, the "V" shape small chambers of FIG. 19*a* has a different width from that of the "U" shape small chambers of FIG. 19*b* (i.e., d1≠d2). In another embodiment, the "V" shape small chambers of FIG. 19*a* has the same width as that of the "U" shape small chambers of FIG. 19*b* (i.e., d1=d2).

Figure 20:
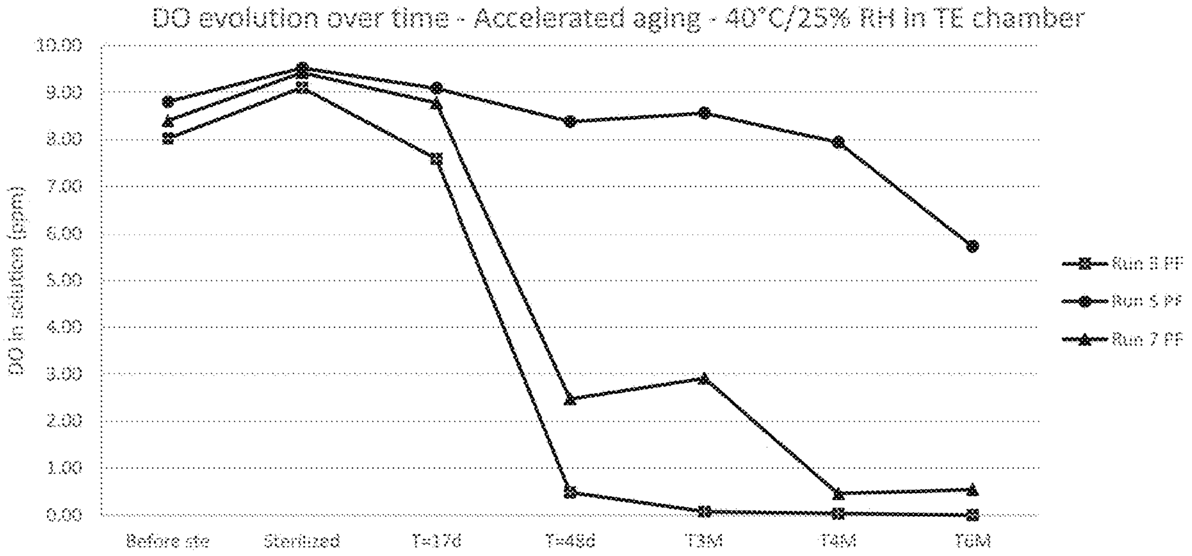
FIG. 20 is a set of graphs showing the dissolved oxygen levels in the trace element chambers of different designs. With the very high barrier primary film, a small headspace of air (5 ml) and the removing of the port tube (seal & cut process)—Run 5—the dissolved oxygen level remains above 5 ppm after 6 months' storage at 40° C.
Figure 21:
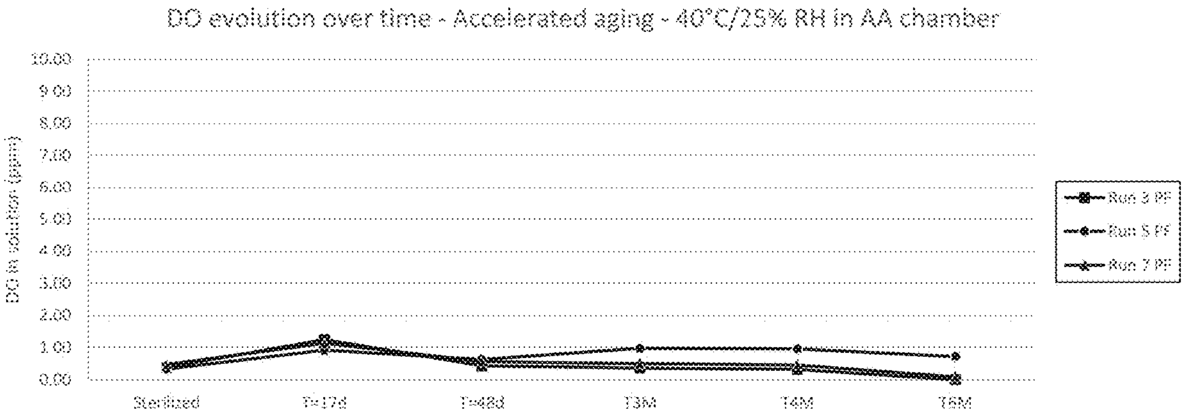
FIG. 21 is a set of graphs showing the stability of the low level of dissolved oxygen in the chambers that have been filled with a low dissolved oxygen media.

In one embodiment, the present MCBs show good stability of the low level of dissolved oxygen in the chambers that have been filled with a low dissolved oxygen media. For example, FIG. 20 and FIG. 21 show that the dissolved oxygen level in the trace element chamber (e.g., the fifth chamber (5)) that should remain with a significant level of oxygen. With the very high barrier primary film, a small headspace of air (5 ml) and the removing of the port tube (seal & cut process)—run 5—the dissolved oxygen level remains above 5 ppm after 6 months' storage at 40° C.

In another aspect, the present invention relates to an "all-in-one" parenteral nutrition system comprising parenteral nutrition solutions in the flexible MCB as disclosed herein. In one embodiment, the "all-in-one" parenteral nutrition system comprising: the first chamber comprising an amino acids solution; the second chamber comprising a glucose solution; the third chamber comprising a lipid emulsion; the fourth chamber comprising a vitamins solution or emulsion; and the fifth chamber comprising a trace elements solution.

In one embodiment, the first chamber further comprises vitamins or trace elements as discussed in this disclosure or understood by the skilled artisan.

In one embodiment, the second chamber further comprises vitamins or trace elements as discussed in this disclosure or understood by the skilled artisan.

In one embodiment, the third chamber further comprises fat-soluble vitamins as discussed in this disclosure or understood by the skilled artisan.

In one embodiment, the fourth chamber (4) is between the first chamber (1) and the third chamber (3) and the fifth chamber (5) is between the first chamber (1) and the second chamber (2).

In one embodiment, each of the first chamber, the second chamber, the third chamber, the fourth chamber and the fifth chamber comprises one port tube for addition of contents into the chambers.

In one embodiment, the port tube for each of the third chamber, the fourth chamber and the fifth chamber is sealed or closed after the addition of the contents into the chambers.

In one embodiment, port-tube-containing portions for the second chamber, the third chamber, the fourth chamber and the fifth chamber are non-peelably sealed from the rest of the flexible multi-chamber bag and the port-tube containing portions are cut.

In one embodiment, the flexible multi-chamber bag comprises at least one port tube at the top edge for the first chamber, the second chamber and/or the third chamber.

In one embodiment, port-tube containing portions of the top edge for the first chamber, the second chamber and/or the third chamber are non-peelably sealed from the rest of the flexible multi-chamber bag and the port-tube containing portions are cut.

In a further aspect, the present invention relates to a method of manufacturing the "all-in-one" parenteral nutrition system as discussed in this disclosure. The method comprising:

(a) producing the flexible multi-chamber bag, the flexible multi-chamber bag comprising:
 - the first chamber comprising a first port tube and/or a sixth port tube;
 - the second chamber comprising a second port tube;
 - the third chamber comprising a third port tube;
 - the fourth chamber comprising a fourth port tube; and
 - the fifth chamber comprising a fifth port tube,
 - wherein each of the first chamber, the second chamber and the third chamber extend from the top edge of the flexible multi-chamber bag to the bottom edge of the flexible multi-chamber bag, and the first chamber is between the second chamber and the third chamber;

(b) adding an amino acids solution into the first chamber through the first port tube and/or the sixth port tube;

(c) adding a glucose solution into the second chamber through the second port tube;

(d) adding a lipid emulsion into the third chamber through the third port tube;

(e) adding a vitamins solution or emulsion into the fourth chamber through the fourth port tube;

(f) adding a trace elements solution into the fifth chamber through the fifth port tube; and (g) sealing the second port tube, the third port tube, the fourth port tube and the fifth port tube.

In one embodiment, the method further comprises non-peelably sealing portions comprising the third port tube, the fourth port tube and the fifth port tube.

In another embodiment, the method further comprises cutting the portions comprising the third port tube, the fourth port tube and the fifth port tube from the flexible multi-chamber bag to form the "all-in-one" parenteral nutrition system.

In one embodiment, the present MCB, the "all-in-one" parenteral nutrition system and related methods have many advantages over the existing products.

For example, the five- or six-chamber MCBs with the small chambers at the bottom would lead to a single-step activation. Rolling the bag from the top is enough to allow the opening of the peelably sealing walls and complete mixing of the chambers contents. Thus, the present MCB design allows the opening of the five or six chambers simultaneously, in a mistake-proof way, so that the MCB prevents by design the occurrence of incomplete activation of the bag (for example a partial activation where only some chambers would open at the same time) which would lead to an incomplete therapy.

The present MCB allows designing all the bag formats keeping the filling tube distances unchanged across the portfolio, thus beneficial from a manufacturing complexity standpoint. No deep modification to the filling line is therefore required across the different MCB sizes.

The present MCB would prevent the undesired (from a stability standpoint) mixing between high concentrated glucose (e.g., the second chamber (2)) and trace elements (the fifth chamber (5)—strongly acidic) solutions with the two emulsion chambers (the third and fourth chambers (3), (4) and optionally the sixth chamber (6)), leveraging the buffer Amino Acid solution in the middle (the first chamber (1)).

The seal and cut process also provides the following advantages:

It improves the overall user experience by having an improved 'Look & Feel' perception of the product.

It eliminates the risk of product misuses, keeping on the final product only the required tubes and closures without any dummy port which could be wrongly used by the user.

It ensures better drainage of the residual content, thanks to the shape obtained after cutting.

It reduces the risk of leakages around the tubes with fewer tubes.

According to another aspect of the invention, the carbohydrate formulation of the present invention comprises vitamin B1, vitamin B3 and vitamin B6, preferably together with calcium chloride as calcium source. If calcium is present, the calcium concentration preferably is from about 5.0 mmol/L to about 15.0 mmol/L of carbohydrate solution. The carbohydrate formulation preferably contains from about 50.0 g to about 180.0 g of glucose, even though other carbohydrates could also be used. Glucose anhydrous or glucose monohydrate can be used, for example, for preparing the carbohydrate formulation. Vitamin B1 can be added as thiamin chloride, but other forms can be used as well. Vitamin B3 can be added, for example, as nicotinamide, and vitamin B6 as pyridoxine. The pH of the carbohydrate formulation preferably is in the range of about 3.2 to about 5.5. The carbohydrate formulation may comprise certain excipients, such as, HCl which will generally be used as HCl of about 25% w/w to adjust the pH of the formulation during production. Otherwise, the formulation may contain nitrogen and will contain water for injection. The composition is designed in way to allow stable provision of glucose and especially also the vitamins mentioned during preparation of the formulation, including terminal heat-sterilization, storage, reconstitution, and administration. In the final, reconstituted formulation for administration, the glucose concentration will be in the range of from about 60 g/L to about 160 g/L.

According to another aspect of the invention, the amino acid formulation or solution comprises vitamin B8, vitamin B9 and vitamin C, optionally together with various electrolytes that can also be accommodated in the amino acid formulation. For example, the electrolytes contained in the amino acid formulation according to the invention encompass sodium acetate trihydrate, potassium chloride, magnesium chloride hexahydrate and sodium glycerophosphate. The amino acid formulation preferably comprises from about 4.0 g/100 mL to about 20.0 g/100 mL amino acids. Vitamin B8 can be added, for example, as biotin, vitamin B9 as folic acid, and vitamin C as ascorbic acid. The pH of the amino acid formulation is preferably in the range of from about 5.0 to about 7.0, more preferably in the range of from about 5.9 to about 6.9. The amino acid formulation may further comprise excipients such as acetic acid, glacial, which can be used for adjusting the pH of the formulation, nitrogen, and water for injection. The composition is designed in a way to allow stable accommodation of amino acids, electrolytes and especially also the vitamins in the MCB according to the invention during preparation of the formulation, including terminal heat-sterilization, storage, reconstitution, and administration.

It was a critical step forward to distribute the respective vitamins over the respective formulations of the present invention in a way to avoid instabilities and incompatibilities between the vitamins or with compounds and/or conditions in the various chambers, that still must contain the macronutrients in a stable way, and adjust various parameters, including, for example, presence and/or combination with other vitamins, pH, and potentially dissolved oxygen, without compromising on critical excipients, shelf life and storage temperatures. It is a special achievement that also vitamin A and vitamin B12 can be stably accommodated in the MCB according of the invention.

Furthermore, in various formulation studies, when attempting to introduce trace elements into nutrition multi-chamber bags, serious stability issues have been experienced, in particular the loss of selenium has been observed. This may be due to the fact that selenium in the form of sodium selenite (and selenious acid) is prone to adsorption, for example to plastic materials or iron oxides; can be reduced into metallic selenium in the presence of reducing agents like ascorbic acid; can be reduced into hydrogen selenide, which is a volatile substance; and/or can be transformed into selenious dioxide at low pH, which is also a volatile substance under certain conditions. Furthermore, nutritional solutions comprising selenate salts are unknown in the state of the art. In addition to selenium, iodine, fluoride, and copper also showed stability issues during formulation trials. Copper is a reactive entity and can catalyze various chemical reactions and it is known that it can precipitate. Iodide can be reduced into iodine, which is potentially volatile. Furthermore, fluoride showed a decreasing concentration over time.

Accordingly, to date there is no sterilized, ready-to-use parenteral nutrition solution available that stably comprises a solution for parenteral administration to a patient in need thereof, comprising selenium and preferably also zinc, copper and manganese, which is stable over a prolonged period of time. Parenteral nutrition solutions which are terminally sterilized and ready-to-use and further comprise, for example, iron, chromium, iodine, fluoride and/or molybdenum in one ready-to-use MCB for PN are even more difficult to provide due to instability and/or incompatibility of one or more of the components either with each other or with the compounds and/or conditions of the standard macronutrient formulations. Selenium and other trace elements are, therefore, generally manually added to the ready-made solutions shortly before administration, because currently applicable guidelines for parenteral nutrition recommend the addition of at least zinc, copper, manganese and selenium for meeting the nutritional requirements of patients and for avoiding harmful effects if said trace elements are not provided in sufficient amounts. See, for example, Vanek et al., *A.S.P.E.N. Nutrition in Clinical Practice* 2012, 27:440-491; Osland et al., *Australasian Society for Parenteral and Enteral Nutrition* (*AuS-PEN*) *adult vitamin guidelines for parenteral nutrition. Asia Pac J of Clin Nutr* 2016, 25 (3): 636-650; or Blaauw et al. *Parenteral Provision of Micronutrients to Adult Patients: An Expert Consensus Paper. J PEN J Parenter Enteral Nutr.* 2019 March; 43 Suppl 1:S5-S23.

According to the invention, preferably at least selenium, zinc, copper, and manganese are present in the MCB of the invention, preferably in the trace element formulation. One or more of the trace elements iron, chromium, iodine, fluorine, and molybdenum can be added, for example iron and chromium or any other combination of iron, chromium, molybdenum, iodine and fluorine. According to another embodiment, the trace element formulation thus comprises at least selenium, zinc, copper, manganese, and iron. According to another embodiment, the trace element formulation comprises at least selenium, zinc, copper, manganese, iron, and chromium. According to another embodiment, the trace element formulation comprises at least selenium, zinc, copper, manganese, and chromium. According to another embodiment, the trace element formulation comprises at least selenium, zinc, copper, manganese, and iodine. According to another embodiment, the trace element formulation comprises at least selenium, zinc, copper, manganese, iodine, and iron. According to another embodiment, the trace element formulation comprises at least selenium, zinc, copper, manganese, iodine, chromium, and iron. According to another embodiment, the trace element formulation comprises at least selenium, zinc, copper, manganese, iodine, molybdenum, and iron. According to another embodiment, the trace element formulation comprises at least selenium, zinc, copper, manganese, chromium, iodine, fluorine, and iron. According to another embodiment, the trace element formulation comprises at least selenium, zinc, copper, manganese, iodine, fluorine, molybdenum, chromium, and iron. According to another embodiment, the trace element formulation comprises at least selenium, zinc, copper, manganese, iodine, molybdenum, chromium, and iron.

The trace elements can be added to the MCB in different forms or as different salts which can act as a source for the respective trace element. For example, sources of selenium that can be used in the context of the invention are, for example, sodium selenite, potassium selenite, selenious acid, selenium dioxide, selenomethionine, selenocysteine, and sodium selenate. Regarding zinc, iron, copper and chromium, the respective chloride, gluconate or sulfate salts can be used. Fluoride and iodine can be provided by adding, for example, potassium iodide or sodium iodide, and sodium fluoride or potassium fluoride. Sources of molybdenum that can be used according to the invention are for example, sodium molybdate dihydrate, potassium molybdate, molybdenum chloride, molybdenum sulfate, or molybdenum glycinate. For example, the trace element formulation according to the invention can comprise sodium selenite, zinc chloride, copper chloride, manganese chloride, iron chloride, chromium chloride, potassium iodide, sodium fluoride, and/or sodium molybdate dihydrate. As will be readily understood by persons skilled in the art, amounts may vary with the size (total reconstituted volume) of the MCB of the invention and/or the targeted patient group, for example, pediatric or adult patients.

It will be readily understood by the skilled person, that the preferred amounts shown in this disclosure can be reduced or enlarged without deviating from the present invention, which is largely unrelated to amounts used.

According to one embodiment, the trace elements encompassed by the MCB according to the invention are located in the trace element formulation. However, selected trace elements, that are less critical as to their requirements for stability may also be accommodated elsewhere, such as, for example, in the glucose chamber. It will be readily understood by the skilled person that the concentrations of the trace elements within the MCB of the invention may vary, depending on the volume of the formulation or chamber they are located in, while their total amount per MCB as disclosed herein will remain in the disclosed ranges. For example, the volume of the trace element chamber may vary over a certain range, such as, for example, from about 2.5 mL to about 100 mL, such as, for example, from about 5 mL to about 50 mL, and from about 10 mL to about 30 mL. Accordingly, the concentrations of the respective trace elements in a given formulation, such as the trace element formulation, can vary. Following reconstitution, the concentration of the respective trace elements, depending on the total volume of the reconstituted multi-chamber bag, may be, for example, in the range of (a) from about 2200 μg/L to about 7500 μg/L zinc, for example from about 2400 μg/L to about 7400 μg/L, or from about 2400 μg/L to about 4900 μg/L, such as, for example, about 2500 μg/L, about 3200 μg/L, about 4500 μg/L, about 4800 μg/L, about 5500 μg/L, about 6000 μg/L, about 6800 μg/L or about 7350 μg/L;
(b) from about 450 μg/L to about 1500 μg/L iron, for example from about 480 μg/L to about 1470 μg/L, or from about 480 μg/L to about 1000 μg/L, such as, for example, about 490 μg/L, about 550 μg/L, about 650 μg/L, about 970 μg/L, about 1100 μg/L, about 1300 μg/L or about 1450 μg/L;
(c) from about 130 μg/L to about 475 μg/L copper, for example from about 140 μg/L to about 450 μg/L, or from about 140 μg to about 300 μg/L, such as, for example, about 150 μg/L, about 200 μg/L, about 300 μg/L, about 400 μg/L, or about 450 μg/L;
(d) from about 20 μg/L to about 100 μg/L manganese, for example from about 25 μg/L to about 85 μg/L, or from about 25 μg/L to about 55 μg/L, such as, for example, about 27 μg/L, about 35 μg/L, about 54 μg/L, about 65 μg/L, about 75 μg/L, or about 80 μg/L;
(e) from about 3 μg/L to about 18 μg/L chromium, for example from about 4 μg/L to about 16 μg/L, or from about 4 μg/L to about 10 μg/L, such as, for example, about 5 μg/L, about 7 μg/L, about 10.0 μg/L, about 12 μg/L, or about 15 μg/L;
(f) from about 25 μg/L to about 120 μg/L selenium, for example from about 30 μg/L to about 110 μg/L, or from 30 μg/L to about 70 μg/L, such as, for example, about 35 μg/L, about 50 μg/L, about 60 μg/L, about 70 μg/L, about 80 μg/L, about 90 μg/L, or about 100 μg/L;
(g) from about 35 μg/L to about 175 μg/L iodine, for example from about 40 μg/L to about 150 μg/L, or from about 40 μg/L to about 100 μg/L, such as, for example, about 50 μg/L, about 65 μg/L, about 80 μg/L, about 90 μg/L, about 100 μg/L, about 125 μg/L, or about 150 μg/L;
(h) from about 450 μg/L to about 1500 μg/L fluorine, for example from 480 μg/l to about 1480 μg/L, or from about 480 μg/L to about 1000 μg/L, such as, for example, about 490 μg/L, about 650 μg/L, about 970 μg/L, about 1050 μg/L, about 1250 μg/L, or about 1470 μg/L;
(i) from about 5 μg/L to about 30 μg/L molybdenum, for example from about 8 μg/L to about 30 μg/L, or from about 8 μg/L to about 20 μg/L, such as, for example, about 10 μg/L, about 13 μg/L, about 20 μg/L, about 25 μg/L, and about 30 μg/L.

The skilled person will be aware that the concentrations refer to the respective trace element and not to the respective salt or other form of the trace element. For example, if zinc is said to be present in a concentration of 4850 μg/L in the trace element formulation, this corresponds to a concentration of zinc chloride ($ZnCl_2$) of 10.1 mg/L.

According to one embodiment of the invention, the trace element chamber has a pH of from about 2.0 to about 4.0, which is especially beneficial for stabilizing the trace element formulation according to the invention. It is also possible to adjust the pH to a range of from about 2.0 to about 3.5 or select a pH range of from about 2.5 to about 3.2. Such pH is specifically beneficial for stabilizing selenium. The stability at such acidic pH conditions is important, in particular if the solution also includes other trace elements that may not be stable at neutral pH, but only under acidic conditions. This is, for example, the case for iodide (I), which has been reported to be more stable in solutions with acidic pH.

According to one aspect of the invention, the trace element formulation comprises an acid, which can be an inorganic or an organic acid. According to one embodiment, an organic acid selected from the group comprising malic acid, tartaric acid, citric acid, maleic acid, fumaric acid, more preferably malic acid is used, wherein the concentration of the organic acid is preferably in the range of from about 50 mM to about 400 mM, preferably from about 190 mM to about 220 mM, and more preferably about 200 mM.

In another embodiment, the solution comprises malic acid. In embodiments, the solution comprises malic acid at a concentration in the range of from about 50 mM to about 400 mM, preferably from about 190 mM to about 220 mM, such as, for example, about 140 to about 180 mM or about 160 mM to about 200 mM. The use of malic acid in the context of a parenteral nutrition product is particularly advantageous since it is an organic acid that naturally occurs in fruits, such as apples, apricots, blackberries, blueberries, cherries, grapes, peaches and others and is particularly well tolerated by human subjects when administered in the context of a nutritional product.

In certain embodiments of the invention, the MCB comprises selenium in the form of selenite, such as, for example, sodium selenite. In some embodiments, the solution of the medical product of the invention comprises selenous acid. In some embodiments, the solution of the medical product of the invention comprises selenium dioxide. In one embodiment, dissolved oxygen is used for stabilization of sodium selenite, selenous acid and/or selenium dioxide in an environment which is otherwise protected from the interchange of gases with its surrounding.

It is highly preferable that the multi-chamber container or at least the chamber of the container containing the Se(IV)—comprising trace element formulation is able to stabilize the DO content between about 0.5 and about 8 ppm. According to the invention, this can be realized in different ways, such as, for example, by making use of an oxygen-impermeable film material where an oxygen absorber is added to the primary pouch to protect other formulations contained in the MCB of the invention that require the absence of oxygen. In addition, ports that are in fluid communication with the trace element chamber comprising selenite should preferably be attached or sealed into the container in a way that ensures the chamber containing the solution comprising Se(IV) is sealed in an oxygen tight manner, to the extent possible. An inevitable loss of oxygen, for example, through the port seals where oxygen absorbers are used, can be addressed according to the invention with an appropriate headspace used as a reservoir of e.g. oxygen to assure the stability of Se(IV) for the intended shelf-life. In embodiments, the chamber comprising the solution containing selenium comprises a port that is essentially oxygen impermeable.

As used herein, the term "shelf life" relates to the time that the medical product of the invention can be stored at defined storage conditions after sealing and sterilizing. Depending on the storage conditions, shelf life may vary.

A selenite (Se(IV)) containing trace element formulation according to the invention can be prepared by the steps comprising:

(a) dissolving sodium selenite, selenous acid or selenium dioxide in a liquid medium, preferably water for injection,
(b) further dissolving an acid, preferably an organic acid selected from the group comprising malic acid, tartaric acid, citric acid, maleic acid and fumaric acid,
(c) further dissolving zinc, copper, and manganese, and
(d) adjusting the solution to a concentration of dissolved oxygen of from about 0.5 ppm to about 8 ppm, preferably to more than about 4 ppm and more preferably to more than about 6 ppm.

Following steps (a) to (d), the trace element formulation is filled into the chamber of the MCB intended for holding the trace element formulation and the chamber can be sealed. Preferably, the fill tube is then removed. The other chambers of the MCB can be filled simultaneously, before or after filling the trace element chamber. After overpouching the primary container, the MCB can be terminally heat sterilized, e.g. by moist heat sterilization.

According to one embodiment of the invention, selenium can also be provided as selenate, for example as sodium selenate, selenomethionine or selenocysteine. It is a particular advantage that selenate salts, selenomethionine and/or selenocysteine are stable also in solutions with an acidic pH such as preferably used for the trace element formulation according to the invention, and not only at about neutral pH in the range of about 7 to about 7.5 as would have been expected. In addition, it was also found that the stability of selenate is positively affected by the presence of an inorganic or organic acid, especially by the presence of an organic acid selected from the group comprising malic acid, tartaric acid, citric acid, maleic acid, fumaric acid, more preferably malic acid, wherein the concentration of the organic acid is preferably in the range of from about 50 mM to about 400 mM, preferably from about 190 mM to about 220 mM, and more preferably about 200 mM, as mentioned already for selenite.

Trace element formulations comprising a selenate as disclosed before can be prepared in analogy to the formulations comprising selenite, including the conditions for sterilization.

Accordingly, it is one aspect of the present invention that the trace element formulation according to the invention can also contain a selenate, such as sodium selenate, as a selenium source within an MCB according to the invention. Selenate remains equally stable as selenite and may be an excellent alternative to selenite in MCBs according to the invention.

Carbohydrate formulations such as the carbohydrate formulation used in accordance with the invention provide a supply of calories, typically in the form of glucose. In particular, the carbohydrate formulation provides an amount of carbohydrate sufficient to avoid adverse effects such as hyperglycemia that has been observed in patients receiving parenteral nutrition. A broad range of carbohydrate formulations can be used according to the invention, including carbohydrate formulation used in currently marketed products. Typically, the carbohydrate formulation includes about 20 to about 50 grams of glucose per 100 mL of carbohydrate formulation. Carbohydrates comprise glucose, sucrose, ribose, amylose (a major component of starch), amylopectin, maltose, galactose, fructose, and lactose. As mentioned elsewhere, the carbohydrate formulation preferably has a pH of from about 3.2 to about 5.5, such as, for example, from about 3.5 to about 4.8, which is beneficial for stably accommodating vitamins according to the invention.

As used herein, amino acid formulations include a sterile, aqueous solution of one or more amino acids and one or more electrolytes. Typically, amino acid formulations that can be used in amino acid formulation provided in MCBs for PN according to the invention include from about 4 grams to about 25 grams of amino acids per 100 mL of amino acid formulation, such as about 3 grams to about 20 grams per 100 mL of amino acid formulation, about 4 grams to about 17 grams per 100 mL of amino acid formulation, or about 4 grams to about 12 grams per 100 mL of amino acid formulation, such as, for example, about 4 g/100 mL, about 5 g/100 mL, about 6 g/100 mL, about 7 g/100 mL, about 8 g/100 mL, about 9 g/100 mL, about 10 g/100 mL, about 11 g/100 mL, about 12 g/100 mL, about 13 g/100 mL, about 14 g/100 mL, about 15 g/100 mL, about 16 g/100 mL, about 17 g/100 mL, about 18 g/100 mL, about 19 g/100 mL, or about 20 g/100 mL. Amino acids which are included into amino acid formulations are, for example, selected from the group consisting of alanine (Ala), arginine (Arg), aspartic acid (Asp), glutamic acid (Glu), glutamine (Gln), glycine (Gly), histidine (His), leucine (Leu), isoleucine (Ile), lysine (Lys), methionine (Met), phenylalanine (Phe), proline (Pro), serine (Ser), threonine (Thr), tryptophan (Trp), tyrosine (Tyr), valine (Val), cysteine (Cys), ornithine (Orn), taurine and asparagine (Asn). The amino acid formulations according to the invention can further comprise oligopeptides consisting of at least three amino acids and/or dipeptides selected from the group consisting of Acetyl-cysteine (Ac-Cys), Acetyl-Tyrosine (Ac-Tyr), Alanyl-glutamine (Ala-Gln), Glycyl-glutamine (Gly-Gln), and glycyltyrosine (Gly-Tyr). Further, the content of tyrosine can be increased by adding, for example, a glycyl-tyrosine dipeptide or acetyl-tyrosine (Ac-Tyr). Typically, however, the glycyltyrosine dipeptide has improved pharmacokinetics compared to Ac-Tyr, which is more rapidly eliminated by the kidney, resulting in diminished release of tyrosine in the blood.

According to one embodiment, the amino acid formulation of the present invention comprises the amino acids alanine, arginine, aspartic acid, glutamic acid, glycine, histidine, isoleucine, leucine, lysine, methionine, phenylalanine, proline, serine, threonine, tryptophane, tyrosine, and valine. Said amino acids can be present in the amino acid formulation in a broader range of concentration. Typical concentrations ranges are known in the prior art.

For example, the amino acid formulation according to the invention depending also on the volume and size of the multi-chamber bag and the amino acid chamber of the invention, can include from about 3.0 g to about 25 g alanine (e.g., from about 3.5 g to about 22 g), from about 2.0 g to about 18.0 g arginine (e.g., from about 2.4 g to about 15 g), from about 0.5 g to about 6.0 g aspartic acid (e.g., from about 0.7 g to about 4.5 g), from about 0.6 g to about log glutamic acid (e.g., from about 1.2 g to about 7.7 g), from about 1.2 g to about 12.0 g glycine (e.g., from about 1.6 g to about 11.0 g), from about 1.0 g to about 11.0 g histidine (e.g., from about 1.4 g to about 10.0 g), from about 0.8 g to about 10.0 g isoleucine (e.g., from about 1.1 g to about 8.09), from about 1.0 g to about 12.0 g leucine (e.g., from about 1.5 g to about 11.0 g), from about 1.0 g to about 14.0 g lysine (e.g., from about 1.5 g to about 12 g), from about 0.6 g to about 9.0 g methionine (e.g., from about 1.0 g to about 8.0 g), from about 1.2 g to about 12.0 g phenylalanine (e.g., from about 1.5 g to about 11.0 g), from about 0.8 g to about 12.0 g proline (e.g., from about 1.0 g to about 10.0 g), from about 0.5 g to about 8.0 g serine (e.g., from about 0.8 g to about 6.5 g), from about 0.8 g to 10.0 g threonine (e.g., from about 1.0 g to about 8.0 g), from about 0.04 g to about 0.5 g tyrosine (e.g., from about 0.05 g to about 0.4 g), from about 0.3 g to about 3.5 g tryptophane (e.g., from about 0.4 g to about 2.8 g), and from about 1.0 g to about 12.0 g valine (e.g., from about 1.5 g to about 10.0 g).

According to another embodiment, the amino acid formulation according to the invention, depending on the volume of the amino acid chamber, may contain from about 6.0 g to about 22 g alanine per liter of amino acid formulation; from about 4.0 g to about 15 g arginine per liter of amino acid formulation; from about 1.0 g to about 5.0 g aspartic acid per liter of amino acid formulation; from about 2.0 g to about 10.0 g of glutamic acid per liter of amino acid formulation; from about 2.8 g to about 12.0 g glycine per liter of amino acid formulation; from about 2.0 g to about 10.0 g histidine per liter of amino acid formulation; from about 2.0 g to about 8.0 g isoleucine per liter of amino acid formulation; from about 3.0 g to about 10.0 g leucine per liter of amino acid formulation; from about 3.0 g to about 12.0 g lysine per liter of amino acid formulation; from about 2.0 g to about 8.0 g methionine per liter of amino acid formulation; from about 2.8 g to about 11.0 g phenylalanine per liter of amino acid formulation; from about 2.0 g to about 10.0 g proline per liter of amino acid formulation; from about 1.0 g to about 7.0 g serine per liter of amino acid formulation; from about 1.8 g to about 9.0 g threonine per liter of amino acid formulation; from about 0.3 g to about 0.5 g to about 3.2 g tryptophane per liter of amino acid formulation; from about 0.09 g to about 0.5 g tyrosine per liter of amino acid formulation; and from about 2.8 g to about 11.0 g valine.

According to another embodiment, once reconstituted, the flexible multi-chamber bag of the invention provides for a reconstituted solution wherein amino acids are present in a concentration of, for example, from about 3.0 g/L to about 12.0 g/L alanine; from about 1.9 g/L to about 8.5 g/L arginine; from about 0.5 g/L to about 2.6 g/L aspartic acid; from about 0.8 g/L to about 4.5 g/L glutamic acid; from about 1.4 g/L to about 6.0 g/L glycine; from about 1.0 g/L to about 5.5 g/L histidine; from about 0.9 g/L to about 4.5 g/L isoleucine; from about 1.4 g/L to about 6.0 g/L leucine; from about 1.4 g/L to about 6.5 g/L lysine; from about 0.8 g/L to about 4.5 g/L methionine; from about 1.4 g/L to about 5.5 g/L phenylalanine; from about 1.0 g/L to about 5.2 g/L proline; from about 0.5 g/L to about 3.5 g/L serine; from about 0.8 g/L to about 4.2 g/L threonine; from about 0.3 g/L to about 1.6 g/L tryptophane; from about 0.05 g/L to about 0.21 g/L tyrosine; and from about 1.2 g/L to about 5.2 g/L valine.

The amino acid formulation according to the invention may further include electrolytes. As used herein, electrolytes include sodium, potassium, chloride, calcium, magnesium, acetate, hydrogen carbonate, and/or phosphate, which is, for example, provided in the form of hydrogen phosphate or dihydrogen phosphate or as glycerophosphate, such as sodium glycerophosphate. For example, if an inorganic phosphate source is present, calcium will be provided in another chamber of the MCB, such as in the carbohydrate formulation and/or the trace element formulation. This is not mandatory where an organic phosphate source such as, for example, sodium glycerophosphate, is used.

The amino acid formulation according to the invention preferably comprises sodium ($Na^+$), potassium ($K^+$), magnesium ($Mg^{2+}$), glycerophosphate ($C_3H_7O_6P^{2-}$), acetate ($CH_3COO^-$), and chloride ($Cl^-$). Said electrolytes can be present in the amino acid formulation and the resulting reconstituted solution in a relatively wide range. Typical ranges are known in the prior art.

For example, the amino acid formulation according to the invention, depending also on the volume or size of the multi-chamber bag and the amino acid chamber of the invention, can include from about 0.1 mmol to about 10 mmol of sodium (e.g., about 3.75 mmol to about 10 mmol of sodium), from about 0.1 mmol to about 10 mmol of potassium (e.g., about 3.75 mmol to about 6.90 mmol of potassium), from about 0.05 mmol to about 1.0 mmol of magnesium (e.g., about 0.05 mmol to about 0.11 mmol and/or about 0.38 mmol to about 0.65 mmol of magnesium), from about 0.1 mmol to about 10 mmol of calcium (e.g., about 1.13 mmol to about 5.10 mmol of calcium), from about 0.1 mmol to about 10 mmol of phosphate (e.g., about 0.94 mmol to about 5.10 mmol of phosphate) and not more than 10 mmol of chloride (e.g., not more than 5.6 mmol of chloride) per 100 mL of amino acid formulation. When calcium and phosphorus are present together in the same heat-sterilized solution, insoluble calcium phosphate precipitation can occur. Using an organic salt of phosphorus such as sodium glycerophosphate or calcium glycerophosphate, calcium and phosphate amounts may be increased without solubility issues and without providing excess sodium or chloride. In the amino acid formulation, sodium may be provided in the form of sodium chloride or sodium acetate trihydrate; calcium may be provided in the form of calcium chloride dihydrate or calcium gluconate, magnesium may be provided in the form of magnesium acetate tetrahydrate or magnesium chloride hexahydrate, phosphate can be provided as sodium glycerophosphate and potassium may be provided in the form of potassium acetate or potassium chloride.

According to one embodiment of the invention, sodium is provided as sodium acetate trihydrate, potassium is provided as potassium chloride, magnesium is provided as magnesium chloride hexahydrate, and phosphate is provided as sodium glycerophosphate, hydrated. Accordingly, amino acid formulations according to the invention can contain from about 1.0 g to about 4.0 g sodium acetate trihydrate (e.g., about 1.1 g, about 1.5 g, about 1.8 g, about 2.0 g, about 2.3 g, about 3.0 g or about 3.5 g of sodium acetate trihydrate); from about 1.0 g to about 5 g of potassium chloride (e.g., about 1.2 g, about 1.8 g, about 2.0 g, about 2.2 g, about 2.5 g, about 2.8 g, about 3.0 g, about 3.5 g, about 4.0 g, or about 4.5 g potassium chloride); from about 0.3 g to 2.0 g magnesium chloride hexahydrate (e.g., about 0.4 g, about 0.5 g, about 0.6 g, about 0.7 g, about 0.8 g, about 0.9 g, about 1.0 g, about 1.1 g, about 1.2 g, about 1.4 g, about 1.6 g, about 1.8 g magnesium chloride hexahydrate); and from about 1.0 g to about 9.0 g sodium glycerophosphate 5·H2O (e.g., about 1.5 g, about 1.8 g, about 2.0 g, about 2.4 g, about 2.8 g, about 3.2 g, about 3.5 g, about 3.8 g, about 4.2 g, about 4.6 g, about 5.2 g, about 5.6 g, about 6.0 g, about 6.5 g, about 7.0 g, about 7.4 g, or about 7.8 sodium glycerophosphate 5·H2O)

According to another embodiment, the amino acid formulation of the invention comprises from about 1.8 g sodium acetate per liter of amino acid formulation to about 3.5 g sodium acetate per liter of amino acid formulation, such as, for example, from about 2.0 g/L to about 3.0 g/L.

According to another embodiment, the amino acid formulation of the invention comprises from about 2.0 g potassium chloride per liter of amino acid formulation to about 5.0 g potassium chloride per liter of amino acid formulation, such as, for example, from about 2.0 g/L to about 4.2 g/L. According to another embodiment, the amino acid formulation of the invention comprises from about 0.4 g magnesium chloride per liter of amino acid formulation to about 2.0 g magnesium chloride per liter of amino acid formulation, such as, for example, from about 0.7 g/L to about 1.7 g/L. According to yet another embodiment, the amino acid formulation of the invention comprises from about 2.5 g sodium glycerophosphate $5 \cdot H_2O$ per liter of amino acid formulation to about 8.0 g sodium glycerophosphate $5 \cdot H_2O$ per liter of amino acid formulation, such as, for example, from about 3.3 g/L to about 7.0 g/L.

Lipid formulations such as mentioned in the context of the present invention are an emulsion of an oil phase, a water phase, and an emulsifier that makes the two phases miscible. In case of lipid emulsions, which are to be used as an injectable emulsion for parenteral nutrition, the emulsion must be an oil-in-water (o/w) emulsion. This means that the oil must reside in the internal (or dispersed) phase, while water is the external (or continuous) phase, as the emulsion must be miscible with blood. Lipid emulsion as disclosed herein must therefore also be substantially free of any suspended solids. Of course, the lipid emulsions may contain further components, including, but not limited to, antioxidants, pH modifiers, isotonic agents, and various combinations thereof. Lipids emulsions often contain low amounts of vitamins such as, for example, vitamin E. Vitamin E, especially α-tocopherol, is, for example, present in olive oil or in certain fish oils as well as in various emulsion blends. Plant germs and seeds, as well as their oils, and products derived from them are also containing vitamin E. In wheat germ, sunflower seeds, cottonseed, and olive oil, α-tocopherol makes up most (50%-100%) of the vitamin E.

An overview over lipid emulsions, their composition and use is provided, for example, in Driscoll, Journal of Parenteral and Enteral Nutrition 2017, 41, 125-134. Further information on the use of lipid emulsions in parenteral nutrition of intensive care patients is provided, for example, in Calder et al, Intensive Care Medicine, 2010, 36(5), 735-749.

Typically, the oil phase of the lipid emulsion may include polyunsaturated fatty acids, such as long-chain polyunsaturated fatty acids, which may be present as the free acid, as an ionized or salt form of the free acid, and/or in ester form. Suitable esters of the polyunsaturated fatty acids/long-chain polyunsaturated fatty acids include, but are not limited to, alkyl esters (e.g., methyl esters, ethyl esters, propyl esters, or combinations thereof) and triglyceride esters. In some cases, the long-chain polyunsaturated fatty acid has a structure R(C═O)OR', wherein R is an alkenyl group having at least 17 carbon atoms, at least 19 carbon atoms, at least 21 carbon atoms, or at least 23 carbon atoms, and R' is absent, H, a counter ion, an alkyl group (e.g., methyl, ethyl, or propyl), or a glyceryl group (e.g., R(C═O)OR' is a monoglyceride, a diglyceride, or a triglyceride). Polyunsaturated fatty acids for use in the lipid formulations disclosed herein include, but are not limited to, linoleic acid (LA), arachidonic acid (ARA), α-linolenic acid (ALA), eicosapentaenoic acid (EPA), docosahexaenoic acid (DHA), stearidonic acid (SDA), γ-linolenic acid (GLA), dihomo-γ-linolenic acid (DPA), and docosapentaenoic acid (DPA), particularly, DHA, ARA, and EPA, each of which may be present in free acid form, ionized or salt form, alkyl ester form, and/or triglyceride form. In some cases, the polyunsaturated fatty acids and/or long-chain fatty acids are present in triglyceride form.

Typically, the lipid formulation includes about 5% to about 35% by weight of an oil phase based on the total weight of the lipid emulsion. For example, the oil phase of the lipid formulation is present in an amount of about 8% to 12%, of about 10% to about 20%, of about 10% to about 15%, of about 15% to about 20%, of about 12% to about 17%, of about 18% to 22% and/or about 20% by weight based on the total weight of the lipid formulation. The oil phase typically and preferably contains, in various amounts depending on the source of the oil, omega-3 fatty acids. The three types of omega-3 fatty acids involved in human metabolism are eicosapentaenoic acid (EPA) and docosahexaenoic acid (DHA), both of which are usually found in marine fish oils and α-linolenic acid (ALA), commonly found in plant oils.

The oil phase and its components can be derived from a single source or different sources (see, for example, Fell et al, Advances in Nutrition, 2015, 6(5), 600-610). Of the plant oils, currently used sources include, but are not limited to, soybean and olive oil as well as coconut or palm kernel oil. Another source are algae, including microalgae such as *Crypthecodinium cohnii* and *Schizochytrium* sp., which in some cases serve as the single source of the long-chain polyunsaturated fatty acid docosahexaenoic acid (DHA). Marine oil used in parenteral lipid emulsions is processed from oily fish primarily found in cold water and including, but not limited to, herring, shad and sardines. However, other marine organisms can be used as an oil source, such as, for example, krill, such as Antarctic krill (*Euphausia superba* Dana). Krill oil, for example, provides for both EPA and DHA, in amounts of up to 35% w/w of the fatty acids.

The lipid emulsions referred to herein may further include additional components, such as surfactants (also referred to as emulsifiers), co-surfactants, isotonic agents, pH adjusters, and antioxidants. Generally, surfactants are added to stabilize emulsions by reducing the interfacial tension between the oil phase and the aqueous phase. Surfactants typically include a hydrophobic part and a hydrophilic part, and the amount of surfactant/emulsifier included in the formulations is determined based on the amount that is needed to achieve a desired level of stabilization of the emulsion. Typically, the amount of surfactant in the lipid formulation is about 0.01% to about 3% by weight based on the total weight of the lipid formulation, for example, about 0.01% to about 2.5% by weight. Suitable surfactants and co-surfactants include surfactants that are approved for parenteral use, and include, but are not limited to, phospholipids (e.g., egg phosphatide and soy lecithin), oleate salts, and combinations thereof. Krill oil can also be used as an emulsifier in the lipid emulsion, wherein the lipid emulsion comprises about 0.5 to about 2.2 wt % krill oil based on the total weight of the emulsion, and wherein the emulsion is free of egg yolk lecithin (US 2018/0000732 A1). Another exemplary surfactant is lecithin, including both natural and synthetic lecithin, such as lecithins derived from egg, corn or soybean or mixtures there-of. In some cases, lecithin is included in an amount of about 1.2% based on the total weight of the lipid formulation.

In some cases, the lipid emulsion formulation includes a cosurfactant. Typically, the amount of co-surfactant in the lipid formulation is less than the amount of surfactant, and typically the amount of co-surfactant in the formulation is about 0.001% to about 0.6% by weight based on the total weight of the lipid formulation. An exemplary co-surfactant is oleate, such as sodium oleate. In some cases, the lipid formulation includes lecithin and oleate as surfactant and co-surfactant, for example, an in amount of about 1.2% lecithin and about 0.03% oleate. In some cases, sodium oleate is included in an amount of about 0.03% by weight based on the total weight of the lipid formulation.

Isotonic agents can be added to the lipid emulsions to adjust the osmolarity of the lipid emulsion to a desired level, such as a physiologically acceptable level. Suitable isotonic agents include, but are not limited to, glycerol. Typically, the lipid emulsion formulation has an osmolarity of about 180 to about 300 milliosmole/liter, such as about 190 to about 280 milliosmole/liter. In some cases, the lipid emulsion includes an isotonic agent in an amount of about 1% to about 10% by weight based on the total weight of the lipid. In some cases, the lipid emulsion formulation includes about 2% to about 3% by weight of glycerol.

pH modifiers can be added to the lipid emulsions to adjust the pH to a desired level, such as a physiologically acceptable pH for parenteral use. Suitable pH modifiers include but are not limited to sodium hydroxide and hydrochloric acid.

The lipid formulation according to the invention can be prepared according to generally known processes (see, for example, Hippalgaonkar et al, AAPS PharmSciTech 2010, 11(4), 1526-1540 or WO 2019/197198 A1)).

According to one embodiment of the invention, the lipid formulation according to the invention is an association of refined olive oil and refined soya oil in a ratio of 80/20, comprising about 15% saturated fatty acids (SFA), about 65% monounsaturated fatty acids (MUFA), 20% polyunsaturated essential fatty acids (PUFA), and wherein the phospholipid/triglyceride ratio is about 0.06. Such composition can be especially beneficial in the context of the invention because olive oil naturally contains alpha tocopherol which, combined with a moderate PUFA intake, contributes to reduce lipid peroxidation. Therefore, it should be noted that in the context of the invention the lipid formulations (both the lipid formulation present in the third chamber and the lipid formulation forming the basis of the vitamin formulation, where applicable) may naturally contain certain amounts of vitamin E. However, amounts and concentrations provided for vitamin E in the context of the invention relate to vitamin E that is added to the respective formulations and does not encompass any naturally occurring vitamin E in said lipid emulsions to which vitamin E is added.

In some embodiments of the invention, the multi-chamber bag can be provided without the lipid formulation provided in the third chamber. For example, there are circumstances when it is undesirable to include a lipid emulsion into the MCB, or admix such lipid formulation with the formulations of the other chambers, for example in products dedicated to pediatric patients, specifically to neonates or infants, for example those under septic status, coagulation abnormalities, high bilirubin level, or for other reasons.

According to one embodiment, the MCB is provided with a non-peelable wall between the lipid formulation in the third chamber and the other chambers that is permanent and not openable. The admixture and the separate lipid emulsion may then be administered separately without requiring selective activation of the openable seals. Administration ports are then provided on two of the chambers such that one administration port is provided so that the lipid emulsion chamber separated by the permanent seal may be administered (or may not be administered) as needed while a second administration port is provided to allow the admixture of the remaining formulations to be administered.

According to yet another embodiment, the seal between the lipid chamber and the remaining chambers us openable but can be selectively activated as described, for example, in U.S. Pat. No. 8,485,727B2 when provided in a container configuration that allows for selective opening of the seals.

According to another embodiment, the multi-chamber bag of the invention does not comprise a lipid formulation in a third chamber but is provided without said macronutrient formulation. In such case, the flexible multi-chamber container having peelably sealing walls comprises at least:

(a) a first chamber comprising a carbohydrate formulation and optionally vitamins and/or trace elements,
(b) a second chamber comprising an amino acid formulation and optionally vitamins and/or trace elements,
(c) a third chamber comprising a trace element formulation, and
(d) a fourth chamber comprising a vitamin formulation.

According to one embodiment, the vitamin formulation of (d) comprises at least vitamin B12, and the trace element formulation comprises at least selenium (Se).

According to one embodiment, the vitamin formulation in such scenario is a lipid emulsion having a pH of from about 5.0 to about 7.0 and comprises an aqueous phase, and about 1% to about 20% by weight of an oil phase based on the total weight of the lipid emulsion and preferably contains less than 1.5 ppm of dissolved oxygen as described above, wherein the vitamin formulation further comprises vitamin A and optionally at least one vitamin selected from the group of vitamins comprising or consisting of vitamin D, vitamin E and vitamin K. According to yet another embodiment, the vitamin formulation may further comprise vitamin B2 and/or vitamin B2. For example, the vitamin formulation may comprise vitamin B12 and vitamin A, or may comprise vitamin B12, vitamin A, vitamin D, vitamin E and vitamin K, or it may comprise vitamin B12, vitamin B2, vitamin B5, vitamin A, vitamin D, vitamin E and vitamin K. Other combinations according to the invention are also possible.

According to a further embodiment, the vitamin formulation of the said fourth chamber is an aqueous solution having a pH of from about 5.0 to about 7.0 and comprises vitamin B12 and optionally at least one vitamin selected from the group of vitamins consisting of vitamin B2 and vitamin B5, and optionally comprises less than 1.5 ppm dissolved oxygen. For example, the aqueous vitamin formulation may comprise vitamin B12, vitamin B2 and vitamin B5.

According to yet another embodiment, when the fourth chamber comprises a vitamin formulation which is an aqueous formulation as described above, the MCB according to the invention may comprise a fifth chamber which comprises another vitamin formulation which is a lipid emulsion having a pH of from 5.0 to 7.0 and comprises an aqueous phase, and 1% to 20% by weight of an oil phase based on the total weight of the lipid emulsion and optionally contains less than 1.5 ppm of dissolved oxygen, wherein the vitamin formulation further comprises vitamin A and optionally at least one vitamin selected from the group of vitamins comprising or consisting of vitamin D, vitamin E and vitamin K.

In the context of the present invention, the multi-chamber bag is a flexible container. Flexible containers or bags of the invention can be made of materials comprising, without limitation, polyvinyl chloride (PVC), polypropylene (PP), polyethylene (PE), ethylene vinyl alcohol (EVOH), ethylene-vinyl acetate (EVA) and all possible copolymers, essentially any synthetic material suitable for containing the components to be administered.

For example, oxygen impermeable flexible containers are made of gas barrier films that block oxygen migration to the outside of the container. Such a container can for example comprise an oxygen barrier film, preferably with an oxygen permeability of less than 50 cc/m$^2$/day. Different technologies have been developed to provide oxygen barrier to transparent films, such as PE films or polyethylene terephthalate films. The main technologies are the following: (1) Coating with high barrier materials, generally inorganic oxide layers (e.g., SiOx or $Al_2O_3$); (2) Multilayer films, wherein an inner layer consists a barrier material such as EVOH, polyamide, aluminum, halogenated polyvinylidene such as PVDC, amorphous nylon or crystalline nylon or combination of both, copolymers of ethylene vinyl alcohol copolymer layer (EVOH), polyolefins, including combinations of two or more of the above layers, and wherein the outer layers consist of structural polymer (e.g. PE, PP or PET).

The multi-chamber bag according to the invention may be prepared from any of the before-mentioned flexible films. Suitable containers, including soft bags, typically are sterile, non-pyrogenic, single-use, and/or ready-to-use. Such multi-chamber containers are particularly useful for holding a parenteral nutrition product.

The flexible multi-chamber container according the invention, such as a four-chamber, a five-chamber or a six-chamber bag, may have various configurations wherein, for example, the four, five, six or even more chambers can be arranged vertically and/or horizontally, as long as the peelably sealing walls between them allow for the reconstitution of the MCB and its various formulations in a way that the amino acid formulation which functions as a buffering solution is essentially admixed first with formulations having a relatively low pH, such as the carbohydrate formulation. The outside seals of the multi-chamber container are non-peelably sealing walls that do not open under the fluid pressure supplied and the physical force (e.g., rolling the top edge) to open the weaker peelably sealing walls between the chambers. In some embodiments, the peelably sealing walls of the multi-chamber container may be designed to allow for the admixing or reconstitution of only selected chambers of the multichambered container, for example, the admixing of the lipid emulsion with the vitamin formulation and the amino acid formulation, if so desired.

The chambers of the MCB of the invention may have the same size or may have different sizes to accommodate the various formulations which may different volumes. The chambers may be designed to contain volumes of from, for example, about 1 to about 5 ml, from about 5 to about 10 ml, from about 10 to about 50 ml, from about 50 to about 100 ml, from about 100 to about 250 ml, from about 250 ml to about 500 ml, from about 500 to about 1000 ml, from about 1000 to about 1500 ml. The MCBs can be designed to have chambers which are located adjacent to each other. The chambers may have various shapes. The chambers can be oriented horizontally and/or vertically to each other. Small chambers, such as, for example, chambers designed to hold the vitamin or the trace element formulation, can be designed to be located within another, larger chamber, wherein, for example, the small chamber which is located within another, larger chamber can be accommodated and fixed into said larger chamber by welding at least one edge of said small chamber in between the weld seam of the surrounding larger chamber.

For example, the amino acid chamber of the MCB according to the invention can have a volume of from about 320 mL to about 1200 mL, for example from about 400 mL to about 1200 mL. Typical volumes of the amino acid formulation encompass, for example, about 500 mL, about 800 mL or about 1000 mL. However, larger or smaller volumes are also possible, such as, for example, about 350 mL, if the MCB is designed to provide reconstituted volumes of about 500 mL to about 800 mL only.

The carbohydrate formulation generally has a somewhat smaller volume compared to the amino acid formulation. Volumes of the carbohydrate formulation can have a range of from about 150 mL to about 600 mL, for example from about 250 mL to 550 mL. Typical volumes of the carbohydrate chamber according to the invention are, for example, about 250 mL, about 400 mL or about 550 mL. However, larger or smaller volumes are also possible, such as, for example, about 180 mL, if the MCB is designed to provide reconstituted volumes of about 500 mL to about 800 mL only.

The lipid formulation is generally provided in volumes of from about 100 mL to about 500 mL, for example from about 120 mL to about 450 mL. Typical volumes of the amino acid formulation encompass, for example, about 200 mL, about 300 mL, or about 400 mL. However, larger or smaller volumes are also possible, such as, for example, about 130 mL, if the MCB is designed to provide reconstituted volumes of about 500 mL to about 800 mL only.

As mentioned before, the vitamin formulation and/or the trace element formulation will generally be provided in relatively small chambers, containing from about 2.5 mL to about 100 mL of the formulation. Typically, said chambers will have a volume of from about 10 to about 30 mL.

The flexible multi-chamber container (MCB) according to the invention will preferably have a reconstituted volume of from about 600 mL to about 2200 mL, even though smaller or larger volumes are feasible and do not deviate from the invention. Typical reconstituted volumes are, for example, in the range of from about 1000 mL to about 2000 mL, such as, for example, about 1000 mL, about 1300 mL, about 1500 mL, about 1800 mL or about 2000 mL. Smaller reconstituted volumes are, for example, about 620 mL, about 680 mL or about 720 mL.

Multi-chamber containers that can be adapted according to the invention are disclosed, for example, in EP0790051A2, US20160000652A1, and in US20090166363A1. For example, the multi-chamber container may be configured as a bag that includes three adjacent chambers or compartments for the macronutrient formulations and another two or three adjacent chambers for the micronutrients, such as, for example, schematically shown in FIGS. 1-19. In the preferred embodiment, the peelably sealing walls (e.g., frangible barriers or openable seals, peel seals or frangible seals) are used to separate the chambers of the multi-chamber container. The peelably sealing walls permit formulations to be separately stored and admixed just prior to administration thereby allowing storage in a single container of formulations which should not be stored as an admixture for an extended period. Opening of the peelably sealing walls allows communication between the chambers and mixing of the contents of the respective chambers. The outside seals of the multi-chamber container are non-peelably sealing walls that do not open under the fluid pressure supplied or the physical force (e.g., rolling the top edge) to open the weaker peelably sealing walls between the chambers. A multi-chamber container according to the invention can have filling ports that allow filling of the chambers with the respective formulations during manufacture. Providing a medical port will allow addition of drugs, such as, for example, antibiotics, to the reconstituted solution. According to the invention, such medical port may also be absent. A port for administration is provided in the MCB for allowing administering the reconstituted solution. The container should preferably provide a hanger portion for hanging the container, for example to an IV pole.

The multi-chamber container may be provided with instructions explaining a desired order with which to open the peel seals, so that constituent fluids are mixed in a desired order. The unsealing strengths of the respective peel seals may be varied to promote the opening of the seals in the desired order. For example, the unsealing strength of the peel seal to be opened first may be adjusted to first admix the amino acid, lipid and glucose solution before the unsealing strength required to open the peel seal to be opened second.

The flexible multi-chamber bag of the invention is a sterilized product. In the context of the invention, the term "sterilized" relates to a solution that has undergone a process of sterilization. Sterilization refers to any process that eliminates, removes, kills, or deactivates all forms of life (in particular referring to microorganisms such as fungi, bacteria, viruses, spores, unicellular eukaryotic organisms such as Plasmodium, etc.) and other biological agents like prions present in a specific surface, object or fluid, for example food or biological culture media. Sterilization can be achieved through various means, including heat, chemicals, irradiation, high pressure, and filtration. Sterilization is distinct from disinfection, sanitization, and pasteurization, in that those methods reduce rather than eliminate all forms of life and biological agents present. After sterilization, an object is referred to as being sterile or aseptic.

According to one embodiment of the invention, sterilization is done by heat. According to another embodiment of the invention, methods encompass sterilization with moist heat. The term "moist heat" as used herein includes the use of saturated steam with or without pressure, steam air or water spray sterilization. According to one embodiment of the invention, sterilization with moist heat is preferable. Generally, said sterilization with moist heat can be used for drug products, medical devices, plastic bags and other single-use equipment, glass containers, surgical dressings and more.

In the context of the invention, the multi-chamber container can be terminally sterilized by superheated water sterilization methods. Such methods include, for example, water cascade sterilization and water spray sterilization, including methods employing serial tower continuous sterilization equipment. Superheated water is liquid water under pressure at temperatures between the usual boiling point, 100° C. (212° F.) and the critical temperature, 374° C. (705° F.). It is also known as "subcritical water" or "pressurized hot water." Superheated water is stable because of overpressure that raises the boiling point, or by heating it in a sealed vessel with a headspace, where the liquid water is in equilibrium with vapor at the saturated vapor pressure. Superheated water cascade systems are also very useful for terminally sterilizing the product of the invention. Such systems enable liquids in closed receptacles made of glass or other temperature-resistant materials (such as flexible bags used in the context of the present invention) to be sterilized quickly, reliably and gently. The advantage of the hot water cascade system lies in its very short cycle times, which are achieved through a high circulation rate and cascade density in combination with short heating up and cooling down times.

It is one aspect of the present invention, that the MCB according to the invention undergoes a terminal heat sterilization process that ensures a sterility corresponding to the sterility that is achieved by exposition to a sterilization temperature of 121° C. for 8 minutes. In the context of the invention, a heat sterilization process with an F0 of at least 8 minutes is to be understood as a sterilization process that ensures a sterility corresponding to the sterility that is achieved by exposition to a sterilization temperature of 121° C. for 8 minutes. An F0 value of 8 minutes is understood as referring to 8 minutes exposition to 121° C., meaning that the solution is at a temperature of 121° C. for 8 minutes.

Accordingly, the MCB of the invention and the formulations comprised therein, including heat sensitive components, such as, for example, vitamin B12, may be sterilized by exposing/heating the solution to a temperature that is different from 121° C., but the product requires to have a sterility level that corresponds to at least F0=8 minutes in order to be considered sterile in the context of the invention.

In a preferred embodiment, the multi-chamber container for parenteral nutrition according to the invention is sterilized by moist-heat sterilization, specifically by a superheated water sterilization method. In particular, the use of superheated water sterilization methods, water cascade or water spray sterilization with a serial tower continuous sterilization equipment are preferred methods in the context of the invention, since it was found that the methods can be adjusted for applying low F0/C0 ratios to minimize the total heat-exposure of the formulation containing heat-sensitive components such as, for example, vitamin B12, thereby reducing a loss of the vitamin during sterilization and subsequent storage.

According to one aspect of the invention, the sterilization process that has been applied to the vitamin B12 formulation as part of a multi-chamber bag according to the invention has a C0 value of no more than 130 minutes, preferably no more than 120 minutes, no more than 115 minutes, no more than 110 minutes, no more than 100 minutes, no more than 90 minutes, no more than 80 minutes, no more than 70 minutes, no more than 60 minutes, no more than 50 minutes and no more than 40 minutes. As used herein, the C0 value can be understood as the time (in minutes) during which the vitamin B12 formulation is at a temperature of 100° C. or more during the sterilization process. In general, C0 is a physical parameter used to quantify the total heat consumption of a sample.

According to one aspect of the invention, the F0/C0 ratio of the sterilization process is not less than 0.08, more preferably not less than 0.1. In embodiments, the formulation comprising vitamin B12 underwent a sterilization process with a F0/C0 ratio of 0.08, 0.09, 0.1, 0.11, 0.12, 0.13, 0.14, 0.15, 0.16, 0.17, 0.18, 0.19, 0.2, 0.22, 0.24, 0.26, 0.28, 0.3, 0.32, 0.34, 0.36, 0.38, 0.4, 0.44, 0.48, 0.52, 0.56, 0.6, 0.65, 0.7, 0.75, 0.8, 0.9 or ideally almost 1.0.

The flexible MCB of the invention is specifically designed for parenteral administration. Parenteral nutrition (PN) is the feeding of specialist nutritional products to a person intravenously, bypassing the usual process of eating and digestion. It is called total parenteral nutrition (TPN) or total nutrient admixture (TNA) when no significant nutrition is obtained by other routes, and partial parenteral nutrition (PPN) when nutrition is also partially enteric or oral. It may be called peripheral parenteral nutrition (PPN) when administered through vein access in a limb rather than through a central vein as central venous nutrition (CVN). The formulation provided by the present invention is especially suitable for CVN. Enteral food administration is via the human gastrointestinal tract and contrasts with parenteral administration.

The disclosure provides methods of treating patients who require parenteral nutrition when oral and enteral nutrition is not possible, insufficient, or contraindicated. The methods involve using the multi-chamber containers, the "all-in-one" parenteral nutrition system and reconstituted formulations disclosed herein. In particular, the methods involve parenterally administering the contents of a multi-chamber container and/or lipid formulations as disclosed herein to a patient. In a preferred embodiment, the patients are adult or adolescent patients but can be adjusted as well to the needs of pediatric patients. Pediatric patients encompass pre-term babies as well as neonates (from birth through the first 28 days of life), infants (29 days to less than 2 years) and children (2 years to less than 12 years).

As described above, the flexible MCB of the invention provides macronutrients and micronutrients in a ready-to-use format without the need to add any micronutrients before administration in order to address the needs of the patient and meet the applicable guidelines for parenteral nutrition. Accordingly, the MCB of the invention and the parenteral formulation that is reconstituted therefrom by removing or rupturing the peelably sealing walls (e.g., rolling the top edge) can be advantageously used both in a hospital or home setting. The MCB of the invention and the parenteral formulation that is reconstituted therefrom can be used broadly for patients who require parenteral nutrition, including patients that require total or partial parenteral nutrition.

EXAMPLES

The invention is further described by the following examples. These are not intended to limit the scope of the invention but represent certain embodiments and/or certain aspects of the invention. They are provided for illustrating the invention described herein in greater detail and for illustrating the respective effects and findings connected to the invention disclosed herein.

Example 1

Five-Chamber U-Shape Bags According to the Invention

For a process optimization and manufacturing efficiency, the container's width of the 4 formats (650 mL; 1,0 L; 1.5 L; 2.0 L) is identical and was fixed to 321 mm.

Adopting the same approach, peel seals and port tubes positions can be identical throughout a portfolio. Only the height of the bags can be varied.

The two smaller chambers designs, containing vitamins and trace elements, have the same surface area of 42 $cm^2$ providing the same volumes (15 mL per chamber) and does not changed with the bag formats.

Consequently, solely the peel seals height above the separation defining the small chambers is varying.

Peel seals have an unchanged width of 8 mm as peripheral seals (also called main seals) are fixed at 3.2 mm.

TABLE 2

Summary of 5CB U-shape dimensions and peel seals' height (mm)

| Bag's format | 650 mL | 1.0 L | 1.5 L | 2 L |
|---|---|---|---|---|
| Bag's width (mm) | 321 mm | | | |
| Bag's height (mm) (H1) | 267 | 314 | 374 | 432 |
| Peel seals' height (mm) (H2) | 119.32 | 166.32 | 226.32 | 284.32 |

Example 2

Peelably Sealing Wall Position

FIG. 9 shows a 5CB 1.5 L U-shape design with measurement dimensions.

Peelably sealing wall 1, defined as the peelable seal separating the lipid emulsion chamber and the middle compartment containing amino acids is at an inner distance of 74 mm with the peripheral seal.

Peelably sealing wall 2 is the activatable seal separating the amino acid chamber from the dextrose compartment. Distance between peelably sealing wall 1 and peelably sealing wall 2 is equals to 138.4 mm. Inner distance with the main seal, defining the dextrose chamber is equals to 86.2 mm.

Example 3

Peelable Seals Reshaping

FIG. 10 (including FIGS. 10*a* and 10*b*) shows peelably sealing wall V-shape and U-shape comparison.

To preserve surface to volume ratio of each compartment (defining the bulkiness of each compartment) the VIT and TE compartment width is unchanged.

To maintain this area (42 $cm^2$) in the vitamins (VIT) and trace elements (TE) chambers in the U-shape format, the separation of the peel seals was displaced towards the bottom of the bag. The distance separating the inner edge, forming the reversed U-shape of the small chambers till the outer edge of the peripheral seal is equals to 128 and 89 mm versus 148 and 61 mm for the V-shape design.

FIG. 11 shows an exemplary Peelably sealing wall with a "U" shape.

Peelably sealing wall shapes are symmetric about their vertical axis.

From top (hanger side) to bottom (tube side), H2 length, depending on bag format (conf. table 1), is connected to a 15 mm arc radius having an arc length of 17.02 mm going towards the external side of the bag. A second arc is closing the previous arc, creating an inflexion point. This arc has a radius of 30 mm and an arc length of 34.05 mm. The peel seal is then extended by 89.39 mm toward the tubes.

The inner arc of the small chamber has a radius of 22 mm (=30 external radius minus 8 mm of peel seal thickness) with an arc length of 69.12 mm forming a half circle connecting to the other branch of the peel seal.

The invention claimed is:

1. A method of manufacturing an "all-in-one" parenteral nutrition system, the method comprising:

producing a flexible multi-chamber bag, the flexible multi-chamber bag comprising:

a first chamber comprising a first port tube;

a second chamber comprising a second port tube;

a third chamber comprising a third port tube;

a fourth chamber comprising a fourth port tube; and a fifth chamber comprising a fifth port tube, wherein the first chamber is between the second chamber and the third chamber;

adding an amino acids solution into the first chamber through the first port tube;

adding a glucose solution into the second chamber through the second port tube;

adding a lipid emulsion into the third chamber through the third port tube;

adding a vitamins solution or emulsion into the fourth chamber through the fourth port tube;

adding a trace elements solution into the fifth chamber through the fifth port tube;

sealing the fourth port tube and the fifth port tube by sealing the flexible multi-chamber bag, and cutting and removing portions of the flexible multi-chamber bag comprising the fourth port tube and the fifth port tube after the sealing to form the "all-in-one" parenteral nutrition system.

2. The method of claim 1, wherein the "all-in-one" parenteral nutrition system comprises a funnel shape near a bottom edge after the portions of the multi-chamber bag are cut and removed.

3. The method of claim 1, wherein the first port tube remains in the first portion after the portions of the flexible multi-chamber bag comprising the fourth port tube and the fifth port tube are cut and removed.

4. The method of claim 1, wherein the producing the multi-chamber bag comprises sealing a top edge, a bottom edge, a left edge, and a right edge with a non-peelable seal.

5. The method of claim 4, wherein producing the multi-chamber bag further comprises sealing a first wall and a second wall in the flexible multi-chamber bag with a peelable seal, wherein the first wall and the second wall separate the flexible multi-chamber bag into the first chamber, the second chamber, and the third chamber.

6. The method of claim 5, wherein the first wall splits into a third wall and fourth wall, and wherein the third wall and the fourth wall delimit the fourth chamber.

7. The method of claim 5, wherein the second wall splits into a fifth wall and sixth wall, and wherein the fifth wall and the sixth wall delimit the fifth chamber.

* * * * *